(12) United States Patent
Birss et al.

(10) Patent No.: US 10,147,955 B2
(45) Date of Patent: Dec. 4, 2018

(54) HIGH PERFORMANCE OXYGEN AND FUEL ELECTRODE FOR REVERSIBLE SOLID OXIDE FUEL CELL APPLICATIONS

(71) Applicant: UTI LIMITED PARTNERSHIP, Calgary (CA)

(72) Inventors: Viola Birss, Calgary (CA); Beatriz Molero Sanchez, Calgary (CA); Paul Kwesi Addo, Calgary (CA); Min Chen, Calgary (CA)

(73) Assignee: UTI Limited Partnership, Calgary, Alberta (CA)

( * ) Notice: Subject to any disclaimer, the term of this patent is extended or adjusted under 35 U.S.C. 154(b) by 26 days.

(21) Appl. No.: 15/169,506

(22) Filed: May 31, 2016

(65) Prior Publication Data
US 2016/0351916 A1 Dec. 1, 2016

Related U.S. Application Data

(60) Provisional application No. 62/167,532, filed on May 28, 2015.

(51) Int. Cl.
| | | |
|---|---|---|
| *H01M 4/00* | (2006.01) | |
| *H01M 4/88* | (2006.01) | |
| *H01M 8/1246* | (2016.01) | |
| *H01M 4/90* | (2006.01) | |
| *H01M 8/124* | (2016.01) | |

(52) U.S. Cl.
CPC ....... *H01M 4/8825* (2013.01); *H01M 4/9033* (2013.01); *H01M 8/1246* (2013.01); *H01M 2008/1293* (2013.01); *Y02E 60/525* (2013.01); *Y02P 70/56* (2015.11)

(58) Field of Classification Search
CPC ............ H01M 8/1246; H01M 4/8825; H01M 2008/1293; H01M 4/9033; Y02E 60/525
See application file for complete search history.

(56) References Cited

U.S. PATENT DOCUMENTS

| | | |
|---|---|---|
| 8,354,011 B2 | 1/2013 | Elangovan et al. |
| 8,617,763 B2 | 12/2013 | Armstrong et al. |

(Continued)

FOREIGN PATENT DOCUMENTS

| | | | |
|---|---|---|---|
| CN | 104319407 A | * 1/2015 | .............. H01M 4/90 |
| CN | 104319407 A | 1/2015 | |

OTHER PUBLICATIONS

Addo et al. (Sep. 2015) "CO/CO2 Study of High Performance La0.3Sr0.7Fe0.7Cr0.3O3-d Reversible SOFC Electrodes," Fuel Cells, 15:689-696.

(Continued)

*Primary Examiner* — Cynthia H Kelly
*Assistant Examiner* — Monique M Wills
(74) *Attorney, Agent, or Firm* — Leydig, Voit & Mayer, Ltd.

(57) ABSTRACT

Novel mixed-conducting perovskite oxides, including $La_{0.3}Ca_{0.7}Fe_{0.7}Cr_{0.3}O_{3-\delta}$, useful as oxygen and fuel electrodes for solid oxide fuel cells (SOFCs) and reversible solid oxide fuel cells (RSOFCs) applications. Electrode materials produce by microwave-assisted processes show improved properties as electroactive materials. SOFC and RSOFC are successfully prepared using microwave-assisted techniques.

16 Claims, 24 Drawing Sheets

(56) References Cited

U.S. PATENT DOCUMENTS

| | | | |
|---|---|---|---|
| 8,663,869 | B2 | 3/2014 | Janousek et al. |
| 2009/0110992 | A1 | 4/2009 | Nguyen |
| 2010/0255387 | A1* | 10/2010 | Ramanathan ........ H01M 8/1246 429/408 |
| 2011/0269033 | A1* | 11/2011 | Mukerjee .......... H01M 8/04223 429/410 |

OTHER PUBLICATIONS

Addo, et al. (May 2015) "Sulfur Tolerance of La0.3M0.7Fe0.7Cr0.3O3-σ (M=Sr, Ca) Solid Oxide Fuel Cell Anodes." ECS Transactions, 66, 219-228.

Addo, et al. (Jul. 2014) 11th European SOFC and SOE forum, Abstract B0312, Luzerne, Switzerland Abstract and Conference Information.

Agrawal (1998). "Microwave processing of ceramics." Current Opinion in Solid State and Materials Science, 1998, 3, 480-485.

Aguilar et al. (2004). "Sulfur-Tolerant Materials for the Hydrogen Sulfide SOFC." Electrochem. and Solid-State Lett., 7, A324 (2004).

Asif et al. (2007) "Energy supply, its demand and security issues for developed and emerging economies." Renew. Sust. Energ. Rev., 11, 1388 (2007).

Blumenthal et al. (1975) "Electronic conductivity in nonstoichiometric cerium dioxide." Journal of Solid State Chemistry, 13, 360-364.

Boivin (2001) "Structural and electrochemical features of fast oxide ion conductors." International Journal of Inorganic Materials, 3, 1261-1266.

Bu et al. (Nov. 2014). "Performance of Y0.9Sr0.1Cr0.9Fe0.1O3-σ as a sulfur-tolerant anode material for intermediate temperate solid oxide fuel cells." J. Power Sources, 250, 143(2014).

Bukhari et al. (Oct. 2013) "Doped Samarium Ferrite Perovskites as Carbon and Sulfur Resistant Anodes for Low Temperature Solid Oxide Fuel Cells." ECS Trans., 57, 1507-1515.

Canales-Vázquez et al. (2007). "Fe-substituted (La,Sr)TiO3 as potential electrodes for symmetrical fuel cells (SFCs)." J. Power Sources, 171, 552 (2007).

Chen, et al. (2012) "Characterization of La0.6Sr0.4Co0.2Fe0.8O3-σ + La2NiO4+σ Composite Cathode Materials for Solid Oxide Fuel Cells." Fuel Cells, 12, 86-96.

Chen, et al. (Feb. 2013) "Sr-rich chromium ferrites as symmetrical solid oxide fuel cell electrodes." Journal of Power Sources, 236, 68-79.

Cheng et al. (2007). "Influence of cell voltage and current on sulfur poisoning behavior of solid oxide fuel cells." J. Power Sources, 172, 688 (2007).

Choi et al. (2012). "Electrochemical properties of ceria-based intermediate temperature solid oxide fuel cell using microwave heat-treated La0.1Sr0.9Co0.8Fe0.2O3-σ as a cathode." Journal of Power Sources, 2012, 220, 377-382.

Cooper et al. (2006). "Electrical test methods for on-line fuel cell ohmic resistance measurement." Journal of Power Sources, 160, 1088-1095.

Corbel et al. (2005) "Physicochemical compatibility of CGO fluorite, LSM and LSCF perovskite electrode materials with La2Mo2O9 fast oxide-ion conductor." Solid State Sciences, 7, 1216-1224.

Deleebeeck et al. (Mar. 2014). "Activation of H2 oxidation at sulphur-exposed Ni surfaces under low temperature SOFC conditions." PCCP, 16, 9383 (2014).

Dusastre et al. (1999). "Optimisation of composite cathodes for intermediate temperature SOFC applications." Solid State Ionics, 126, 163-174.

Egger et al. (2012) "Comparison of oxygen exchange kinetics of the IT-SOFC cathode materials La0.5Sr0.5CoO3-d and La0.6Sr0.4CoO3." Solid State Ionics, 225, 55-60.

Escudero et al. (2007). "A kinetic study of oxygen reduction reaction on La2NiO4 cathodes by means of impedance spectroscopy." Journal of Electroanalytical Chemistry, 611, 107-116.

Fang et al. (2009) "Microwave processing of electroceramic materials and devices," Journal of Electroceramics, 22:125-130.

Fergus (2004) "Lanthanum chromite-based materials for solid oxide fuel cell interconnects." Solid State Ionics, 171, 1-15.

Ftikos et al. (1993). "Electrical conductivity and thermal expansion of ceria doped with Pr, Nb and Sn." Journal of the European Ceramic Society, 12, 267-270.

Fujitsu et al. (2000). "Sintering of Partially Stabilized Zirconia by Microwave Heating Using ZnO—MnO2—Al2O3 Plates in a Domestic Microwave Oven." Journal of the American Ceramic Society, 2000, 83, 2085-2087.

Grenier J.-C. et al. (1981) "Vacancy ordering in oxygen-deficient perovskite-related ferrites, in:Ferrites Transitions Elements Luminescence, Structure and Bonding." vol. 47, pp. 1-25.

Haag et al. (2012). "Structural, chemical, and electrochemical characteristics of LaSr2Fe2CrO9-σ-based solid oxide fuel cell anodes." Solid State Ionics, 212, 1 (2012).

Hammouche et al. (1989). "Crystallographic, thermal and electrochemical properties of the system La1-xSrxMnO3 for high temperature solid electrolyte fuel cells." Materials Research Bulletin, 24, 367-380.

Hansen et al. (2008). "Correlating Sulfur Poisoning of SOFC Nickel Anodes by a Temkin Isotherm." Electrochem. Solid-State Lett., 11, B178.

Hayashi et al. (2000) "Thermal expansion of Gd-doped ceria and reduced ceria." Solid State Ionics, 132, 227-233.

Hisashige et al. (2006) "Thermal expansion and Debye temperature of rare earth-doped ceria." Journal of Alloys and Compounds, 408-412, 1153-1156.

Hutagalung et al. (2008). "Microwave assisted sintering of CaCu3Ti4O12." Ceramics International 34(4): 939-42.

Janney et al. (1992). "Microwave Sintering of Solid Oxide Fuel Cell Materials: I, Zirconia-8 mol% Yttria." Journal of the American Ceramic Society, 1992, 75, 341-346.

Jiao et al. (2010). "Comparison of ultra-fast microwave sintering and conventional thermal sintering in manufacturing of anode support solid oxide fuel cell." Journal of Power Sources, 2010, 195, 8019-8027.

Jiao et al. (2010). "Performance of an anode support solid oxide fuel cell manufactured by microwave sintering." Journal of Power Sources, 195, 151-154.

Jiao et al. (2011)"An ultra-fast fabrication technique for anode support solid oxide fuel cells by microwave." Journal of Power Sources, 196, 5490-5493.

Jorcin et al. (2006). "CPE analysis by local electrochemical impedance spectroscopy." Electrochimica Acta, 51, 1473-1479.

Jorgensen et al. (2001). "Impedance of Solid Oxide Fuel Cell LSM/YSZ Composite Cathodes." Journal of the Electrochemical Society, 148, A433-A442.

Katz (1992). "Microwave Sintering of Ceramics." Annual Review of Materials Science, 1992, 22, 153-170.

Kesapragada et al. (2003). "Densification of LSGM electrolytes using activated microwave sintering." Journal of power sources, 2003, 124, 499-504.

Kozhevnikov, V. L. et al. (2004) Disordering and Mixed Conductivity in the Solid Solution LaSr2Fe3-yCryO8+δ, Chem Mater. 16:5014-5020.

Kumar et al. (2008). "Thermal and electrical properties of rare-earth co-doped ceria ceramics." Materials Chemistry and Physics, 112, 711-718.

Laguna-Bercero (2012) "Recent advances in high temperature electrolysis using solid oxide fuel cells: A review." Journal of Power Sources, 203, 4-16.

Laguna-Bercero, et al. (2011) "Development of oxygen electrodes for reversible solid oxide fuel cells with scandia stabilized zirconia electrolytes." Solid State Ionics, 192, 501-504.

Li et al. (2008). "Thermal, electrical, and electrochemical properties of Nd-doped Ba0.5Sr0.5 Co0.8Fe0.2O3-σ as a cathode material for SOFC." Solid State Ionics, 178, 1853-1858.

Lu et al. (2012) "Thermomechanical, transport and anodic properties of perovskite-type (La0.75Sr0.25)0.95Cr1-xFexO3-δ," J. Power Sources 206:59-69.

(56) References Cited

OTHER PUBLICATIONS

Lu, et al. (Jul. 2013) "Preparation and characterization of new cobalt-free cathode Pr0.5Sr0.5Fe0.8Cu0.2O3-σ for IT-SOFC." International Journal of Hydrogen Energy, 38, 10527-10533.
Markov A.A. et al. (2008) "Oxygen Nonstoichiometry, Mixed Conductivity, and Mössbauer Spectra of Ln0.5A0.5FeO3-σ (Ln = La—Sm, A=Sr, Ba): Effects of Cation Size." Chemistry of Materials, 20, 6457-6467.
Moçoteguy, et al. (Oct. 2013) "A review and comprehensive analysis of degradation mechanisms of solid oxide electrolysis cells." International Journal of Hydrogen Energy, 38, 15887-15902.
Molero-Sanchez (Aug. 2017) "Performance Enhancement of La0.3Ca0.7Fe0.7Cr0.3O3-σ Air Electrodes by Infiltration Methods," J. Electrochemical Society, 164(10) F313-F3130.
Molero-Sánchez et al. (Mar. 2015) "Electrochemistry of La0.3Sr0.7Fe0.7Cr0.3O3-δ as an oxygen and fuel electrode for RSOFCs," Faraday Discussion, 2015, 182, 159-175.
Molero-Sánchez et al. (available online Dec. 2014). "High performance La0.3Ca0.7Cr0.3Fe0.7O3-σ air electrodes for reversible solid oxide fuel cell applications." Int. J. Hydrogen Energy, 40 (2015), 1902.
Molero-Sánchez et al. (Mar. 2015) "Microwave-assisted synthesis and characterization of new cathode material for solid oxide fuel cells:La0.3Ca0.7Fe0.7Cr0.3O3-σ," Ceramics International 41 (7):8411-8416.
Molero-Sánchez et al. (May 2016) "Towards a Solid Oxide Fuel Cell/Electrolysis Cell Fabricated Entirety by Microwave Methods," 229th ECS Meeting May 29-Jun. 2, 2016, San Diego CA.
Molero-Sánchez, et al. (May 2015). "GDC-Infiltrated La0.3Ca0.7Fe0.7Cr0.3O3-σ Symmetrical Oxygen Electrodes for Reversible SOFCs." ECS Transactions, 2015, 66, 185-193.
Molero-Sánchez et al. (Jul. 2014) "La0.3Ca0.7Fe0.7Cr0.3O3-σ as a Novel Air Electrode Material for Solid Oxide Electrolysis Cells." Abstract 11th European SOFC & SOE Forum 2014, Luzern, Switzerland, Jul. 2014, pp. B 0804 Abstract with meeting information.
Molero-Sánchez et al. (Jul. 2014) "La0.3Ca0.7Fe0.7Cr0.3O3-σ as a Novel Air Electrode Material for Solid Oxide Electrolysis Cells." Presentation at 11th European SOFC & SOE Forum 2014, Luzern, Switzerland.
Mori et al. (2003) "Evaluation of Ni and Ti-doped Y2O3 stabilized ZrO2 cermet as an anode in high-temperature solid oxide fuel cells." Solid State Ionics, 160, 1-14.
Mosiatek, et al. (2012). "Changes in the morphology and the composition of the Ag|YSZ and Ag|LSM interfaces caused by polarization." Solid State Ionics, 225, 755-759.
Mosiatek, et al. (Jan. 2013). "Changes in the morphology and the composition of the Ag|Gd0.2Ce0.8O1.9 interface caused by polarization." Electrochimica Acta, 104, 474-480.
Mukundan, et al. (2004). "Sulfur Tolerant Anodes for SOFCs." Electrochem. and Solid-State Lett., 7, A5.
Omar et al. (Jun. 2013) "Consistency in the chemical expansion of fluorites: A thermal revision of the doped ceria." Acta Materialia, 61, 5406-5413.
Pikalova et al. (2007). "Effect of doping with Co2O3, TiO2, Fe2O3, and Mn2O3 on the properties of Ce0.8Gd0.2O2-σ." Inorg Mater, 43, 735-742.

Prado-Gonjal, et al. (2012). "Increased ionic conductivity in microwave hydrothermally synthesized rare-earth doped ceria Ce1-x RExO2-(x/2)." Journal of Power Sources, 2012, 209, 163-171.
Prado-Gonjal, J. et al. (2012) "Microwave-Assisted Synthesis, Microstructure, and Physical Properties of Rare-Earth Chromites." Inorganic Chemistry, 52, 313-320.
Rao et al. (1999). "Synthesis of Inorganic Solids Using Microwaves." Chemistry of Materials. 11(4), 882-95.
Riza et al. (2001) "Preparation and characterization of Ln0.8Sr0.2Fe0.8Co0.2O3-x (Ln=La, Pr, Nd, Sm, Eu, Gd)." Journal of the European Ceramic Society, 21, 1769-1773.
Ruiz-Morales et al. (2011) "Symmetric and reversible solid oxide fuel cells." RSC Advances, 1, 1403-1414.
Sameshima et al. (1999). "Thermal and mechanical properties of rare earth-doped ceria ceramics." Materials Chemistry and Physics, 61, 31-35.
Tai et al. (1995). "Structure and electrical properties of La1-xSh (Co1-yFeyO3. Part 2. The system La1-xSrxCo0.2Fe0.8O3." Solid State Ionics, 76, 273-283.
Takeda et al. (1987) "Cathodic Polarization Phenomena of Perovskite Oxide Electrodes with Stabilized Zirconia." Journal of the Electrochemical Society, 134, 2656-2661.
Tao et al. (2003). "A redox-stable efficient anode for solid-oxide fuel cells." Nat Mater, 2, 320 (2003).
Van Rompaey et al. (Oct. 2013)."Layered oxygen vacancy ordering in Nb-doped SrCo1 xFexO3-d perovskite." Z. Kristallogr., 228, 28-34.
Virkar (2010) "Mechanism of oxygen electrode delamination in solid oxide electrolyzer cells." International Journal of Hydrogen Energy, 35(18), 9527-9543.
Wu, et al. (Oct. 2013). "Oxygen Electrode Kinetics and Surface Composition of Dense (La0.75Sr0.25)0.95MnO3 on YSZ." ECS Transactions, 57, 1673-1682.
Xu, et al. (2007) "Structure, electrical conducting and thermal expansion properties of Ln0.6Sr0.4Co0.2Fe0.8O3 perovskite-type complex oxides." Journal of Alloys and Compounds, 429, 34-39.
Yoon, et al. (Oct. 2013) "Electrochemical Investigation of Composite Nano La0.6Sr0.4Co0.2Fe0.8O3-σ Infiltration into LSGM Scaffold Cathode on LSGM Electrolyte." ECS Transactions, 57, 1933-1943.
Zha et al. (2005). "Electrical properties and sulfur tolerance of La0.75Sr0.25Cr1-xMnxO3 under anodic conditions." J. Solid State Chem., 178, 1844 (2005).
Zhang, et al. (2008) "Microwave sintering of plasma-sprayed yttria stabilized zirconia electrolyte coating." Journal of the European Ceramic Society, 2008, 28, 2529-2538.
Zhao, et al.(2010) "Cobalt-free oxide Ba0.5Sr0.5Fe0.8Cu0.2O3-σ for proton-conducting solid oxide fuel cell cathode." International Journal of Hydrogen Energy, 35, 3769-3774.
Zhao, et al. (2010) "Electrochemical performance of novel cobalt-free oxide Ba0.5Sr0.5Fe0.8Cu0.2O3-σ for solid oxide fuel cell cathode." Journal of Power Sources, 195, 1859-1861.
Zhao, et al. (2011) "Microwave-assisted Inorganic Syntheses," in Modern Inorganic Synthetic Chemistry (Xu, Pang and Huo, eds) Elsevier, Amsterdam. Chapter 8, pp. 173-195.
Zhou, et al. (2012) "La0.6Sr0.4Fe0.8Cu0.2O3-σ perovskite oxide as cathode for IT-SOFC." International Journal of Hydrogen Energy, 37, 11963-11968.

\* cited by examiner

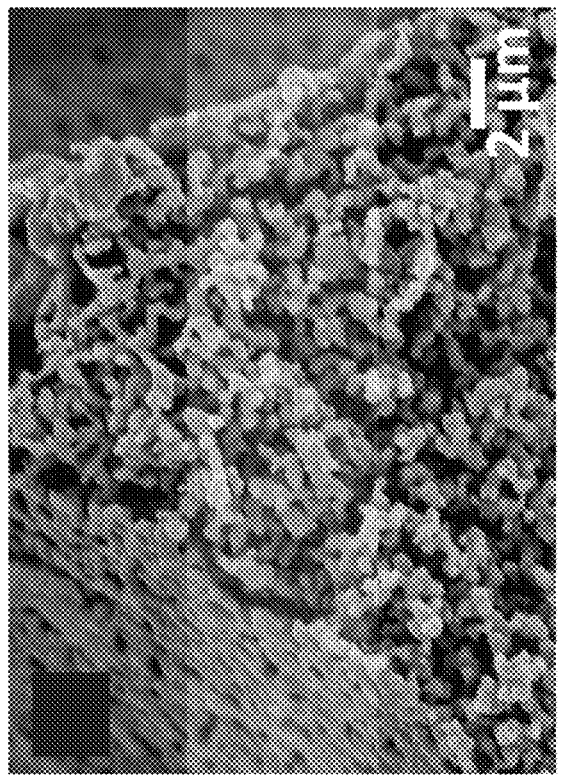
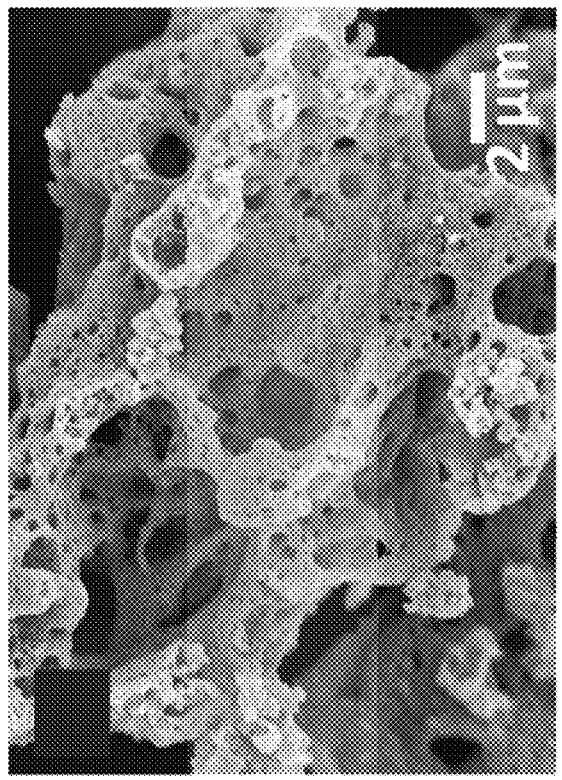
FIG. 11B
FIG. 11A

HIGH PERFORMANCE OXYGEN AND FUEL ELECTRODE FOR REVERSIBLE SOLID OXIDE FUEL CELL APPLICATIONS

CROSS-REFERENCE TO RELATED APPLICATIONS

This application claims the benefit of U.S. provisional application 62/167,532, filed May 28, 2015, which is incorporated by reference herein in its entirety.

BACKGROUND OF THE INVENTION

Solid oxide fuel cells (SOFCs) are electrochemical devices that can convert chemical energy into electrical energy with very high efficiency. SOFCs also have several other advantages over combustion-based technologies, such as fuel flexibility ($H_2$, hydrocarbon-based fuels such as $CH_4$, CO, etc.), low emission of pollutants ($SO_x$ and $NO_x$), and serving to capture $CO_2$ from the anode exhaust stream in high purity form, already separated from $N_2$.

A typical SOFC consists of a dense electrolyte and two porous electrodes, the anode and the cathode. As part of the efforts to develop new energy conversion systems, there is great interest in reversible fuel cells, particularly reversible solid oxide fuel cells (RSOFCs). RSOFCs are single-unit, all-solid-state, electrochemical devices that can operate in both the fuel cell (SOFC) and electrolysis (SOEC) mode, thus acting as flexible energy conversion and storage systems, particularly to store intermittent renewable energy, such as wind or solar. In the SOFC mode, various fuels, such as $H_2$, natural gas, hydrocarbons or syngas, are converted spontaneously with oxygen (e.g., air) at the cathode to electricity and heat. However, when excess electricity is available, the device can be run in the SOEC mode to convert the electrical energy back to chemical energy by the electrolysis of various feedstocks, such as $H_2O$, $CO_2$ or $CO_2+H_2O$ to fuel.

The most common degradation and cell failure issue for RSOFCs arises at the oxygen electrode when the cell is operating in the electrolysis mode (oxygen evolution at the oxygen/air electrode). This is due to delamination of the electrocatalytic material from the electrolyte. The delamination mechanism is not fully understood, but several processes have been postulated, including high oxygen pressure development, morphological changes in air electrodes, and electrolyte grain boundary separation [1-5]. At the fuel electrode, key problems are coking, sulphur poisoning and morphological changes leading to performance loss.

Therefore, there is a need in the art for the development of a mixed conducting oxide (MIEC) that can withstand electrolysis conditions without delamination, while also exhibiting superior oxygen evolution and reduction activities. There is further need in the art for mixed conducting oxides for use at the fuel electrode that exhibit resistance to coking, which retain activity in the presence of sulphur (e.g., $H_2S$) and which exhibit good retention of performance during operation. Additionally, for implementation of RSOFCs, there is a need for MIEC which function efficiently in both the fuel cell (SOFC) and electrolysis (SOEC) mode.

To date, the most common materials used in RSOFCs are essentially the same as those used for SOFC, namely yttria stabilized zirconia (YSZ) as the electrolyte, a Ni—YSZ cermet as the fuel electrode, and a $La_{1-x}Sr_xMnO_3$ (LSM)-YSZ composite as the air electrode. The search for higher performance electrode and electrolyte materials for RSOFCs has been a focus of research in recent years, with a particular emphasis on the development of new air and fuel electrodes. At the air electrode, this has included the development of mixed ionic-electronic conductors (MIECs), such as Fe-based perovskites e.g., $SrFeO_{3-\delta}$, and the use of a variety of cation dopants in both the A and B-sites [6-9]. As an example, $LaCrO_3$ and its doped variants are good candidates for application ascathode materials in SOFCs [10]. Other high performance air electrode materials include $La_{0.6}Sr_{0.4}Co_{0.2}Fe_{0.8}O_{3-\delta}$ (LSCF), which has exhibited a low polarization resistance (Rp) of 0.18 $\Omega cm^2$ at 800° C. [11], $La_{0.6}Sr_{0.4}Fe_{0.8}Cu_{0.2}O_{3-\delta}$ (LSFCu), which has demonstrated a very low Rp of 0.07 $\Omega cm^2$ [12]. An example of a good performing fuel electrode is $La_{0.8}Sr_{0.2}Cr_{0.5}Mn_{0.5}O_3$ (LSCM) (2), which has exhibited a polarization resistance of 0.3 $\Omega cm^2$ in $H_2$ at 800° C. [13].

Recently, Chen et al. [14] have shown very good catalytic activity for both $H_2$/CO oxidation and $O_2$ reduction using the same MIEC material at both electrodes (symmetric electrodes), i.e., $La_{0.3}Sr_{0.7}Fe_{0.7}Cr_{0.3}O_{3-\delta}$ (LSFCr), which was used for the first time as an SOFC electrode. The selected stoichiometry of the material was based on increasing the electronic and ionic conductivity of a Fe-based perovskite by heavy A-site substitution of La by Sr. In addition, partial substitution of Fe at the B site by Cr was done to stabilize the orthorhombic perovskite and its associated high level of vacancy disorder [15].

Herein the performance of derivatives of LSFCr containing calcium, i.e., $La_{0.3}Ca_{0.7}Fe_{0.7}Cr_{0.3}O_{3-\delta}$ (LCFCr), are examined in SOFC. In particular, the use of these MIECs as the oxygen and fuel electrodes in RSOFC is examined Additionally, the resistance of the electrode materials to sulfur is examined.

Usually, MIECs are synthesized by solid-state reactions, where the process involves multiple heating ($\geq 1200°$ C.) and regrinding steps to help overcome the solid-state diffusion barrier [16]. Some of the traditional methods by which MIECs have been prepared include the sol-gel method [6], the EDTA citrate complexing process [12], the auto-ignition process [7], the Pechini method [9], and most commonly, by using combustion methods [14].

The use of microwave (MW) assisted methods in ceramic materials processing has recently become an active area of research, primarily as their properties depend so strongly on the fabrication method employed [46, 69, 70]. MW methods have been shown to enhance the rate of diffusion of ions and atoms in solid-solid reactions by several orders of magnitude, thus shortening reaction times and lowering the reaction temperature [46, 71]. Furthermore, it may be possible to induce interesting changes in particle morphology and sizes using microwave methods (87).

MW-assisted techniques are understood to be environmentally friendly [52] as they require less energy than conventional material processing methods. It is also known that MW sintering of ceramics leads to a more rapid heating rate and a higher efficiency of heating, also resulting in a lower thermal stress gradient due to the local heating of microwaves [53, 72]. The use of MW-assisted processing is relatively new in the domain of SOFCs.

The main features that distinguish microwave synthesis from conventional methods are faster energy transfer rates, i.e., more rapid heating rates, and the selective heating of materials. This leads to a unique temperature distribution within the material when it is heated in a microwave furnace. During conventional heat treatment, energy is transferred to a material through thermal conduction and convection, creating thermal gradients. However, in the case of microwave heating, energy is transferred directly to the material through an interaction of the material at the molecular level with the electromagnetic waves [50]. The most important contribution in microwave heating may be that the dipoles in the material follow the alternating electromagnetic field associated with the microwave, with its rapidly changing electric field (ca. $2.4 \times 10^9$ times per second). The resistance to this movement generates a considerable amount of heat [51, 52], thus leading to more rapid heating rates.

It has been suggested that, the more complex a material is, the more difficult it is to prepare by using microwave-assisted synthesis. In more complex systems, very good diffusion is required to uniformly disperse three or more cations throughout the sample during the synthesis. The usual solution to this problem is to combine microwave irradiation with other methods, such as sol-gel or combustion synthesis, as has been done for the synthesis of complex perovskites, such as $La_{0.8}Sr_{0.2}Fe_{0.5}Co_{0.5}O_3$ or $CaCu_3Ti_4O_{12}$ [16, 53].

MW energy was reported to achieve the sintering of stabilized zirconia in a multimode microwave furnace at 2.45 GHz [73, 74] with sintering temperatures reduced by ca. 100° C. compared to conventional sintering methods, and that a finer grain size was obtained [75]. Gadolinium-doped ceria (GDC) powder was reported to be successfully synthesized using hydrothermal-MW methods with a resulting increase in the ionic conductivity of GDC in comparison with what was achieved using conventional ceramic processing methods [76].

The use of microwaves for the sintering of SOFC electrodes has been reported [77-82]. For example, Jiao et al compared microwave sintering and conventional thermal sintering of anode supports, showing that the anode-supported microwave-sintered cell exhibited a higher initial performance and lower polarization than conventional thermally-sintered cells [77, 80, 82].

There is increasing interest in the art in providing improved methods for processing ceramic materials that provide materials exhibiting desired electronic properties and which reduce fabrication costs. Herein the use of microwave processing for generating certain electrode materials as well as for fabricating the anode-electrolyte-cathode of SOFCs is examined.

SUMMARY OF THE INVENTION

The invention provides electrode material, i.e., electrocatalytic material, having the formula I:

$$La_wM_xFe_yCr_zO_{3-\delta} \quad (I)$$

where:
M is Ca or a mixture of Ca and Sr where the molar ratio of Ca to Sr ranges from 1:1 to 100:1;
w is 0.2 to 0.4;
x is 0.6 to 0.8;
y is 0.6 to 0.8;
z is 0.2 to 0.4;
w=x is 1;
and y=z is 1.
In specific embodiments, M is Ca.
In specific embodiments:
w is 0.27 to 0.33;
x is 0.67 to 0.73;
y is 0.67 to 0.73; and
z is 0.27 to 0.33.
In specific embodiments:
w is 0.29 to 0.31;
x is 0.69 to 0.71;
y is 0.69 to 0.1; and
z is 0.29 to 0.31,
where $\delta$ represents oxygen deficiency In specific embodiments, w is 0.3; x is 0.7; y is 0.7; and z is 0.3.

In specific embodiments, the electrode material is a perovskite of the above formula.

In specific embodiments, M is a mixture of Ca and Sr. More specifically in an embodiment, the molar ratio of Ca to Sr is 1:1. In other embodiments, the molar ratio of Ca to Sr is 2:1, 3:1, 4:1 or 5:1. Yet more specifically, the molar ratio of Ca to Sr is 10:1.

In a preferred embodiment, in the electrode material, M is Ca. In a preferred embodiment, the electrode material is $La_{0.3}Ca_{0.7}Fe_{0.7}Cr_{0.3}O_{3-\delta}$.

In a specific embodiment, the electrode material of the invention has an atomic % composition of;
La (15±0.5),
Ca (34.5±1),
Cr (15±0.5), and
Fe (35±1).

The invention further provides electrodes which comprise an electrode material of this invention. In a specific embodiment, such electrodes are formed as a layer on a solid oxide electrolyte. In a specific embodiment, the electrode is a fuel electrode, particularly for an SOFC or a reversible solid oxide fuel cell. In a specific embodiment, the electrode is an air or oxygen electrode, particularly for an SOFC or an RSOFC.

The invention further provides electrodes which consist of an electrode material of this invention. In a specific embodiment, such electrodes are formed as a layer on a solid oxide electrolyte. In a specific embodiment, the electrode is a fuel electrode, particularly for a solid oxide fuel cell or a reversible solid oxide fuel cell. In a specific embodiment, the electrode is an air or oxygen electrode, particularly for an SOFC or a RSOFC.

The invention further provides electrodes which comprise an electrode material of this invention as the electrocatalytic material of the electrode. Such electrodes may contain other supporting or non-electrocatalytic active materials. In a specific embodiment, such electrodes are formed having at least one layer of electrocatalytic material on a solid oxide electrolyte. In a specific embodiment, the electrode is a fuel electrode, particularly for a solid oxide fuel cell or a reversible solid oxide fuel cell. In a specific embodiment, the electrode is an air or oxygen electrode, particularly for an SOFC or a RSOFC.

In specific embodiments, crystals of the MIEC electrode material of formula I exhibit nanosized twinned domains as assessed in HTREM images. The appearance of these domains is associated with the pseudo-cubic nature of these materials. Furthermore, the presence of such domains avoids the formation of tetrahedral chains and therefore the formation of undesired brownmillerite-type defects.

In specific embodiments, electrode layers range in thickness from 5 nm to 50 micron. In more specific embodiments, electrode layers range in thickness from 5 nm to 1 micron, from 50 nm to 50 micron, from 50 nm to 1 micron, from 1 micron to 10 micron.

In specific embodiments, layers of electrocatalytic material range in thickness from 5 nm to 50 micron. In more specific embodiments, layers of electrocatalytic material range in thickness from 5 nm to 1 micron, from 50 nm to 50 micron, from 50 nm to 1 micron, or from 1 micron to 10 micron.

The invention further provides solid oxide fuel cells having an electrode which comprises an electrode material of the invention.

The invention further provides a reversible solid oxide fuel cell having an electrode which comprises an electrode material of the invention.

The invention also provides methods for generating electricity which comprises operating a solid oxide fuel cell having at least one electrode comprising an electrode material of the invention.

The invention also provides methods for generating electricity and heat or employing electricity to generate a fuel which comprises selectively operating a reversible solid oxide fuel cell having an electrode of the invention comprising an electrode material of the invention to generate electricity or to generate a fuel.

The invention also provides methods wherein the solid oxide fuel cell or reversible solid oxide fuel cell is efficiently operated in the presence of a fuel (e.g., $CO_2$, CO, $H_2$ and $H_2O$) containing hydrogen sulfide In specific embodiments, electrode materials of the invention are prepared by microwave-assisted methods. In particular, electrode materials of the invention are prepared by microwave-assisted combustion, microwave-assisted co-precipitation or a microwave-assisted sol-gel method.

In additional embodiments, a microwave-assisted method for preparing the full SOFC is provided. More specifically, the method includes a step of providing a layer of an anode material on one surface of a solid electrolyte and a step of providing a layer of a cathode material on an opposite surface of a solid electrolyte and sintering the electrolyte with anode and cathode layers by application of microwave energy. In a specific embodiment, the solid electrolyte has thickness of 10 nm to 2 mm. In a more specific embodiment, the solid electrolyte has a thickness of 0.5 to 2 mm. In a more specific embodiment, the solid electrolyte has a thickness of 0.75 to 1.25 mm. In a more specific embodiment, the solid electrolyte has a thickness of 0.9 to 1.1 mm.

In specific embodiments, the electrodes and fuel cells of the invention can exhibit tolerance to sulphur, e.g., up to 10 ppm $H_2S$, present in feed gases. In specific embodiments, the electrodes and fuel cells of the invention can exhibit decreased levels of carbon deposition (coking) compared to currently employed electrode materials.

In an embodiment, the method includes microwave-assisted processing of anode and cathode materials prior to fabrication of the SOFC by application of microwave energy.

In a specific embodiment, the SOFC is a symmetric SOFC wherein the same material is employed for both the cathode and anode. In a specific embodiment, the anode and/or cathode material is a compound of formula I. In a more specific embodiment, the anode and/or cathode material is $La_{0.3}M_{0.7}Fe_{0.7}Cr_{0.3}O_{3-\delta}$. In a specific embodiment, the electrolyte is gadolinium doped ceria (GDC) or yttria stabilized zirconia. In a specific embodiment, the electrolyte has thickness of 10 nms to 2 mm. In a more specific embodiment, the electrolyte has thickness from 10 nm to 50 micron. In a more specific embodiment, the electrolyte has a thickness of 0.5 to 2 mm. In a more specific embodiment, the electrolyte has a thickness of 0.75 to 1.25 mm. In a more specific embodiment, the electrolyte has a thickness of 0.9 to 1.1 mm.

The invention further provides a method for preparation of SOFC and RSOFC cells which comprises sintering a solid oxide fuel cell (SOFC) or a reversible solid oxide fuel cell (RSOFC) by applying a slurry or paste of a first and second electrode material to first and second opposite surfaces of a solid electrolyte to form a first and second electrode layer; and irradiating the resulting solid electrolyte with first and second layers with microwave radiation. More specifically, microwave irradiation is conducted to reach a target temperature ranging from 600 to 900° C. More specifically, microwave irradiation is conducted using a ramp time ranging from 20 to 60 minutes to the target temperature. More specifically, microwave irradiation is maintaining at the target temperature for 15 to 30 minutes. In a specific embodiment, the electrode materials are those of formula I. In a specific embodiment, the solid electrolyte is GDC.

BRIEF DESCRIPTION OF THE DRAWINGS

(FIG. 4A). The impedance response was obtained in stagnant air at the OCP. Equivalent circuit used for data fitting (FIG. 4B)

(FIGS. 8A and 8B). FIG. 8C is a back-scattered electron (BSE) image of the cross-section of the LCFCr/GDC electrode/electrolyte interface in a cell before electrochemical testing.

FIGS. 11A and 11B. SEM images of LCFCr powders formed using (FIG. 11A) microwave-assisted combustion synthesis (Method 2) and (FIG. 11B) microwave-assisted sol-gel synthesis (Method 3).

DETAILED DESCRIPTION OF THE INVENTION

The invention relates to certain mixed metal oxide materials which are useful as the active material in electrodes of solid oxide fuel cells and particularly in reversible solid oxide fuel cells, either as anodes or cathodes, therein. In a specific embodiment, the electrode materials herein can be used to make symmetrical solid oxide fuel cells where the electrode material of the anode is the same as in the cathode. The invention further relates to the use of microwave-assisted processing and microwave sintering for preparation of SOFC electrodes and SOFC.

As is known in the art, solid oxide fuel cells convert energy in fuels to electrical energy and heat. These fuel cells can be operated in reverse (as an electrolyzer) using electrical energy to convert a molecule, such as water, to a fuel, such as hydrogen and $O_2$. Reversible cells operate in both modes. In a SOFC an oxidizing material, typically air or oxygen, is in contact with the cathode of the cell and the fuel is in contact with the anode of the cell. During fuel cell operation, oxygen ions are transported from the cathode to the anode to oxidize the fuel to form water or if carbon monoxide is present to form carbon dioxide. SOFC cells typically operate at temperatures between about 650 to 950° C. The electrodes are electrically connected and operation generates a current between the electrodes. In reverse mode, electrical energy is used to produce oxidant and fuel. A reversible SOFC cell (RSOFC or Solid oxide electroyzer cell [SOEC]) can be operated in both modes. The present invention provides electrode materials that can be used as electrodes (anodes or cathodes or both) in SOFC cells, for example as air or oxygen electrodes, or as electrodes in reversible SOFC cells.

Figure 24:
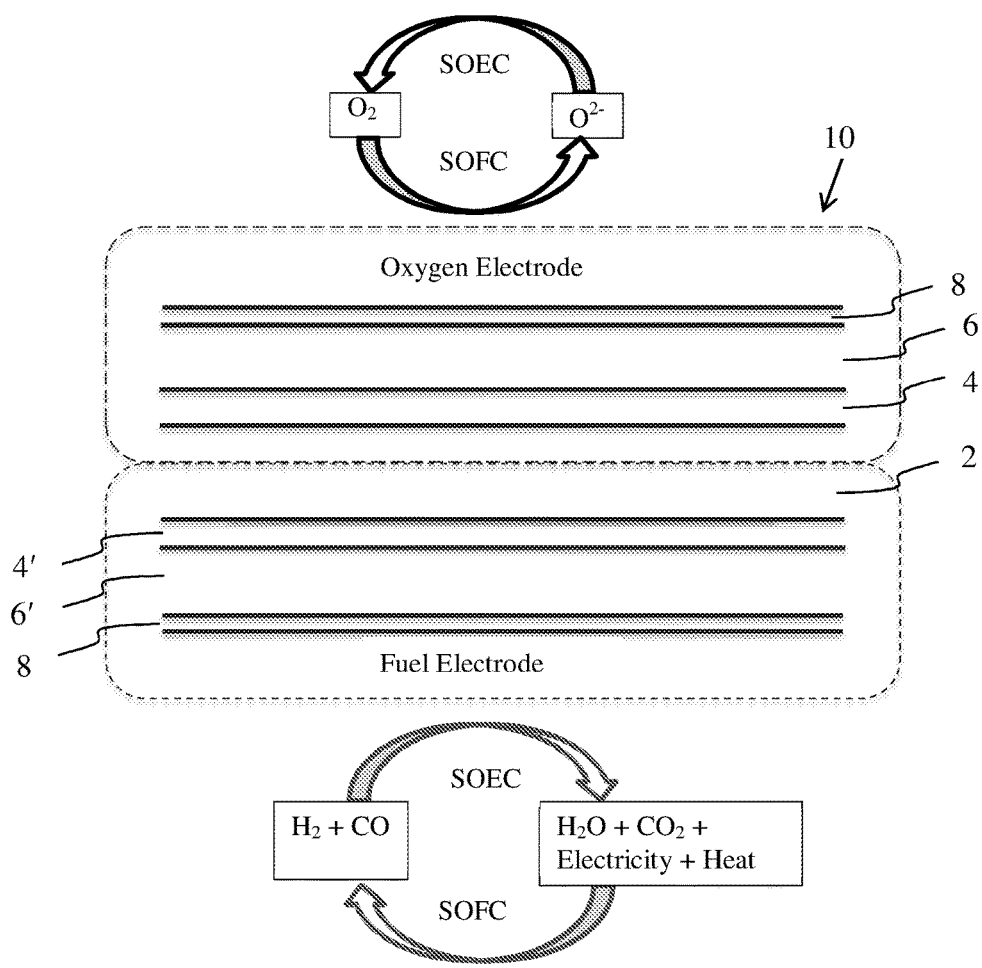
FIG. 24 illustrates an RSOFC of this invention. Exemplary reactions at the oxygen and fuel electrode are shown.

FIG. 24 illustrates an RSOFC (10) of this invention. Exemplary reactions at the oxygen and fuel electrode are shown. The solid electrolyte (2) is positioned between two electrode layers (6 and 6', the oxygen and fuel electrode, respectively). Optional buffer layers may be provided (4 and 4'). Current collector layers are provided for each electrode (8). In a symmetric cell, 6 and 6' are made of the same electroactive material. In the present invention, the electroactive material is am MIEC material of formula I. The optional buffer layers may be of the same or different materials. The optional buffer layer is made of a material that is different from that of the solid electrolyte and the electrode material. In an embodiment, the buffer layers are present. In an embodiment, the buffer materials 4 and 4' are the same materials. Exemplary buffer materials include among others lanthanide-doped ceria, such as samarium-doped ceria, lanthanum-doped ceria or gadolinium-doped ceria.

As is known in the art, a SOFC or RSOFC comprises an anode, a cathode and a dense ionically conductive solid oxygen electrolyte between the anode and the cathode. Optionally, a buffer layer is positioned between the anode and the electrolyte and/or between the cathode and the electrolyte. In an embodiment, the anode and/or the cathode is provided as a layer on one side of a layer of electrolyte, with the other electrode, the cathode or the anode, being provided on the other side of the layer of electrolyte. Oxygen anions pass through the electrolyte layer from the cathode to anode or the reverse, dependent upon the mode in which the cell is operated. The optional buffer can be provided as a layer between the layer of anode material and the electrolyte and/or between the layer of cathode material and the electrolyte. The electrode layers optionally comprise a combination of the MIEC material of formula I with a second MIEC material, wherein the second MIEC material is a minor component, less than 20% by weight of the total weight of electrode. The electrode layer optionally comprises a combination of the MIEC material of formula I with an electronically conductive material (not an MIEC).

In a specific embodiment, the RSOCF cell of FIG. 24 is formed by generating a first and a second electrode layer on opposite surfaces of a dense solid electrolyte. The The RSOCF of FIG. 24 is illustrated in a planar cell configuration. It will be apparent to those of ordinary skill in the art that other cell configurations maintaining the same relative relationship of electrolyte and electrodes can be employed for example, a tubular configuration can be employed where the solid electrolyte is, for example, in the form of a tube or a one-end closed tube.

In an embodiment, SOFC and RSOFC cells of the invention are operated over a temperature range of 600 to 850° C. In other embodiments, the cells are operated over a temperature range of 650- to 800° C. In other embodiments, the cells are operated over a temperature range of 750 to 800° C.

U.S. Pat. No. 8,354,011 relates to reversible electrodes for solid oxide electrolyzer cells (SOEC). This patent provides a description of electrodes for such cells and the operation of such cells. Such a planar configuration can be employed in SOFC and SOEC of this invention. This patent is incorporated herein by reference in its entirety for description of solid electrolytes, anodes and cathodes and methods of making cells. Anodes described therein can be employed in devices of this invention in combination with electrodes described herein.

Chen, M. et al. (2013) J. Power Sources 236:68-79 describes the use of certain Sr-rich chromium ferrites for symmetrical solid oxide fuel cells. In particular, the use of $La_{0.3}Sr_{0.7}Fe_{0.7}C_{0.3}O_{3-\delta}$ is described. The reference is incorporated by reference herein in its entirety for description of the preparation and properties of the electrode materials therein and for descriptions of construction of fuel cells and applications of fuel cells.

U.S. Pat. No. 8,617,763 provides a description of certain SOFC cells and in particular a certain type of anode useful in such cells. Anode, cathode and electrolyte materials described therein can be employed in the devices of the present invention. The reference is incorporated by reference herein in its entirety for description of the preparation and properties of the electrode materials therein and for descriptions of construction of fuel cells and applications of fuel cells.

Electrode materials of the invention are those of formula:

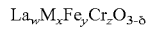

where:
M is Ca or a mixture of Ca and Sr where the molar ratio of Ca to Sr ranges from 1:1 to 100:1;
w is 0.2 to 0.4;
x is 0.6 to 0.8;
y is 0.6 to 0.8;
z is 0.2 to 0.4;
w=x is 1;
and y=z is 1.

A preferred electrode material is $La_{0.3}Ca_{0.7}Fe_{0.7}Cr_{0.3}O_{3-\delta}$. In a particularly preferred embodiment the electrode material is a single phase material having no dectable second or other additional phase. In an embodiment, the electrode material is substantial single phase material, with less than 10% by weight of a second or other additional phase or preferably having less than about 5% by weight of a second or other additional phase and more preferably having less than about 2% by weight of a second or other additional phase In specific embodiments, the electrode material is a perovskite.

Various methods can be employed to prepare the mixed metal oxide compounds of the invention. For example, the following methods can be used:

A. Microwave Method Combined with a Sol-Gel Methodology.

Microwave method and a sol-gel methodology can be combined to make electrode materials of the invention, for example $La_{0.3}Ca_{0.7}Fe_{0.7}C_{0.3}O_{3-\delta}$ (LCFC). Equimolar amounts of metal nitrates are dissolved in distilled water and a saturated polyvinyl alcohol (PVA) solution is added as the complexing agent. The amount of PVA added is such that the ratio of the total number of moles of cations to that of PVA is 1:2. Then the final solution is maintained at 80° C. for 1.5 h to form a viscous gel solution. This gel is then irradiated with microwaves (up to 30 min) in a porcelain crucible placed inside another larger one filled with mullite. The microwave source operates at 2.45 GHz frequency and 800 W power and is uniquely able to handle the conditions needed. The polymeric and sponge-like-precursor is then calcined in air at 1000° C. for 6 h in order to decompose the organic remnants, rendering a black powder as the final product.

B. Microwave-Assisted Combustion

Metal nitrates are mixed in stoichiometric proportions, and then water and glycine are added. The sample is introduced into the microwave furnace at 2.45 GHz frequency and 800 W power for 30 minutes. When the water is evaporated, combustion occurred and a flame is observed inside the microwave furnace for 10 minutes. Then the sample is calcined in air at 900° C. for 6 h in order to decompose the organic remnants, rendering a black powder as the final product.

C. Microwave-Assisted Co-Precipitation

Metal nitrates are mixed in stoichiometric proportion, 25 ml of acetic acid are added, and then the mixture is stirred and heated at 60° C. for 2 hours. When the nitrate vapors are evaporated, a gel formed and then it is introduced into the microwave furnace at 2.45 GHz frequency and 800 W power for 30 minutes, followed by calcination at 900° C.

D. Regular Combustion Method

When synthesized using the regular combustion method (Method 1), the metal nitrates are mixed in stoichiometric proportions and dissolved in deionized water. A 2:1 mole ratio of glycine to the total cation content is used. Solutions are slowly stirred on a hot plate until auto-ignition and self-sustaining combustion occurred. The sample is first ground and then calcined in air at 1200° C. for 12 hours.

The electrode materials of the invention can be employed in any SOFC or RSOFC configurations and are particularly useful in those configurations which employ electrode layers.

Solid electrolytes useful in the invention include stabilized zirconia, including yttrium stabilized zirconia and scandia stabilized zirconia, doped ceria, including gadolidium-doped ceria or samarium-doped ceria, and certain mixed metal oxides such as LSGM (lanthanum strontium gallium magnesium oxide). One of ordinary skill in the art knows how to select solid oxide electrode s appropriate for use in SOFC and RSOFC devices. In a specific embodiment, SOFC and RSOFC of the invention employ a LSGM solid electrolyte with optional buffer layers of lanthanum-doped ceria (LDC) or GDC. In an embodiment, the LSGM is $La_{0.8}Sr_{0.2}Ga_{0.8}Mg_{0.2}O_{3-\delta}$. In a specific embodiment, SOFC and RSOFC of the invention employ a LSGM solid electrolyte with optional buffer layers of lanthanum-doped ceria or gadolidium-doped ceria.

In specific embodiments herein, the SOFC and RSOFC cells are symmetric wherein the anode and cathode materials are the same and are electrode materials of this invention. In alternative embodiments, alternative anode having alternative electrode materials can be used in combination with cathodes having electrode materials of this invention. Alternative anode materials include, among others, perovskite mixed metal oxide materials other than those of this invention, e.g., $La_{0.3}Sr_{0.7}Fe_{0.7}Cr_{0.3}O_{3-\delta}$, cermets having a metal phase, such as a nickel or nickel oxide phase, and a ceramic phase, such as doped ceria (samaria or gadolinium-doped), and/or stabilized zirconia.

In alternative embodiments, alternative cathodes having alternative electrode materials can be used in combination with anodes having electrode materials of this invention. Alternative cathode materials include among others, perovskite mixed metal oxide materials other than those of this invention, e.g., $La_{0.3}Sr_{0.7}Fe_{0.7}Cr_{0.3}O_{3-\delta}$, electron conducting phases (e.g., nickel oxide and magnesium oxide).

One of ordinary skill in the art in view of what is known in the art about electrode materials useful in SOFC or RSOFC application can select among known electrode materials for alternative electrode materials that are useful in combination with the electrode materials of this invention.

Anodes and cathodes may be formed a one or more layers on a surface of a solid electrolyte.

Solid electrolyte can be in a planar layer configuration with one side of the electrolyte layer containing a layer of anode material and the other a layer of cathode material. In symmetric cells the electrode layers are the same materials.

SOFC and RSOFC electrodes are prepared by formation of at least one layer of the electrode material on an appropriate substrate. In a specific embodiment, an electrode is formed by application of a layer of electrode material on a surface of a solid oxide electrolyte material. In a preferred method of preparation of electrodes microwave sintering is employed. The electrode material is screen printed onto the solid oxide electrolyte and it is irradiated at 900° C. for 20 minutes in a Milestone MultiFAST-6 sintering microwave. It was found that the best performance was for the sample irradiated at 900° C. and the cell performance is comparable to the electrodes sintered using conventional furnaces at 1200° C. In an embodiment, microwave power employed for preparation of cells ranges from 1000-1500 W. In an embodiment, MW frequencies ranging from 0.3 to 30 GHZ are employed. In an embodiment, MW frequencies in the range of 2 to 3 GHX are used.

The SOFC and RSOFC of the invention can be formed into stacks, as is known in the art. Stacks of such cells are provided by this invention. U.S. Pat. No. 8,663,869 provides examples of such fuel cell stacks. This reference is incorporated by reference herein in its entirety for description of the preparation of electrodes, construction of fuel cells and fuel cell stacks and applications of fuel cells.

References 43, 54, 84 and 85 provide details of the examples provided herein. These references are specifically incorporated by reference herein for disclosure of experimental details, preparation of electrode materials, construction of RSOFC and SOFC, properties of materials and applications of SOFC and RSOFC.

The invention also provides a microwave-assisted method for preparation of SOFC and RSOFC cells. The method involves sintering of the fuel cells by irradiation with microwave radiation. In embodiments, the frequency of the microwave radiation employed ranges from 0.3 GHz to 30 GHz. In a specific embodiment, the frequency of the microwave radiation employed ranges from 1 to 5 GHZ and more preferably from 2 to 3 GHz. In an embodiment, microwave irradiation was apply to the cell using ramp time ranging from 20 to 60 minutes to target temperatures which range from 600 to 900° C. Once target temperature is reached the microwave irradiation is continued at the target temperature for a selected time. In specific embodiments, the irradiation time at target temperature ranges from 15 to 30 minutes.

Cell construction proceeds by initial coating of a paste or slurry of selected electrode material on a first and opposite second surface of a solid electrolyte. The solid electrolyte is in the form of a dense substrate which can be planar or tubular, for example. To form a symmetrical cell, the same electrode material is provided in a layer on the two opposing surfaces of the electrolyte. In a specific embodiment, the first and second electrode layers are screen printed on the solid electrolyte. In an embodiment, the solid electrolyte with electrode layers is subjected to microwave radiation to sinter the entire cell. In a specific embodiment, the cell is prepared using one microwave irradiation step. In another embodiment, the electrode material is applied to both opposing surfaces of a solid electrolyte, where the two opposing surfaces have already been provided with layers of a buffer material, and the cell is then subjected to one step of microwave irradiation. The cell preparation is optionally conducted with multiple steps of microwave irradiation. For example, in a first step, buffer layers are applied to one or both opposing surfaces of the solid electrolyte and a first step of microwave irradiation is applied as described above. Thereafter, the electode layers are applied to the electrolyte surfaces already containing the one or more buffer layers, where application of electrodes is preferably by screen printing. The multilayer cell is then subjected to a second microwave irradiation to complete sintering of the cell.

In specific embodiments, the electrode material is a material of formula I. In specific embodiments, the target temperature for microwave irradiation is greater than 800° C. In more specific embodiments, the target temperature for microwave irradiation is 900° C. In embodiments, the temperature is ramped to the target temperature over 20 to 40 minutes. In specific embodiments, the temperature is ramped to the target temperature over 25 to 35 minutes. In a specific embodiments, the temperature is ramped to the target temperature over 30 minutes. In an embodiment, once at target temperature, microwave irradiation is continued at the target temperature for 15 to 25 minutes. In a more specific embodiment, microwave irradiation at the target temperature is continued for 20 minutes. Conductive layers are applied to the outer surfaces of the electrodes to provide current collectors. In a specific embodiment, current collectors are made of the same material. In a specific embodiment, the current collector is a layer of Au.

In specific embodiments, the powders used to prepare the electrodes are themselves prepared by microwave-assisted methods. In specific embodiments, the powders used to prepare the solid electrolyte are themselves prepared by microwave-assisted methods. In a specific embodiment, the solid electrolyte is prepared using microwave sintering.

It is noted that the particle size of materials in fuel cells prepared by microwave sintering have a particle size that is smaller than cells prepared by conventional oven sintering. More specifically, in an embodiment, the average particle size of the materials in the fuel cells, and particularly electrode materials, is less than 75 nm. In an embodiment, the average particle size of the matetrials in the fuel cells, and particularly electrode materials, is in the range from 25 to 75 nm and more preferably in the range from 45 to 55 nm.

When a Markush group or other grouping is used herein, all individual members of the group and all combinations and subcombinations possible of the group are intended to be individually included in the disclosure. Every formulation or combination of components described or exemplified can be used to practice the invention, unless otherwise stated. Specific names of compounds are intended to be exemplary, as it is known that one of ordinary skill in the art can name the same compounds differently.

One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

The invention illustratively described herein suitably may be practiced in the absence of any element or elements, limitation or limitations which is not specifically disclosed herein.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

All references throughout this application, for example patent documents including issued or granted patents or equivalents; patent application publications; and non-patent literature documents or other source material; are hereby incorporated by reference herein in their entireties, as though individually incorporated by reference.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

THE EXAMPLES

Example 1

Synthesis and Characterization $La_{0.3}Ca_{0.7}Fe_{0.7}Cr_{0.3}O_{3-\delta}$ (LCFCr) powders were synthesized by the combustion method. Metal nitrate precursors were mixed in stoichiometric proportions and dissolved in deionized water. Glycine (a 2:1 mole ratio of glycine to the total cation content) was added. Mixtures were slowly stirred on a hot plate until auto-ignition and self-sustaining combustion occurred. The sample was then ground and calcined in air at 1200° C. for 12 hours.

Materials were purchased from Alfa Aesar as follows:

Glycine (99.5%); La $(NO_3)_3.6H_2O$ (99.9%); $Sr(NO_3)_2$ (99.0%); $Ca(NO_3)_2$ (99.0%); $Cr(NO_3).9H_2O$ (98.5%); and $Fe(NO_3)_3. 9H2O$ (98-101%).

X-ray diffraction (XRD) patterns of all samples synthesized in this example were collected using a Philips X'Pert PRO ALPHA1 of Panalytical B.V. diffractometer with Cu $K_{\alpha 1}$ monochromatic radiation ($\lambda=1.54056$ Å). The diffractometer was equipped with a primary curved Ge111 primary beam monochromator and a speed X'Celerator fast detector, operating at 45 kV and 40 mA. XRD patterns were collected in the 2θ range of 5-120° at room temperature with a step size of 0.017° and 8 s counting time in order to ensure sufficient resolution for structural refinement.

Powder X-ray Thermodiffraction patterns were collected on an X'Pert PRO MPD diffractometer with a high temperature reactor chamber Anton Paar HTK1200 camera, using Cu Kα radiation. The measurements were carried out at between room temperature and 1100° C. The standard working conditions were a 2θ range of 10-70° with an angle step size of 0.033° and a 25 s counting time. Sample was heated to the target temperatures at a ramp rate of 5° C./min and stabilized in air for 40 min prior to the measurements. After that, the sample was cooled to RT and XRD patterns were acquired again in order to determine the phase stability of the LCFCr material under heating and cooling conditions.

Fullprof Software was employed to carry out structural refinements from conventional XRD patterns using the Rietveld method. This method of refining the powder diffraction data was used to determine the crystal structure. Zero shift, lattice parameters, background, peak width, shape and asymmetry, atomic positions and isotropic temperature factors were all refined. The Thompson-Cox-Hastings pseudo-Voigt convoluted with axial divergence asymmetry function was used to describe the peak shape. Linear interpolation between set background points with refineable heights was used afterwards. The values were refined to improve the agreement factors.

All samples investigated by scanning electron microscopy (SEM) were first sputter-coated with Au in an EMITECH K550 apparatus. Field-emission SEM (FE-SEM) was performed using a JEM 6335 F electron microscope with a field-emission gun operating at 10 kV. The FE-SEM was also equipped with a LINK ISIS 300 detector for the energy-dispersive analysis of the X-rays (XEDS). SEM imaging of the cells and attached electrode layers was carried out using a Zeiss Σigma VP field emission SEM.

High resolution transmission electron microscopy (HRTEM) analysis of the LCFCr powders was performed using a JEOL 3000F TEM, operating at 300 Kv, yielding information limit of 1.1 Å. Images were recorded with an objective aperture of 70 μm centered on a sample spot within the diffraction pattern area. Fast Fourier Transforms (FFTs) of the HRTEM images were carried out to reveal the periodic image contents using the Digital Micrograph package.

Cell Fabrication and Testing

The LCFCr powders obtained from the regular combustion method were milled (high energy planetary ball mill, Pulverisette 5, Fritsch, Germany) in an isopropanol medium at a rotation speed of 300 rpm for 2 h using zirconia balls. The electrolyte-supported symmetrical cell was constructed with a GDC electrolyte (1 mm thick) as the substrate. The electrolyte was fabricated by pressing the GDC powder under 200 MPa pressure and conventional oven sintering at 1400° C. for 4 h. The ca. 30 μm thick LCFCr electrodes were then screen-printed symmetrically (over an area of 0.5 cm$^2$) onto both sides of the GDC support and fired at 1000° C. for 2 h. Au paste (C 5729, Heraeus Inc., Germany) was painted on both of the electrode layers to serve as the current collectors.

Electrochemical measurements to evaluate the cell performance were performed using the 3 electrode technique in air Impedance spectra were collected under open circuit conditions, between 600° C. and 800° C., using an amplitude of 50 mV in the frequency range of 0.01 to 65 kHz using a Solatron 1287/1255 potentiostat/galvanostat/impedance analyzer. Other experiments involved the application of a 0.4 V anodic and −0.4 V cathodic overpotential to the LCFCr working electrode vs. the reference electrode and measuring the current passed through the cell with time. Zview software was used to fit and analyze the impedance data.

X-Ray Diffraction and Rietveld Refinement of LCFCr Powders

Figure 1:
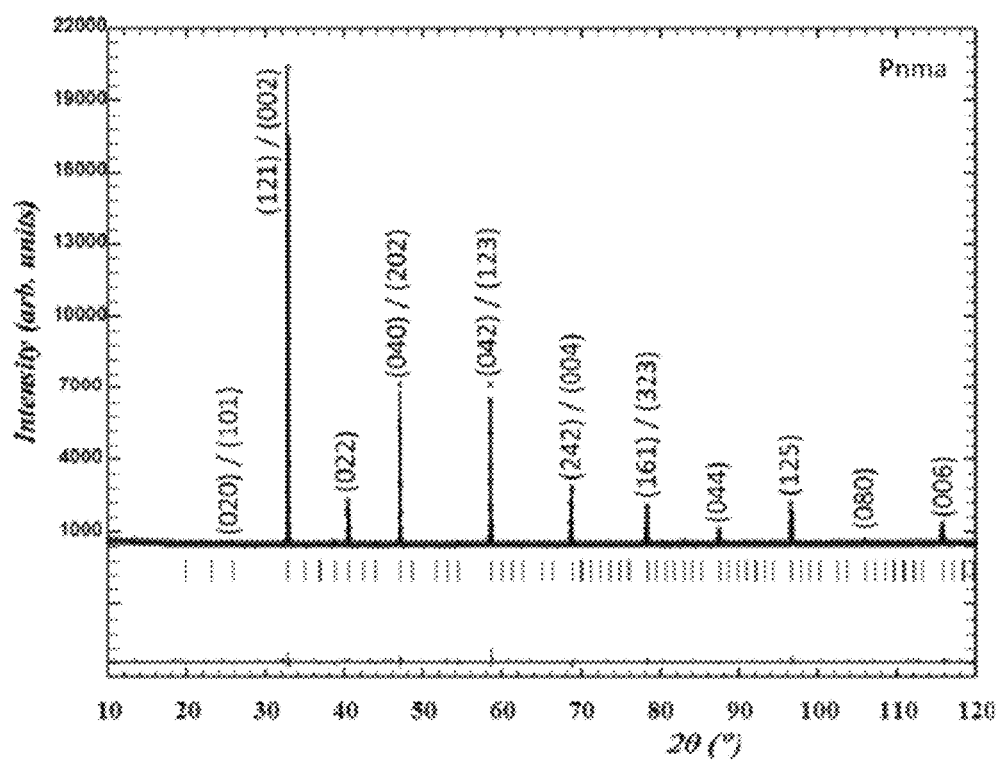
FIG. 1. Rietveld refinement of LCFCr powder (synthesized by the conventional combustion method) X-ray diffraction patterns observed (red dotted lines), refined (black solid lines), and their difference (bottom line). Green vertical bars indicate the X-ray reflection positions.

XRD analysis of the $La_{0.3}Ca_{0.7}Fe_{0.7}Cr_{0.3}O_{3-\delta}$ (LCFCr) powders was performed and structural parameters for LCFCr were obtained from the Rietveld-refined XRD data. The Rietveld refinement indicated that the synthesized LCFCr powders are a pure crystalline phase with an orthorhombic perovskite structure. FIG. 1 shows the Rietveld refinement fits for LCFCr, and a distorted perovskite structure with an orthorhombic symmetry (S.G. Pnma, #62) was confirmed. The unit cell vectors can be represented by $\sqrt{2}a_p \times 2a_p \times \sqrt{2}a_p$, where $a_p$ refers to the simple cubic perovskite cell. The cell parameters were found to be: a=5.4540 (2) Å, b=7.7158(3) Å and c=5.4544(1) Å, while the refinement fit parameters for LCFCr were $\chi^2$=0.96, $R_p$=3.26, $R_{wp}$=4.29, $R_{exp}$=4.37 and $R_{Bragg}$=4. Although the orthorhombic unit cell seems to be pseudo tetragonal, refinements were also performed in the P4/mmm space group, but these yielded higher R values ($\chi^2$=4.03, $R_p$=5.53, $R_{wp}$=8.76, $R_{exp}$=4.37 and $R_{Bragg}$=5.59), while the lattice parameters when using this tetragonal group were: a=b=5.45441(1) Å and c=7.7092(1) Å. Thus, the P4/mmm space group was not used for the LCFCr electrode material.

Figure 2A:
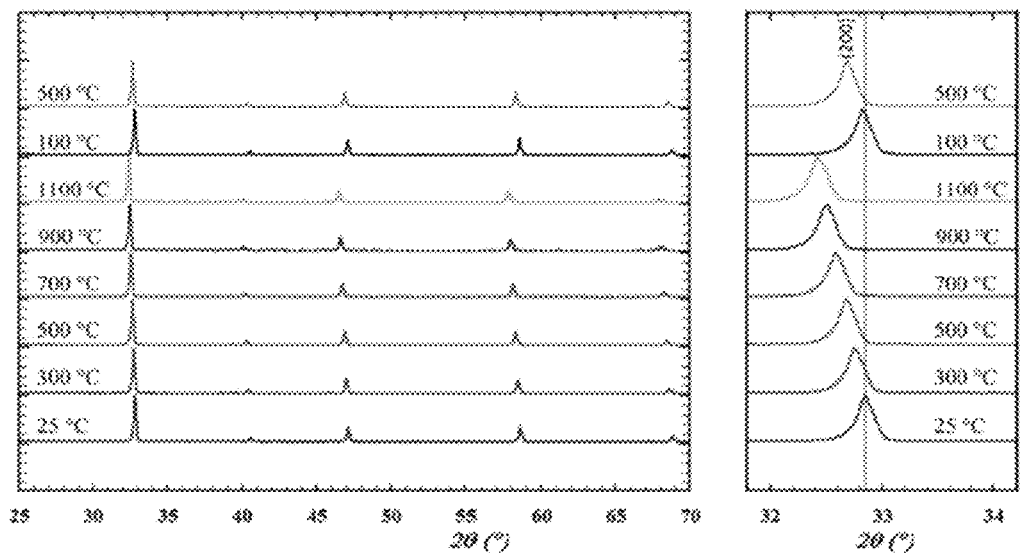
FIGS. 2A and 2B. In situ high temperature XRD patterns from 25-1100° C. in air (FIG. 2A). Cell parameters a, b and c and unit cell volume as a function of temperature (FIG. 2B).
Figure 2B:
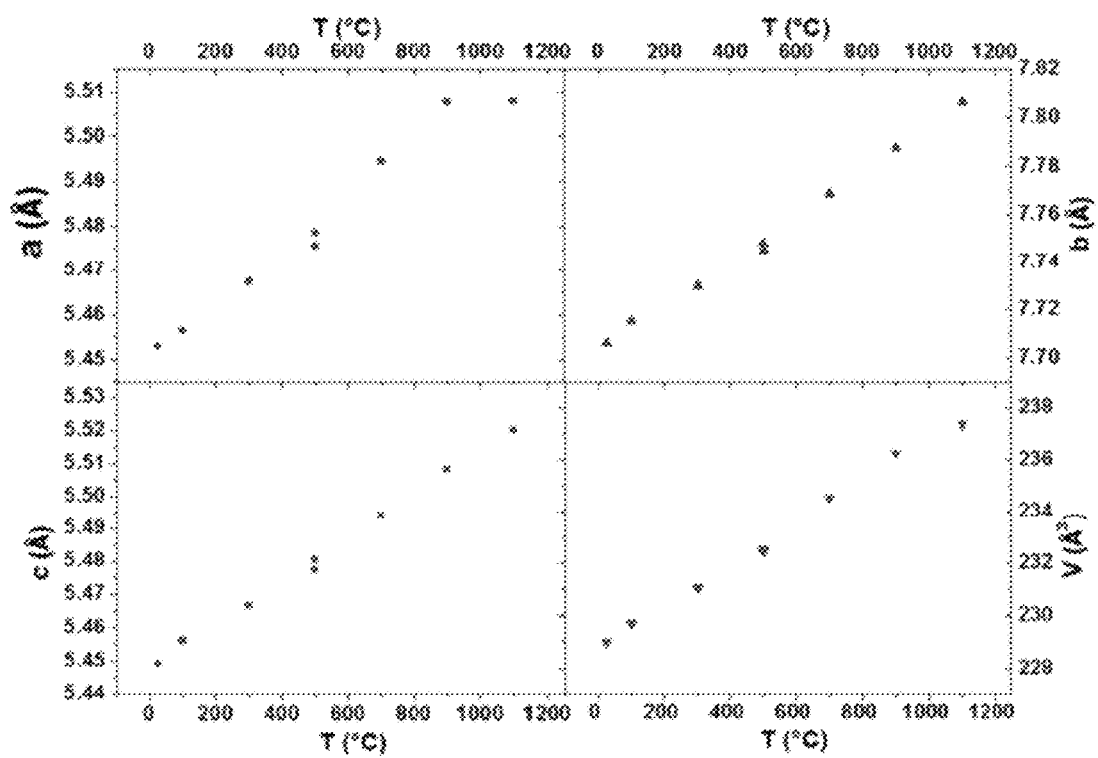

In order to determine the phase stability of the LCFCr material under heating and cooling conditions, in situ high temperature XRD measurements were performed from room temperature to 1100° C., and then back to room temperature again, all in air. FIG. 2A shows that the orthorhombic structure is maintained over the full temperature range up to 1100° C., since peak splitting is not observed. Moreover, a shift of all the characteristics peaks towards lower angles is observed, which indicates an increase in the cell parameters with temperature. FIG. 2B shows the cell parameters a, b and c, as well as the unit cell volume vs temperature, calculated from XRD data (FIG. 2A).

Table 1 shows the average thermal expansion coefficient calculated from the thermal XRD data (FIGS. 2A and 2B), using previously described methods [26]. The average TEC is $11.5 \times 10^{-6}$ K$^{-1}$ for lattice parameter a, and $12.0 \times 10^{-6}$ K$^{-1}$ for lattice parameters b and c. These values are comparable to those reported for the well-known cathode material LSM ($12.2 \times 10^{-6}$ K$^{-1}$) [21-23] and noticeably lower than the TEC values for LSCF ($16.3 \times 10^{-6}$ K$^{-1}$) [21, 24]. The measured TEC values are also considerably lower than those for the Sr-rich perovskite, $La_{0.3}Sr_{0.7}Fe_{0.7}Cr_{0.3}O_{3-\delta}$ (LSFCr), previously developed [14]. More importantly, the measured thermal expansion coefficient (TEC) of LCFCr (Table 1) matches very well with the TEC of ceria ($11.9 \times 10^{-6}$ K$^{-1}$) [11, 21, 25-31], which is an important requirement for minimizing delamination of the electrodes from the electrolyte, and to avoid mechanical failure of the cell.

TABLE 1

Average thermal expansion coefficient (TEC) for LCFCr material, determined by in situ XRD analysis

| Thermal expansion parameters | Average TEC ($\times 10^{-6}$ K$^{-1}$) |
|---|---|
| Lattice parameter (a) | 11.5 (25-1100° C.) |
| Lattice parameter (b) | 12.0 (25-1100° C.) |
| Lattice parameter (c) | 12.0 (25-1100° C.) |

TEM Analysis of LCFCr Powder

Transmission Electron Microscopy (TEM) analysis was also performed on the LCFCr powder material. The cation composition, evaluated semi-quantitatively by X-ray energy dispersive spectroscopy in more than ten single crystals, is in good agreement with the theoretical proportions of the elements in LCFCr, indicating the high purity of the powder. High resolution TEM micrographs recorded along the same zone axis [101] show (FIG. 3) nano-sized twinned domains rotated by 90°. The appearance of these domains can be associated with the pseudo-cubic nature of these materials. The presence of these domains can help to avoid the formation of tetrahedral chains and therefore the formation of brownmillerite-type defects [32]. Typically, raising the temperature leads to a phase transition of brownmillerite to perovskite at high temperatures, accompanied by a conductivity jump [33]. As mentioned earlier, perovskites exhibit a higher ionic conductivity than brownmillerites and hence they are better candidates for air electrodes in RSOFCs.

Figure 4A:
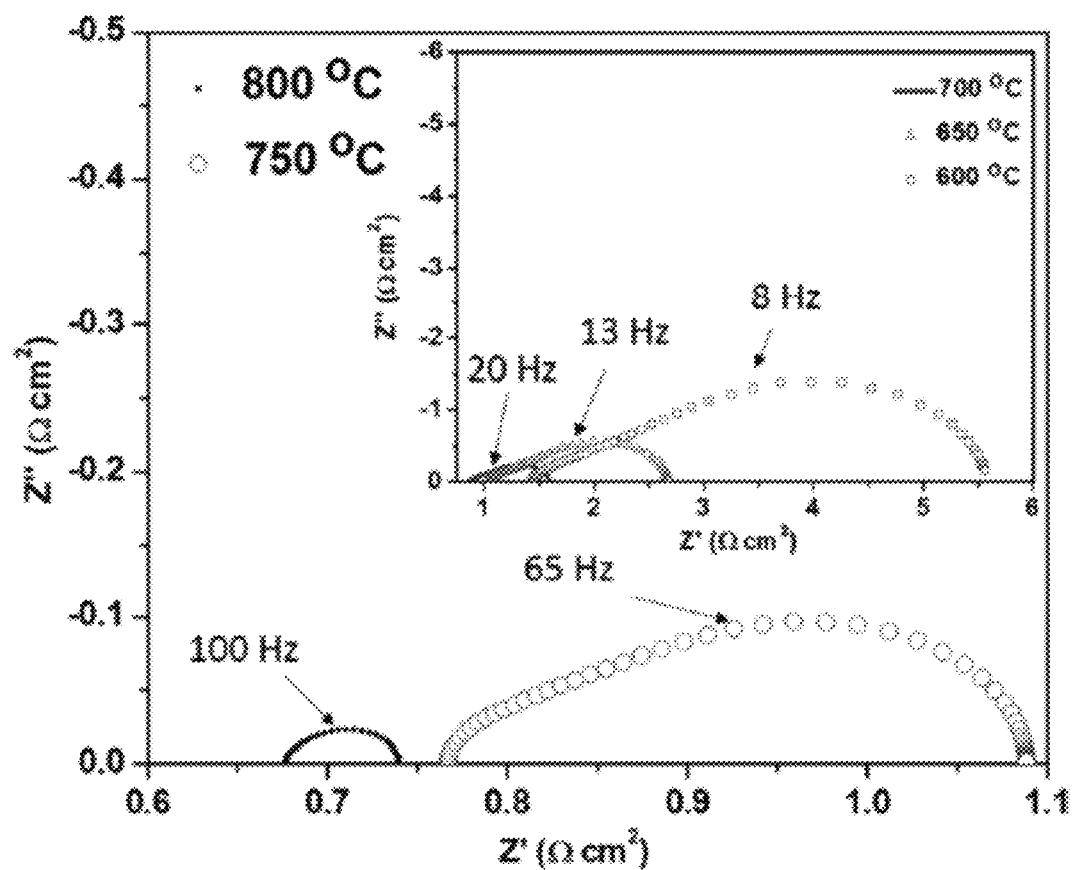
FIGS. 4A and B Impedance spectra of LCFCr at 800° C., 750° C., 700° C., 650° C. and 600° C.
Figure 4B:
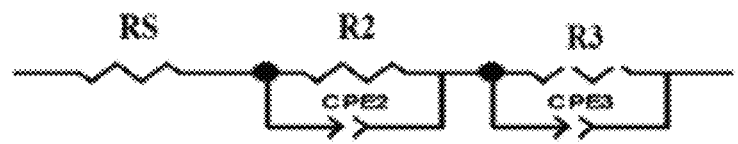

Electrochemical Performance of LCFCr as a Reversible Air Electrode Open Circuit Studies The electrochemical performance of the LCFCr material, synthesized by the regular combustion method, was studied, with the impedance spectra of the LCFCr/GDC/LCFCr symmetrical half cells in air at 800, 750, 700, 650 and 600° C. shown in FIG. 4A, all at the open circuit potential (OCP). From FIG. 4A two separable arcs are visible over the full frequency range. The best-fit equivalent circuit is shown in FIG. 4B, where Rs is the series ohmic resistance, the sum of R2 (high frequency) and R3 (low frequency) is the total polarization resistance (Rp), and the CPEs are constant phase elements. Rs corresponds to the intercepts of the impedance arc with the real axis at high frequencies and arises from the resistance to ion migration within the electrolyte, resistance to electron transport within the cell components, and contact resistances [34]. Rp is the difference between the two real axis intercepts of the impedance arcs and CPE is a component that models the behaviour of a an imperfect capacitor [35], with the associated n parameter being 1 for a perfect capacitor, 0 for a pure resistor, and 0.5 for a Warburg element [36]. The high-frequency arc (R2) corresponds to the charge transfer process and the low-frequency arc (R3) has been attributed previously in the literature [12, 37, 38] to oxygen adsorption and desorption on the electrode surface, combined with the diffusion of the oxygen ions.

As shown in Table 2, the $R_p$ values are very small, 0.07, 0.33, 0.73, 1.67 and 4.24 $\Omega cm^2$ at 800, 750, 700, 650 and 600° C., respectively for LCFCr material. These values are lower than those reported for the well-known cathode material LSCF (0.18 $\Omega cm^2$ at 800° C.) [11, 39]. However, these Rp values are comparable to what was reported for $La_{0.3}Sr_{0.7}Fe_{0.7}Cr_{0.3}O_{3-\delta}$ (LSFCr), studied using a LSGM electrolyte, giving an Rp value of 0.11 $\Omega cm^2$ at 800° C. [14]. In terms of the capacitance values obtained from the cell examined in FIG. 4A, the high-frequency arc (R2) has a CPE-T value of ca. $10^{-1}$ $(F\ s)^{1-n}/cm^2$ and an associated CPE-P value of 0.72, while the low-frequency arc (R3) also has a CPE-T value of ca. $10^{-1}$ $(F\ s)^{1-n}/cm^2$, but an associated CPE-P value of 0.86, very close to that of an ideal capacitor.

Figure 5:
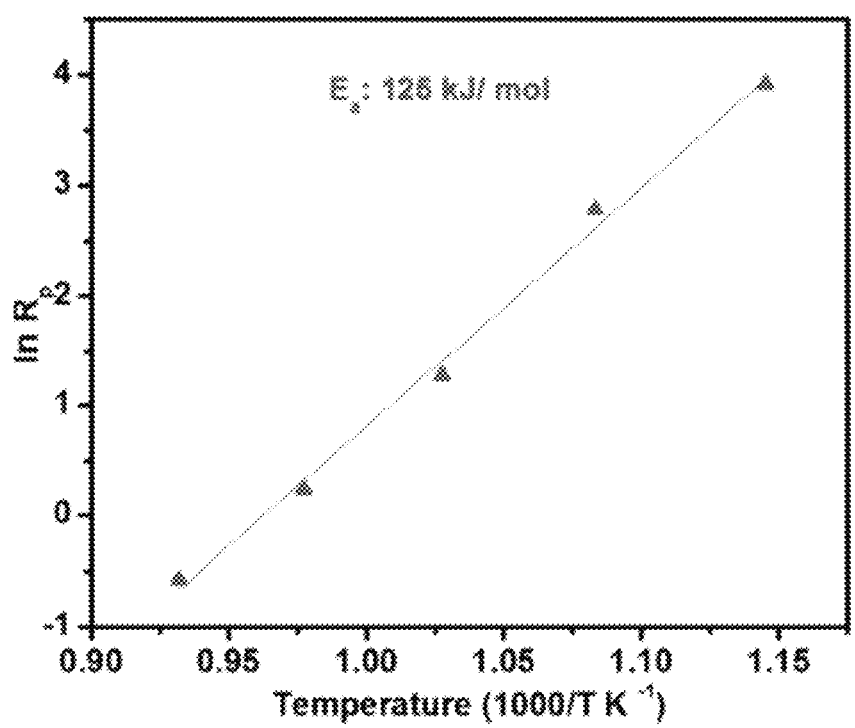
FIG. 5. Arrhenius plot of total polarization resistance (Rp) resistance vs. 1/T for LCFCr air electrode, screen-printed on GDC electrolyte and measured at the OCP in stagnant air over a temperature range of 600-800° C.

The Arrhenius plot of the total OCP polarization resistance for the LCFCr material in air, obtained from the data of FIG. 4A, is presented in FIG. 5. According to the fitting parameters shown in Table 2, the resistance of the low frequency arc is approximately 90% of the total Rp and thus the activation energy associated with this

TABLE 2

Fitting parameters of the impedance data obtained in FIG. 4A

| Temperature | $R_{LF}$ ($\Omega \cdot cm^2$) | CPE-P (LF) | $R_{HF}$ ($\Omega \cdot cm^2$) | CPE-P (HF) | $R_p$ ($\Omega \cdot cm^2$) | Chi-squared |
|---|---|---|---|---|---|---|
| 800° C. | 0.05 | 0.86 | 0.02 | 0.72 | 0.07 | 1.6 × 10−5 |
| 750° C. | 0.21 | 0.52 | 0.12 | 0.71 | 0.33 | 1.1 × 10−4 |
| 700° C. | 0.51 | 0.32 | 0.22 | 0.70 | 0.73 | 3.1 × 10−4 |
| 650° C. | 1.18 | 0.27 | 0.49 | 0.67 | 1.67 | 3.5 × 10−4 |
| 600° C. | 2.99 | 0.22 | 1.24 | 0.61 | 4.24 | 4 × 10−4 | arc will be dominant. As shown in FIG. 5, good linearity of the plot of the polarization resistance versus the inverse of temperature is obtained. The derived activation energy ($E_a$) for the ORR is 125 kJ/mol, which is lower than previously reported for well-known cathode materials, such as LSM (173.7 kJ/mol [40, 41]) and LSCF (178.5 kJ/mol [42]) at the OCP in air. The lower Ea indicates that the LCFCr material is a better catalyst for the ORR than LSM and LSCF. Furthermore, according to the literature, this range of activation energies suggests that oxygen diffusion in the gas phase is one of the slow steps of the reaction [36].

Performance of LCFCr Under Anodic and Cathodic Polarization

To further investigate the medium-term electrochemical stability of the LCFCr air electrode for RSOFC applications, potentiostatic experiments at 800° C., at overpotentials of 0.4 V (OER) and −0.4 V (ORR), were performed for 100 h.

Figure 6:
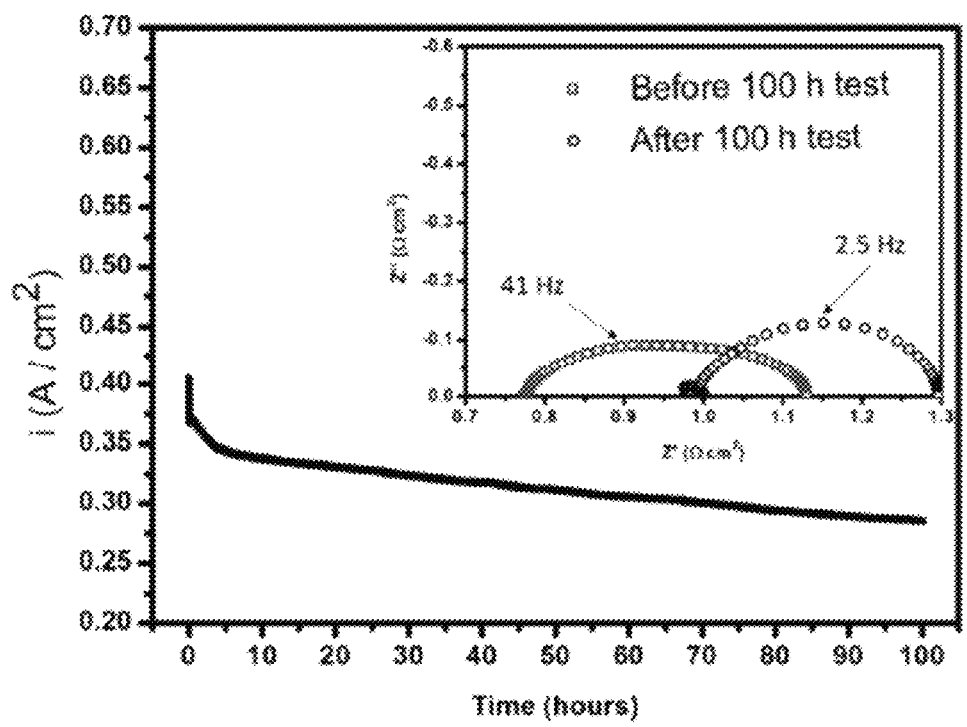
FIG. 6. Potentiostatic response of LCFCr tested at 800° C. and 0.4 V for 100 h in stagnant air. Inset shows the OCP impedance spectra, in air, collected before and after the potentiostatic measurements.

In FIG. 6, a degradation rate of 0.59 mA h$^{-1}$ is seen over 100 h at the anodic 0.4 V overpotential. Impedance measurements, however, show that $R_p$ is very similar before (0.35 $\Omega cm^2$ $\Omega cm^2$) and after (0.30 $\Omega cm^2$) the 100 h test at 0.4 V, demonstrating very good medium-term stability of the LCFCr air electrode performance under typical OER operating conditions.

Figure 7:
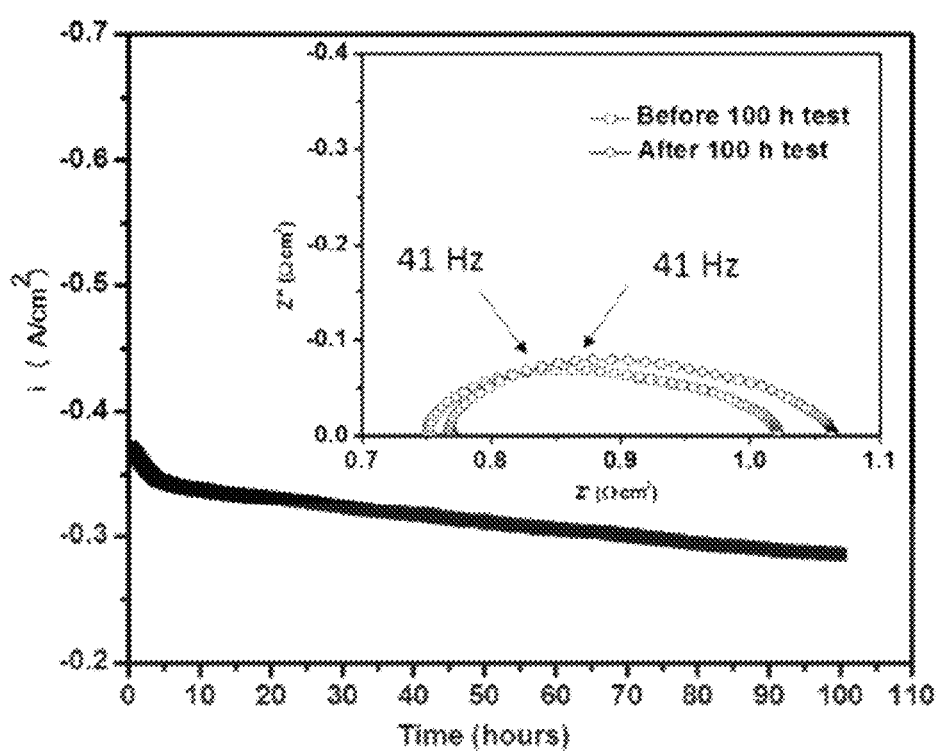
FIG. 7. Potentiostatic response of LCFCr tested at 800° C. and −0.4 V for 100 h in stagnant air. Inset shows the OCP impedance spectra collected before and after the potentiostatic measurements in stagnant air.

These experiments were performed 24 days after commencing cell testing (FIG. 4) and some degradation of the cell performance has clearly occurred, as seen by comparing the results in FIGS. 6 and 7 with those in FIG. 4A. However, the ohmic resistance ($R_s$) is the main cause of this degradation, having changed from 0.77 to 0.99 $\Omega cm^2$, likely due to the sintering of the current collectors. The shift of the summit frequency (41 Hz before testing and 2.58 Hz after testing) may be consistent with the densification of the Au current collector. Thus, the majority of the degradation seen in FIG. 6 is thus due to this increase in Rs. In support of this conclusion, our previously published WDX elemental map studies did not reveal an incompatibility issue between LCFCr and GDC [43].

The medium-term electrochemical stability of the LCFCr air electrode towards the oxygen reduction reaction (ORR) was then investigated at a −0.4 V overpotential, again at 800° C. for 100 h. In FIG. 7, a loss in current of 0.67 mA h$^{-1}$ is seen over this time period, which indicates that LCFCr experiences a slightly faster degradation as an ORR catalyst than during the OER Impedance measurements performed before and after the potentiostatic experiment (FIG. 7) show that $R_p$ increases from 0.25 $\Omega cm^2$ before cathodic polarization to 0.30 $\Omega cm^2$ after the 100 h test at −0.4 V. However, Rs does not change, and, in fact, has the same value as that before the anodic (+0.4 V) polarization experiment in FIG. 6. These observations show that LCFCr performs more poorly as an ORR catalyst than during the OER. Furthermore, the fact that Rs in FIG. 7 has recovered to its original OCP value before anodic polarization (FIG. 6) demonstrates that LCFCr is an excellent air electrode for the OER, and that the loss in performance in FIG. 6 is not permanent (the losses observed here in Rs appear to be reversible). Sintering of the current collectors remains the most likely reason for the increase of Rs with time. Furthermore, it is evident that, when the polarization was switched from +0.4 V (FIG. 6) to −0.4 V (FIG. 7), Rs fully recovered. Thus, it is plausible that dewetting of the gold current collector, which may have occurred as a result of sintering at +0.4 V, may have reversed upon the change of polarization direction. This is consistent with the known effect of electrical potential on interfacial tensions [44, 45].

Overall, the LCFCr material is seen to be an excellent air electrode, giving Rp values in the range or even lower than the best SOFC cathode materials discussed in the literature in this temperature range. For example, LSCF has exhibited an Rp value of 0.18 $\Omega cm^2$ at the OCP [11] and LSFCu an Rp of 0.07 $\Omega cm^2$, both at 800° C. [12].

Cell Microstructure

Figure 8A:
FIGS. 8A-8C. Back-scattered electron (BSE) images of the cross-section of the LCFCr/GDC electrolyte interface after 100 hours of cell testing at 0.4 V anodic and cathodic overpotential at 800° C.
Figure 8B:
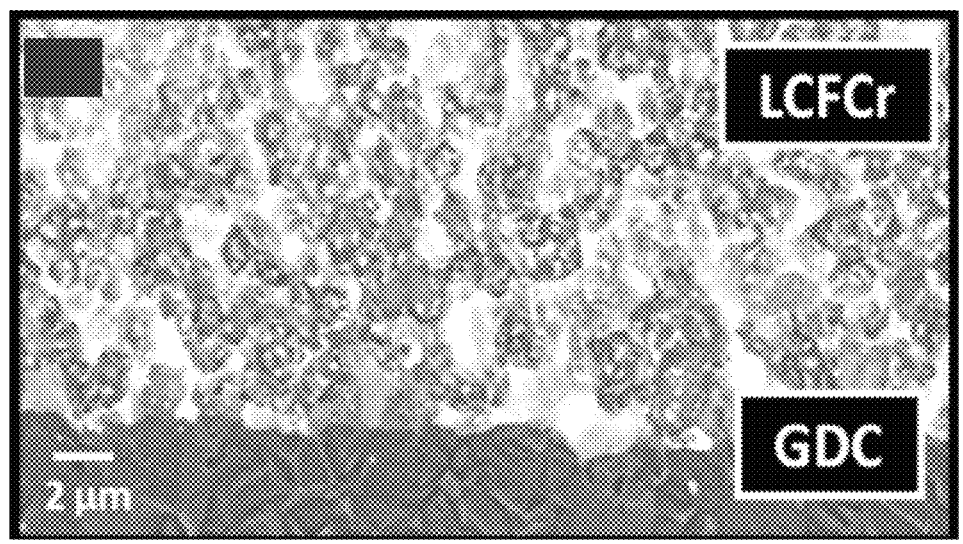
Figure 8C:
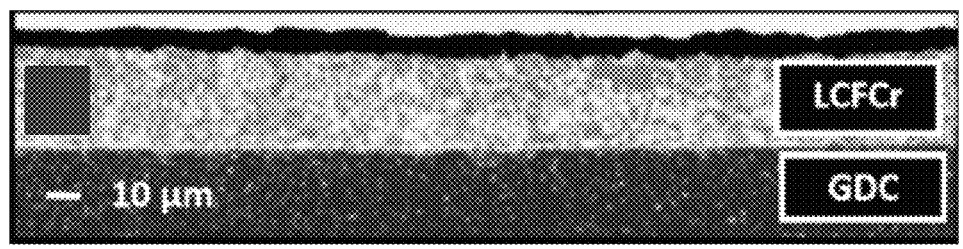

The typical microstructure of the cell, examined by back-scattered SEM, is shown after electrochemical testing in FIGS. 8A and 8B. The cell consists of a 1 mm dense GDC electrolyte layer, with only one of the two LCFCr electrode layers (~30 µm thick) shown. A gold current collector layer is shown in the image (white phase in FIG. 8A), The LCFCr layer displays very good porosity at higher magnification (FIG. 8B). For comparison, FIG. 8C shows a somewhat higher magnification image (compared to that in FIG. 8A) of the microstructure and the interface of a cell before electrochemical analysis.

The LCFCr/GDC interface after cell testing at both 0.4 V and −0.4 V, each for 100 h, is seen in FIGS. 8A and 8B to have retained a continuous good contact between the LCFCr electrodes and the GDC electrolyte, with no delamination or cracking detected. Delamination of the oxygen electrode from the electrolyte is the most common degradation and cell failure issue for high temperature electrolysis cells [2]. The LCFCr-based symmetrical cell did not show any electrode delamination (FIG. 8B) after long times under both anodic and cathodic polarization.

In this example, Ca was substituted for Sr in the A site of $La_{0.3}Sr_{0.7}Fe_{0.7}Cr_{0.3}O_{3-\delta}$ (LSFCr), to produce the mixed conducting perovskite material $La_{0.3}Ca_{0.7}Fe_{0.7}Cr_{0.3}O_{3-\delta}$ (LCFCr). LCFCr was prepared using the combustion method. XRD analysis showed that the LCFCr powders are a pure crystalline phase, also confirmed by TEM analysis, with an orthorhombic perovskite structure. It was also shown that the average TEC values match closely with that of gadolinium-doped ceria (GDC), the electrolyte used here.

Electrochemical measurements showed very good performance with open circuit potential (OCP) polarization resistances (Rp) comparable to what has been reported for other well-known perovskites, used in air, at 600-800° C. Further, the activation energy of the oxygen reaction at LCFCr, at the OCP, was found to be lower than literature values for other well-known air electrodes. Investigation of the medium-term electrochemical stability of the LCFCr air electrode towards the OER (0.4 V) and ORR (−0.4 V) at 800° C. for 100 h showed that Rp hardly changes during the OER, but increases by ca. 20% during the ORR. SEM imaging of the LCFCr/GDC interface showed no delamination or other forms of physical degradation of the cell after 100 hours at both 0.4 V and −0.4 V.

Example 2: Microwave-Assisted Synthesis of LCFCr

In this example, alternative powder processing methods are examined, with a primary focus on microwave-based synthesis that could both lower material manufacturing costs and further enhance cathode performance for solid oxide fuel cell applications. $La_{0.3}Ca_{0.7}Fe_{0.7}Cr_{0.3}O_{3-\delta}$ (LCFCr), formed using conventional solid-state methods (Example 1), has been shown a useful catalyst for the oxygen reduction reaction. To further increase its performance in such applications, microwave methods were used to increase the surface area of LCFCr and to decrease the processing time. It was found that the material could be obtained in crystalline form in only 8 hours, with the synthesis temperature lowered by roughly 300° C. as compared to conventional oven methods.

Mixed ionic and electronic conducting oxides (MIEC), are of interest as more durable as cathodes than conventional $La_{1-x}Sr_xMnO_3$ (LSM) materials. MIECs are usually synthesized by solid-state reactions, where the process involves multiple heating (≥1200° C.) and regrinding steps to help overcome the solid-state diffusion barrier [16, 46]. The sol-gel method [47], the EDTA citrate complexing process [12], the auto-ignition process [7], the Pechini method [9], and most commonly, combustion methods [14] have been used to prepare MIECs.

In this example, the synthesis and characterization of LCFCr, formed using three different methods, regular combustion (Method 1), microwave-assisted combustion (Method 2), and microwave-assisted sol-gel synthesis (Method 3) is compared. A single phase material can be successfully synthesized using microwave-assisted methods and the calcination temperature can be lowered by 200-300° C. using this approach.

Material Synthesis $La_{0.3}Ca_{0.7}Cr_{0.3}Fe_{0.7}O_{3-\delta}$ (LCFCr) powders were synthesized using three different methods, the regular combustion method (Method 1, Example 1), microwave-assisted combustion (Method 2), and microwave-assisted sol-gel synthesis (Method 3). The combustion method described in Example 1 was used as Method 1.

LCFCr powders were also synthesized by microwave-assisted combustion (Method 2). Here, the metal nitrates and glycine were dissolved in deionized water using the metal cation proportions required to generate the correct oxide stoichiometry. A 2:1 mole ratio of glycine to the total metal content was used. The stirred solutions were introduced into the microwave furnace and exposed to a 2.45 GHz frequency and 800 W power for 30 minutes. When the water had evaporated, combustion occurred. The sample was then calcined in air at 700° C., 900° C. and 1000° C. for 8 h in order to decompose the organic remnants, rendering a black powder as the final product.

In Method 3, microwave energy and a sol-gel methodology were combined to produce the LCFCr powders, with the metal cation proportions used based on the desired stoichiometry. Metal nitrates were dissolved in distilled water and a saturated polyvinyl alcohol (PVA) solution was added to serve as the complexing agent. The amount of PVA added was such that the ratio of the total number of moles of cations to that of PVA was 1:2. Then the final solution was maintained at 80° C. for 1.5 h to form a viscous gel. The gel was then microwave irradiated (up to 30 min) in a porcelain crucible placed inside another larger crucible filled with mullite. The microwave source operated at a 2.45 GHz frequency and 800 W power. The polymeric and sponge-like-precursor was then calcined in air at 700° C., 900° C. and 1000° C. for 8 h in order to decompose the organic remnants, rendering a black powder as the final product.

Material Characterization

X-ray diffraction (XRD) patterns of samples synthesized in this example were collected using a Philips X'Pert PRO ALPHA1 of Panalytical B.V. diffractometer with Cu $K_{\alpha 1}$ monochromatic radiation ($\lambda$=1.54056 Å) as described in Example 1.

Fullprof Software was employed to carry out structural refinements from conventional XRD patterns using the Rietveld method again as described in Example 1.

Scanning electron microscopy (SEM) was carried out as described in Example 1.

High resolution transmission electron microscopy (HR-TEM) analysis of the LCFCr powders was performed as described in Example 1. The experimental HRTEM images were also compared to simulated images using MacTempas software. These computations were performed using information from the structural parameters, obtained from the Rietveld refinement, the microscope parameters, such as microscope operating voltage (300 kV) and spherical aberration coefficient (0.6 mm), and specimen parameters, such as zone axis and thickness. The defocus and sample thickness parameters were optimized by assessing the agreement between model and data.

Figure 9A:
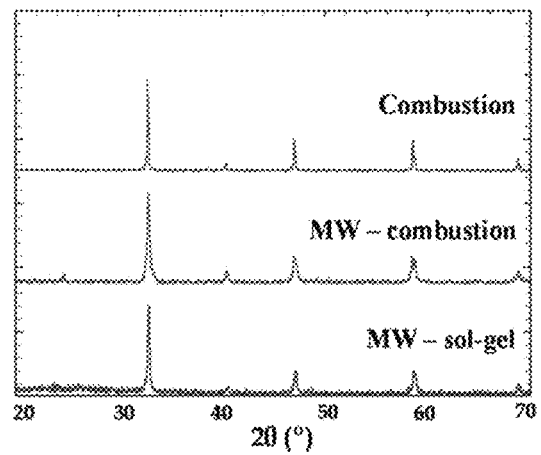
FIGS. 9A-C. Comparison of XRD patterns of LCFCr, synthesized by (FIG. 9A) the regular combustion method (Method 1) and two microwave-related methods, (FIG. 9B) by the microwave-combustion method (Method 2), and (FIG. 9C) by the microwave-assisted sol-gel method (Method 3) and calcined at three different temperatures, 700° C., 900° C. and 1000° C.

Microwave-Assisted Synthesis of LCFCr Powders: X-Ray Diffraction and Rietveld Refinement FIG. 9A shows the XRD patterns of the LCFCr powders synthesized by the combustion method (Method 1), as well as by microwave-assisted combustion (Method 2), and microwave-assisted sol-gel synthesis (Method 3). The diffraction patterns show that a pure crystalline phase is obtained for all three synthesis methods Importantly, the temperature used did not exceed 1000° C., and without the use of microwave methods, the normal temperature that would have been needed to achieve the same result is 1200° C.

Figure 9B:
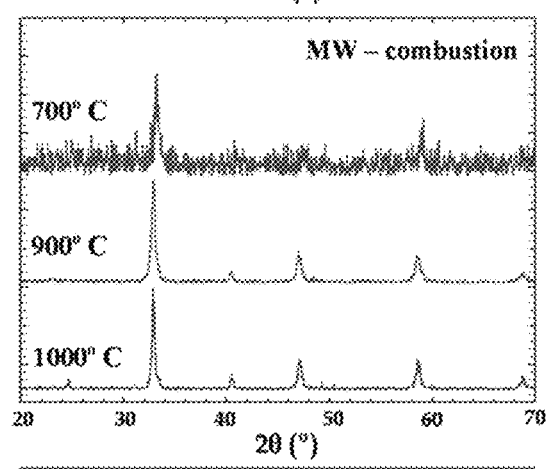
Figure 9C:
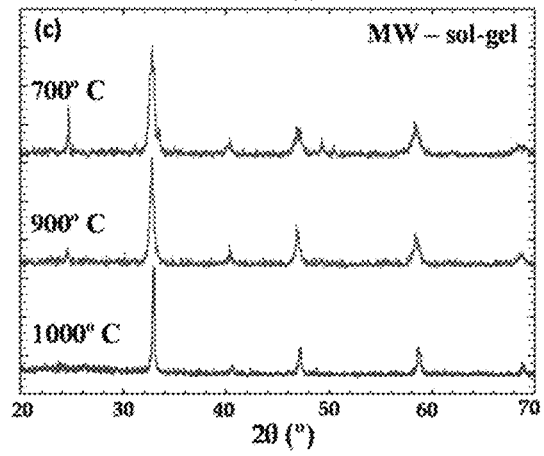

FIG. 9B shows the XRD patterns for the material synthesized by the microwave-combustion method (Method 2) and calcined at three different temperatures. It can be seen that, at 700° C., the phase is already forming and at 900° C., the crystalline phase for LCFC has formed. FIG. 9C shows the XRD patterns for the material synthesized by the microwave-assisted sol-gel (Method 3) and calcined at the same temperatures. It can be seen that, at 700° C. and 900° C., the desired phase is already forming and similar to Method 2, at 1000° C., the desired product is present in the pure form.

Figure 10A:
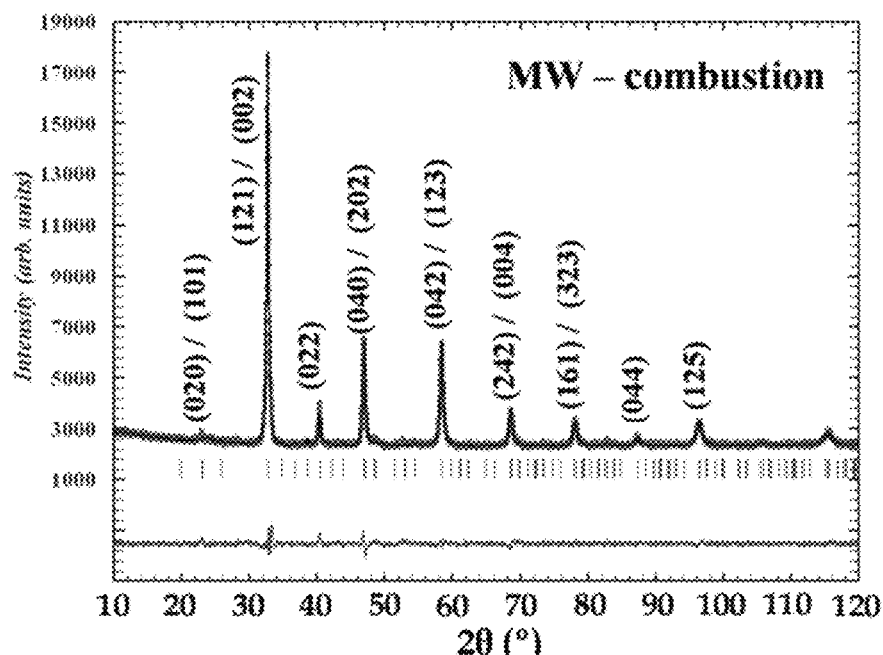
FIGS. 10A and 10B. Rietveld refinement of powder X ray diffraction patterns for LCFCr observed (red dotted lines), refined (black solid lines), and their difference (bottom line). Vertical bars indicate the X-ray reflection positions. The patterns are for LCFCr powder (FIG. 10A) synthesized by the microwave-combustion method (Method 2) and (FIG. 10B) by the microwave-assisted sol-gel method (Method 3).
Figure 10B:
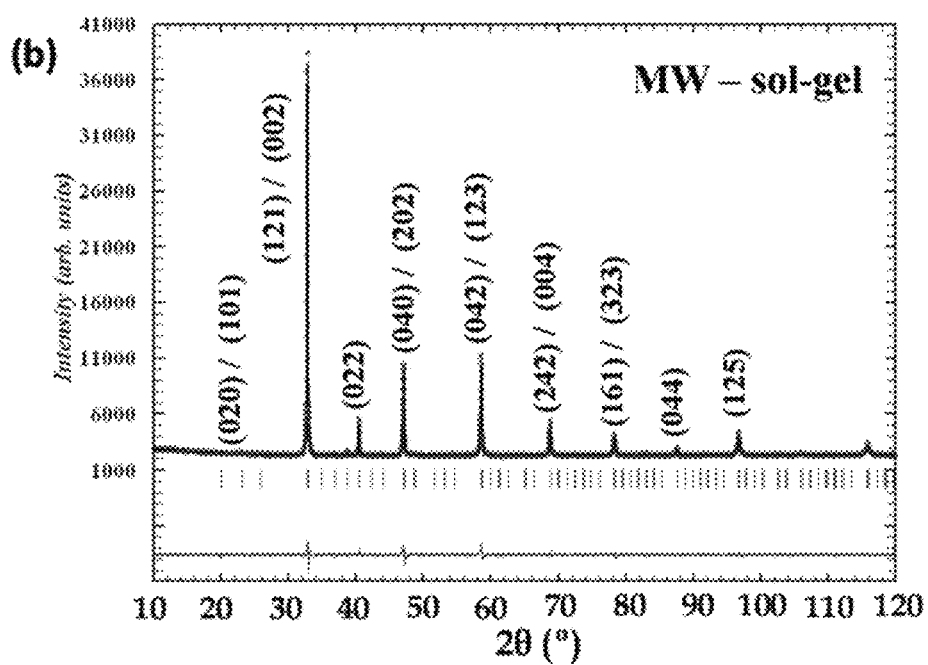

FIGS. 10A and 10B show the Rietveld refinement fits, respectively, for the LCFCr samples produced by microwave-combustion method (Method 2, FIG. 9B) and synthesized by the microwave-assisted sol-gel synthesis (Method 3, FIG. 9C). The Rieltveld refinement for the LCFCr powders synthesized by the regular combustion method (Method 1) is discussed in Example 1. A distorted perovskite structure with an orthorhombic symmetry (S.G. Pnma, #62) was confirmed for both samples. The unit cell vectors can be represented by $\sqrt{2}a_p \times 2a_p \times \sqrt{2}a_p$, where $a_p$ refers to the simple cubic perovskite cell. The results obtained for both samples concerning the cells parameters and the atomic positions are summarized in Table 3.

Microstructural Analysis of LCFCr Powders Synthesized Using Microwave-Assisted Methods.

Scanning (SEM) and Transmission Electron Microscopy (TEM)

FIGS. 11A and B show the SEM images of LCFCr powders formed, respectively, using microwave-assisted combustion synthesis at 900° C. (Method 2, FIG. 11A) and microwave-assisted sol-gel synthesis and (Method 3, FIG. 11B). As can be seen, in both cases, the material has a porous morphology, which makes it a good candidate as an electrode material. A sponge-like porous morphology can be observed for the powders formed using Method 2 (FIG. 11A) which is the typical morphology found after combustion processes. The sponge-like porous morphology from Method 2 is quite different from the morphology obtained using the sol-gel method (Method 3, FIG. 11B) which consists of quite homogeneous agglomerated particles (approximate size 400 nm).

TABLE 3

Structural parameters for LCFCr obtained from Rietveld refined XRD data.

| | LCFCr | | |
|---|---|---|---|
| | Conventional combustion (method 1) | MW - combustion (method 2) | MW - Sol-gel (method 3) |
| a (Å) | 5.4550 (2) | 5.4615 (8) | 5.4476 (4) |
| b (Å) | 7.7128 (1) | 7.7470 (7) | 7.7194 (2) |
| c (Å) | 5.4552 (2) | 5.4619 (7) | 5.4504 (4) |
| La/Ca position 4c: | | | |
| X | 0.0145 (6) | 0.01959 (7) | 0.0151 (6) |
| Z | −0.003 (3) | −0.003 (1) | −0.0062 (7) |
| Occ (La/Ca) | 0.30 (1)/0.70 (1) | 0.30 (1)/0.70 (1) | 0.30 (1)/0.70 (1) |
| U * 100 (Å$^2$) | 0.40 (3) | 0.44 (4) | 0.52 (2) |

TABLE 3-continued

Structural parameters for LCFCr obtained from Rietveld refined XRD data.

| | LCFCr | | |
|---|---|---|---|
| | Conventional combustion (method 1) | MW - combustion (method 2) | MW - Sol-gel (method 3) |
| Fe/Cr position 4b: | | | |
| Occ (Fe/Cr) | 0.70 (1)/0.30 (1) | 0.70 (1)/0.30 (1) | 0.70 (1)/0.30 (1) |
| U * 100 (Å$^2$) | 0.35 (2) | 0.32 (3) | 0.43 (2) |
| O (1) position 4c: | | | |
| X | 0.502 (2) | 0.503 (4) | 0.501 (3) |
| Z | 0.105 (2) | 0.106 (4) | 0.106 (4) |
| Occ | 1.00 (1) | 1.00 (1) | 1.00 (1) |
| U * 100 (Å$^2$) | 0.44 (2) | 0.27 (3) | 0.41 (5) |
| O (2) position 8d: | | | |
| X | 0.297 (4) | 0.256 (2) | 0.257 (3) |
| Y | 0.003 (4) | 0.005 (3) | 0.005 (2) |
| Z | −0.254 (3) | −0.31 (2) | −0.30 (3) |
| Occ | 1.00 (1) | 1.00 (1) | 1.00 (1) |
| U * 100 (Å$^2$) | 0.33 (2) | 0.27 (3) | 0.41 (5) |
| $\chi^2$ | 1.25 | 1.58 | 1.74 |
| $R_{wp}/R_{exp}$ (%/%) | 4.88/4.37 | 2.42/1.96 | 2.65/2.01 |
| $R_{Bragg}$ | 7.30 | 3.83 | 5.11 |

S.G. Pnma: 4c (x ¼ z), 4b (0 0 ½), 8d (xyz)

Further characterization of the material obtained by microwave-assisted sol-gel synthesis (Method 3) at 1000° C. and microwave-assisted combustion synthesis at 900° C. (Method 2) was performed. Table 4 gives the elemental analysis of the materials, obtained from the regions in the squares in FIGS. 11A and 11B. Table 4 shows the atomic percentage of each component in the catalysts. The second column of results corresponds to the microwave-assisted combustion synthesis (Method 2) and the third column corresponds to microwave-assisted sol-gel synthesis (Method 3). The atomic percentage observed by EDX is comparable to the theoretical values, based on the expected stoichiometry of $La_{0.3}Ca_{0.7}Fe_{0.7}Cr_{0.3}O_{3-\delta}$. Table 5 provides the specific surface areas of LCFCr powders formed by Method 1 and Method 2.

TABLE 4

EDX-determined composition (atomic %) of LCFCr powders, formed by microwave-assisted combustion (Method 2) and microwave-assisted sol-gel synthesis (Method 3) approaches Atomic % composition of $La_{0.3}Ca_{0.7}Fe_{0.7}Cr_{0.3}O_{3-\delta}$

| | MW & comb | MW & sol-gel | Theoretical |
|---|---|---|---|
| La | 16 ± 0.5 | 16 ± 0.5 | 15 |
| Ca | 35 ± 0.5 | 34 ± 0.5 | 35 |
| Cr | 15 ± 0.5 | 15 ± 0.5 | 15 |
| Fe | 34 ± 0.5 | 36 ± 0.5 | 35 |

TABLE 5

Specific surface areas of LCFCr powders formed by regular combustion (Method 1) and Microwave-assisted combustion (Method 2)

| Sample | $S_{BET}$ (m$^2$g$^{-1}$) |
|---|---|
| Regular Combustion (Method 1) | 0.89 |
| Microwave-assisted Combustion (Method 2) | 10.4 |

Transmission Electron Microscopy analysis was also performed on the LCFCr powder obtained using the different synthetic methods described above. The cation composition, measured semi-quantitatively by X-ray energy dispersive spectroscopy in more than ten single crystals is in good agreement with the theoretical proportions in $La_{0.3}Ca_{0.7}Cr_{0.3}Fe_{0.7}O_{3-\delta}$, confirming the high purity of the powder.

Figure 3:
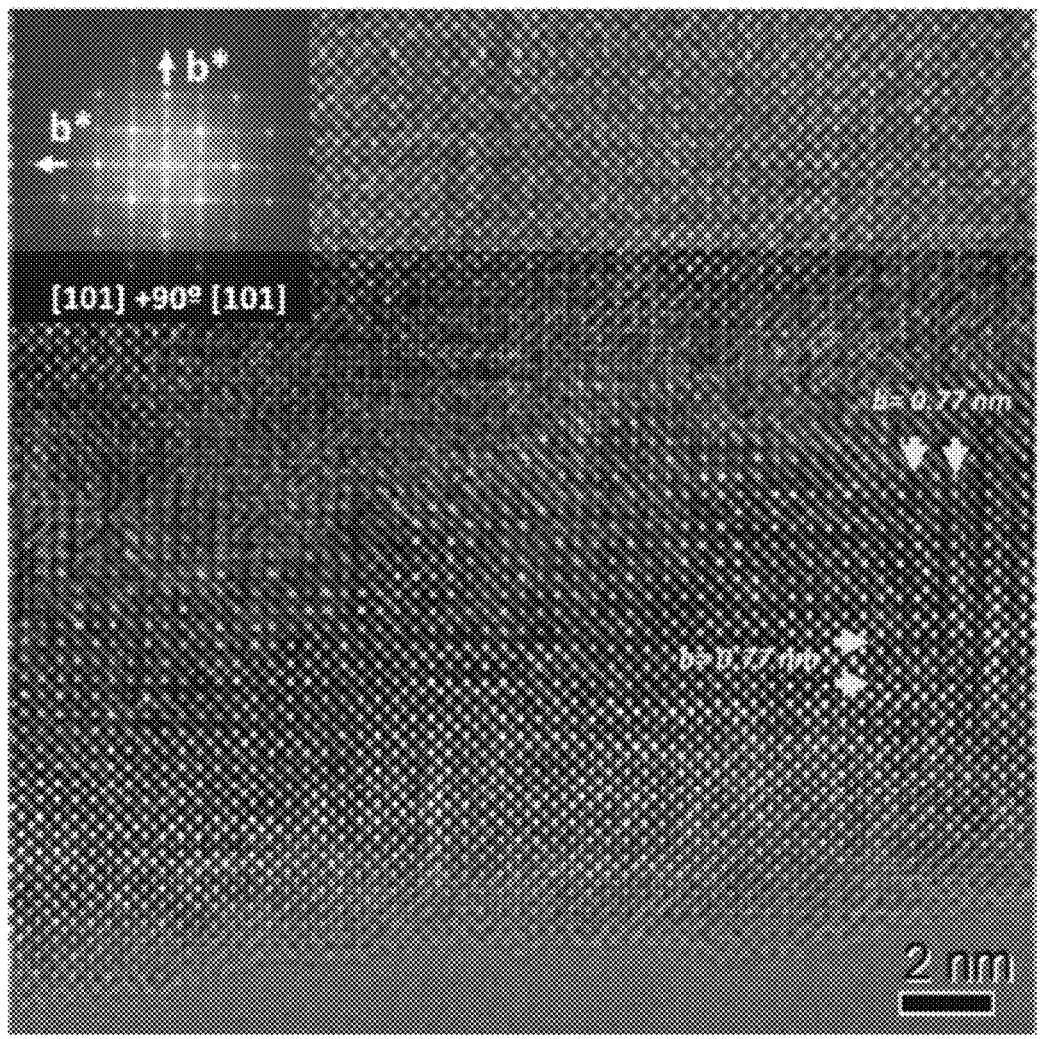
FIG. 3. HRTEM image of LCFCr crystals in a powder sample (prepared by the combustion method) along the [101] zone axis and the corresponding digital diffraction pattern.
Figures 12A, 12B:
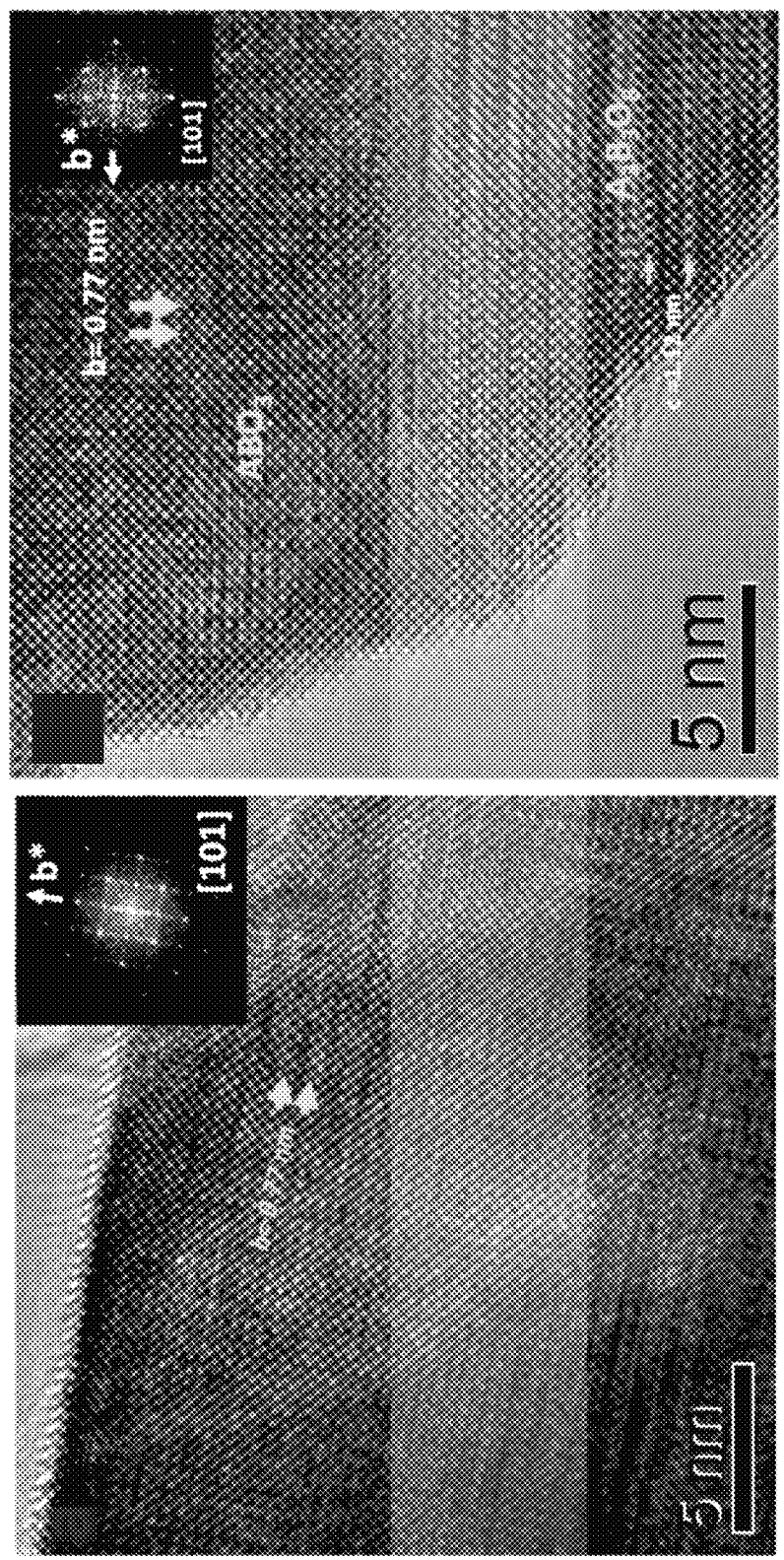
FIGS. 12A and 12B. HRTEM images of LCFCr crystals along the [101] zone axis and the corresponding diffraction patterns for powders formed by (FIG. 12A) microwave-assisted combustion synthesis (Method 2) and (FIG. 12B) microwave-assisted sol-gel synthesis (Method 3).

In the HTREM images of the crystals prepared by microwave-assisted combustion synthesis (Method 2) (FIG. 12A) and assisted sol-gel synthesis (Method 3) (FIG. 12B), nano-sized twinned domains are seen. The appearance of these domains can be associated with the pseudo-cubic nature of these materials. Furthermore, their presence avoids the formation of tetrahedral chains and therefore the formation of undesired brownmillerite-type defects [32]. The formation of defects was detected only in the sample prepared by sol-gel synthesis, Method 3 (FIG. 12B), showing a periodicity of 1.12 nm. This corresponds to the c axis of the $A_3B_3O_8$ type structure, which results from the intergrowth of a perovskite $ABO_3$ and a brownmillerite phase. HTREM images of the crystals prepared by the regular combustion method (Method 1) are shown in FIG. 3 [see also reference 54]. It is worth noting that the microwave-assisted combustion synthesis (Method 2), as it involves very fast processes, favors disordered phases (perovskite in the present case).

The mixed ion-electron conducting perovskite, $La_{0.3}Ca_{0.7}Fe_{0.7}Cr_{0.3}O_{3-\delta}$ (LCFCr), was successfully prepared by microwave-assisted combustion (Method 2) and microwave-assisted sol-gel synthesis (Method 3). The desired product was obtained in crystalline form in only 7 hrs (vs. 13 hrs) and the synthesis temperature was roughly 300° C. lower than what was found to be required for conventional solid-state combustion synthesis. The use of microwave has enhanced the rate of formation of the LCFCr powder by several orders of magnitude, and also increased the specific surface area from 0.89 to 10.4 $m^2 g^{-1}$. These results indicate that microwave synthesis can be used in the preparation of the perovskite materials used in fuel cells as described herein. Further, the partial substitution of Ca for Sr, as described in formula I herein is believed to promote oxygen-vacancy disordering and thus stabilize the perovskite phase vs. the brownmillerite phase. In the HRTEM work herein, the formation of brownmillerite-type defects was detected only in the sample prepared by sol-gel synthesis (Method 3). In addition, the calcination temperature for microwave-assisted combustion (Method 2) was 900° C. vs. 1000° C. for microwave-assisted sol-gel synthesis (Method 3). Based on the lower calcination temperature and the absence of brownmillerite-type defects, microwave-assisted combustion (Method 2) is a more preferred method for synthesis of highly active SOFC cathodes composed of the $La_{0.3}Ca_{0.7}Fe_{0.7}Cr_{0.3}O_{3-\delta}$ material.

Example 3: Sulfur Tolerance of $La_{0.3}M_{0.7}Fe_{0.7}Cr_{0.3}O_{3-\delta}$ (M=Sr, Ca) Solid Oxide Fuel Cell Anodes Although Ni—YSZ cermets are excellent SOFC anodes, largely because of their excellent catalytic activity towards fuel oxidation, Ni is susceptible to poisoning at low levels (1-100 ppm) of $H_2S$ exposure at SOFC operating temperatures (700-1000° C.) [55-59]. It has been suggested that $H_2S$ inhibits the $H_2$ oxidation reaction (HOR) rates because it readily dissociates to form a surface adsorbed Ni—S layer ($S_{ads}$) on catalytic sites normally involved in $H_2$ dissociation and subsequent oxidation [58], thereby decreasing the performance of the SOFC.

As a result, extensive research has been carried out to develop sulfur tolerant SOFC anode materials based on Ni-free conducting metal oxides, such as perovskites. For example, $La_{0.75}Sr_{0.25}Cr_{0.5}Mn_{0.5}O_3$ (LSCM) has been reported to exhibit a comparable electrochemical performance for hydrogen oxidation as seen at Ni—YSZ at 900° C. [60]. However, LSCM has been shown to be less sulfur tolerant in fuels containing 10% $H_2S$ [61]. Studies by Mukundan et al [62] showed that $La_{0.4}Sr_{0.6}TiO_3$ (LST) is a sulfur tolerant SOFC anode, as it did not exhibit any form of degradation in a 5000 ppm $H_2S+H_2$ fuel. Studies by Haag et al [63] showed that $LaSr_2Fe_2CrO_{9-\delta}$—$Gd_{0.1}Ce_{0.9}O_{2-\delta}$ composite anodes, exposed to 22 ppm $H_2S$, exhibited only a slight decrease in performance relative to the response in $H_2$. Also, $La_{0.3}Sr_{0.7}Fe_{0.7}Cr_{0.3}O_{3-\delta}$, (LSFCr), operated on wet-(50% $H_2$+CO) containing 10 ppm $H_2S$, showed only a small drop in cell potential, indicating very good stability as an anode in sulfur-containing fuels [14].

In contrast, other perovskites have been reported to show an enhancement in the rate of hydrogen oxidation in the presence of $H_2S$, including $La_{0.7}Sr_{0.3}VO_3$ (LSV[64], $Sm_{0.95}Ce_{0.05}Fe_{0.97}Ni_{0.03}O_{3-\delta}$ (SCFN) [65] and $Y_{0.9}Sr_{0.1}Cr_{0.9}Fe_{0.1}O_{3-\delta}$ (YSCF) [66]. For LSV, the observed enhancement was attributed to the formation of an active SrS phase, replacing an insulating phase ($Sr_3V_2O_8$) [64], while for SCFN and YSCF, it was suggested that the active phase that forms in the presence of $H_2S$ is probably FeS [65, 66]

It has been reported that symmetrical SOFCs, based on the LSFCr perovskite, showed tolerance to low ppm sulfur content in the fuel stream, and also exhibited excellent electrochemical activity towards $H_2$ and CO oxidation, and was also an active oxygen reduction reaction (ORR) material [14].

In this example, the performance of LCFCr as a fuel electrode is studied. LCFCr is examined as a SOFC anode in $H_2$ and/or CO atmospheres, with or without $H_2S$, in comparison to the more well studied LSFCr. Electrochemical methods employing both ac and dc techniques were used in a symmetrical SOFC configuration in $H_2$ and/or CO fuels, with or without the addition of 9 ppm $H_2S$, all at 800° C. I LCFCr is found to be a very good anode catalyst in $H_2$, CO, and $H_2$+CO fuels, and this mixed conducting perovskite material demonstrates a fully reversible enhanced catalytic activity when ca. 10 ppm $H_2S$ is added to the $H_2$ fuel stream.

A glycine-nitrate combustion process was employed to prepare the $La_{0.3}M_{0.7}Fe_{0.7}Cr_{0.3}O_{3-\delta}$ (M=Sr, Ca) perovskite powders, using the method described in Example 1. The ash obtained from combustion was subsequently pulverized and pre-calcined at 1200° C. for 2 h in air (conditions under which single phases are generated). Powders were ball-milled (high energy planetary ball mill, Pulverisette 5, Fritsch, Germany) in an isopropanol medium at a rotation speed of 300 rpm for 2 h using zirconia balls. The $La_{0.3}M_{0.7}Fe_{0.7}Cr_{0.3}O_{3-\delta}$ (M=Sr, Ca) powders were then screen printed symmetrically onto both sides of a 275 μm dense YSZ electrolyte coated with a porous, ca. 10 micron thick SDC buffer layer (Fuel Cell Materials), followed by firing at 1100° C. for 2 h. Au paste (C 5729, Heraeus Inc. Germany) was painted on the $La_{0.3}M_{0.7}Fe_{0.7}Cr_{0.3}O_{3-\delta}$ (M=Sr, Ca) layers on both sides of the pellet to serve as the current collector and Pt wires were used as the electrical leads.

The cells were fixed in a FCSH-V3 cell holder (MaterialsMate, Italy) for the purpose of determining their electrochemical properties. A glass sealant (Type 613, Aremco Products, USA) was used to isolate the fuel and $O_2$ sides from each other. The total flow rates were 25 ml/min and 40 ml/min at the fuel and $O_2$ electrodes, respectively. The performance of the two electrode cells was evaluated using a four-probe method at 800° C. Impedance spectra were collected under both open circuit and polarized conditions using a 50 mV perturbation in the frequency range of 0.01 Hz to 60 kHz using a Solartron 1287/1255 potentiostat/galvanostat/impedance analyzer.

Performance of $La_{0.3}M_{0.7}Fe_{0.7}Cr_{0.3}O_{3-\delta}$ (M=Sr, Ca) Anodes in Wet 30% $H_2/N_2$ at 800° C.

Figure 13:
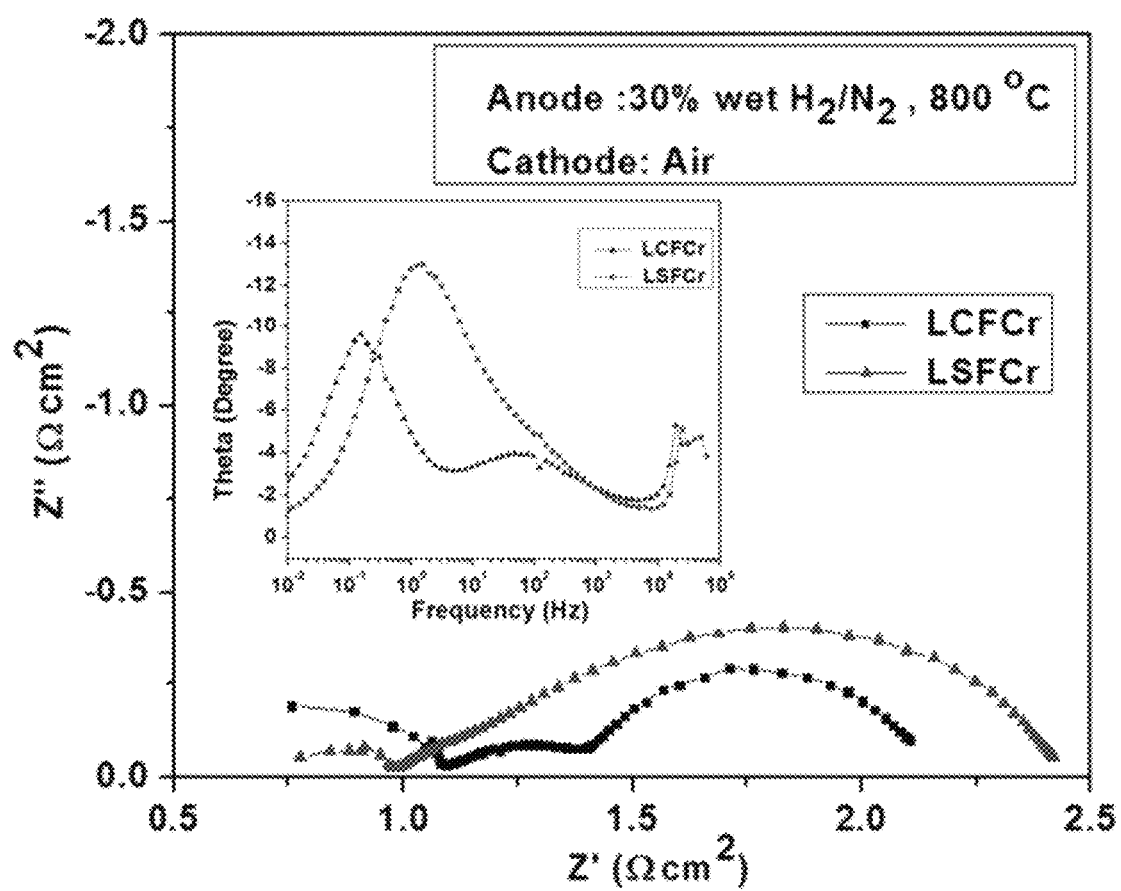
FIG. 13. OCP impedance data for symmetrical full cell based on $La_{0.3}M_{0.7}Fe_{0.7}Cr_{0.3}O_{3-\delta}$ (M=Sr, Ca) electrodes, at 800° C., showing the Nyquist and Bode (inset) plots, all in wet 30% $H_2/N_2$ gas mixtures at the fuel electrode and with air exposure at the $O_2$ electrode.

A first stage comparison of the performance of LCFCr and LSFCr was carried out using impedance (EIS) and potentiodynmamic studies. It can be seen from the Nyquist plot in FIG. 13 that a polarization resistance of 1.06 and 1.5 $\Omega \cdot cm_2$ was obtained for LCFCr and LSFCr in 30% humidified $H_2$ at 800° C., respectively. The performance of LCFCr is slightly better than LSFCr. This is consistent with preliminary electronic conductivity analysis in $H_2$ at 800° C. for LCFCr which gave a value of 0.6 S/cm, which is a little higher than the 0.2 S/cm value obtained for LSFCr [14]. Despite this, the EIS response is quite similar for the two materials, with two time constants (R/CPE) seen for both LSFCr and LCFCr. From the Bode plot shown in the inset of FIG. 13, the dominant summit frequencies are seen to be ca. 100 Hz and ca. 1 Hz.

Figure 14:
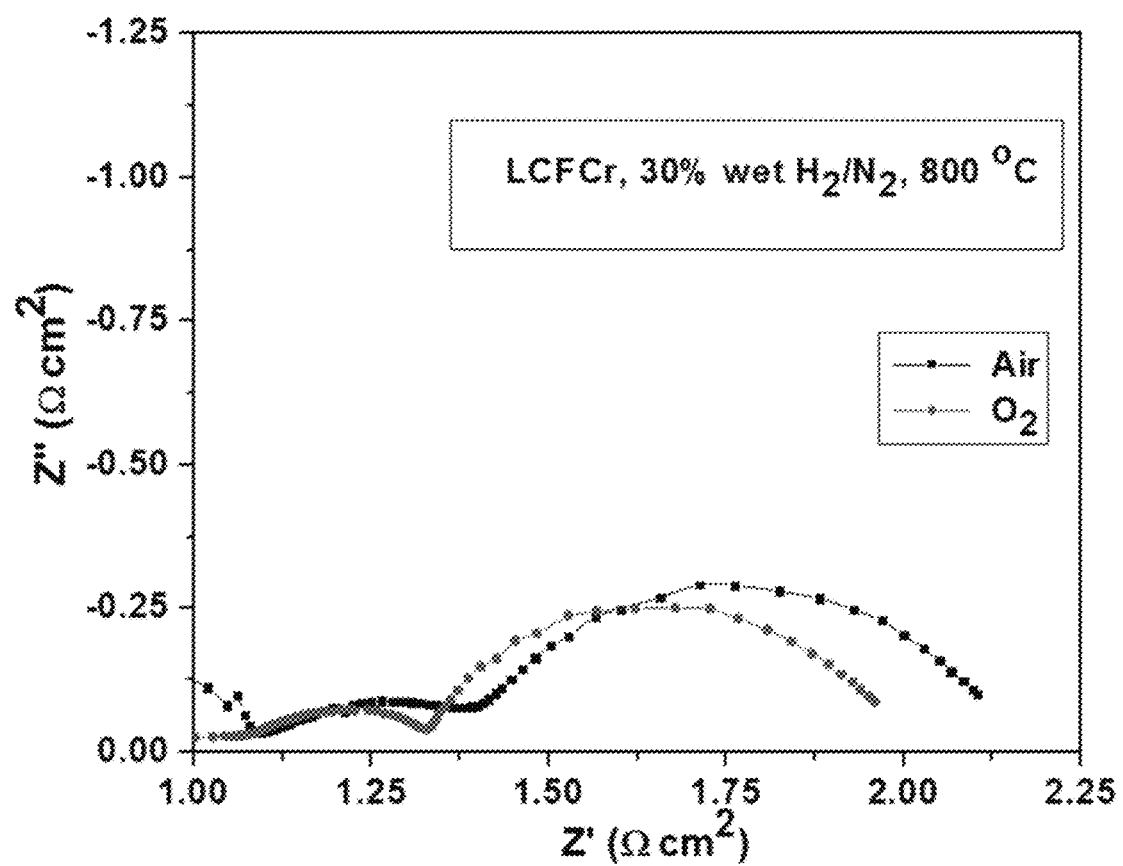
FIG. 14. OCP impedance data for symmetrical full cell based on $La_{0.3}Ca_{0.7}Fe_{0.7}Cr_{0.3}O_{3-\delta}$ (LCFCr) electrodes at 800° C. and showing the Nyquist plot, all in wet 30% $H_2/N_2$ gas mixtures at the fuel electrode and with air or $O_2$ exposure at the $O_2$ electrode.

To determine which of the processes arises from the air (cathode) vs. fuel (anode) electrode, the cathode in the LCFCr cell was fed with either air or pure oxygen. From FIG. 14A, it is clear that the high frequency (100 Hz) arc can be attributed to the cathode, since in pure $O_2$, the high frequency resistance ($R_{HF}$) decreased from 0.37 to 0.28 $\Omega \cdot cm_2$, while the low frequency resistance ($R_{LF}$) remained unchanged, as shown in Table 6. The resistance values were obtained by fitting the Nyquist plot in FIG. 14A to the Rs ($R_{HF}$/$CPE_{HF}$)($R_{LF}$/$CPE_{LF}$) equivalent circuit model (FIG. 14B). Rs is the series resistance, Rp is the polarization resistance (the sum of all of the parallel resistances), and ($R_{HF}$/$CPE_{HF}$) and ($R_{LF}$/$CPE_{LF}$) are the time constants at high (100 Hz) and low (0.5 Hz) frequencies, respectively. Therefore, the low frequency arc ($R_{LF}$/$CPE_{LF}$) is predominantly due to contributions from the fuel electrode (anode) while the high frequency arc ($R_{HF}$/$CPE_{HF}$) arises from the air electrode (cathode), consistent with what has been reported in the literature for other mixed conducting perovskite systems, including LSFCr (10).

TABLE 6

Circuit element values* obtained by fitting the results of FIG. 14A** to the $R_S$($R_{HF}$/$CPE_{HF}$)$R_{LF}$/$CPE_{LF}$) equivalent circuit model

| Cathode Gas | $R_S$ ($\Omega \cdot cm^2$) | $R_{HF}$ ($\Omega \cdot cm^2$) | $R_{LF}$ ($\Omega \cdot cm^2$) | Rp# ($\Omega \cdot cm^2$) |
|---|---|---|---|---|
| Air | 1.07 | 0.37 | 0.68 | 1.05 |
| $O_2$ | 1.06 | 0.28 | 0.63 | 0.91 |

Figure 15:
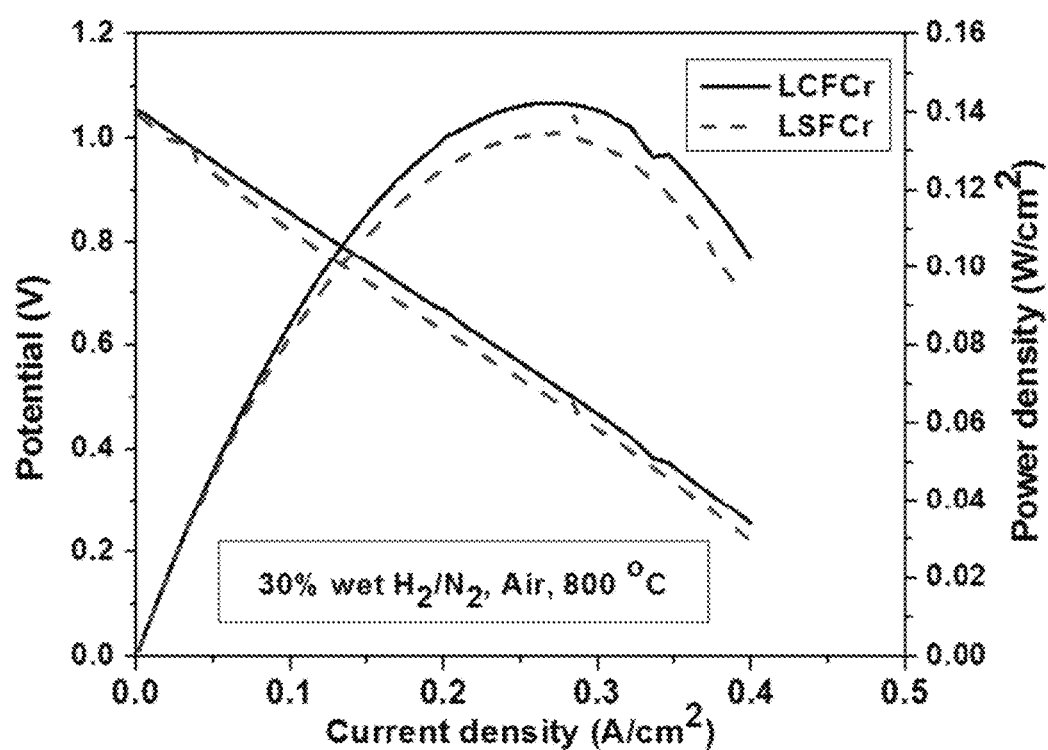
FIG. 15. Performance plot for symmetrical full cell based on $La_{0.3}M_{0.7}Fe_{0.7}Cr_{0.3}O_{3-\delta}$ (M=Sr, Ca) electrodes and operated at 800° C., all in wet 30% $H_2/N_2$ gas mixture at the fuel electrode and with air exposure at the $O_2$ electrode.

*$R_{HF}$ and $R_{LF}$ obtained form the high (ca. 100 HZ) and low (ca. 1 Hz) frequency arcs, respectively.
**Symmetrical fuel cell based on LCFCr electrodes, operated at 800° C. in wt 30% $H_2/N_2$ gas mixtures at the fuel electrode and with air or $O_2$ exposure at the $O_2$ electrode.
Rp = RHF + RLF DC experiments were also carried out to evaluate the performance of $La_{0.3}M_{0.7}Fe_{0.7}Cr_{0.3}O_{3-\delta}$ (M=Sr, Ca). FIG. 15 shows the performance plots of LCFCr and LSFCr cells operated on 30% humidified $H_2$ at 800° C. LCFCr shows a maximum current and power density of 270 mA/cm$^2$ and 142 mW/cm$^2$, respectively, while the analogous values for LSFCr are 255 mA/cm$^2$ and 134 mW/cm$^2$, consistent with the EIS data in FIG. 13. The performance of our $La_{0.3}M_{0.7}Fe_{0.7}Cr_{0.3}O_{3-\delta}$ (M=Sr, Ca) based cells is comparable to that of other symmetrical cells (based on perovskite electrodes) reported in the literature, such as $La_4Sr_8Ti_{12-x}Fe_xO_{38-\delta}$ (LSTF), which showed power densities of 90-100 mW/cm$^2$ at 950° C. in humidified $H_2$ (16).

Performance of LCFCr in Other Fuel Mixtures at 800° C.

Figure 16:
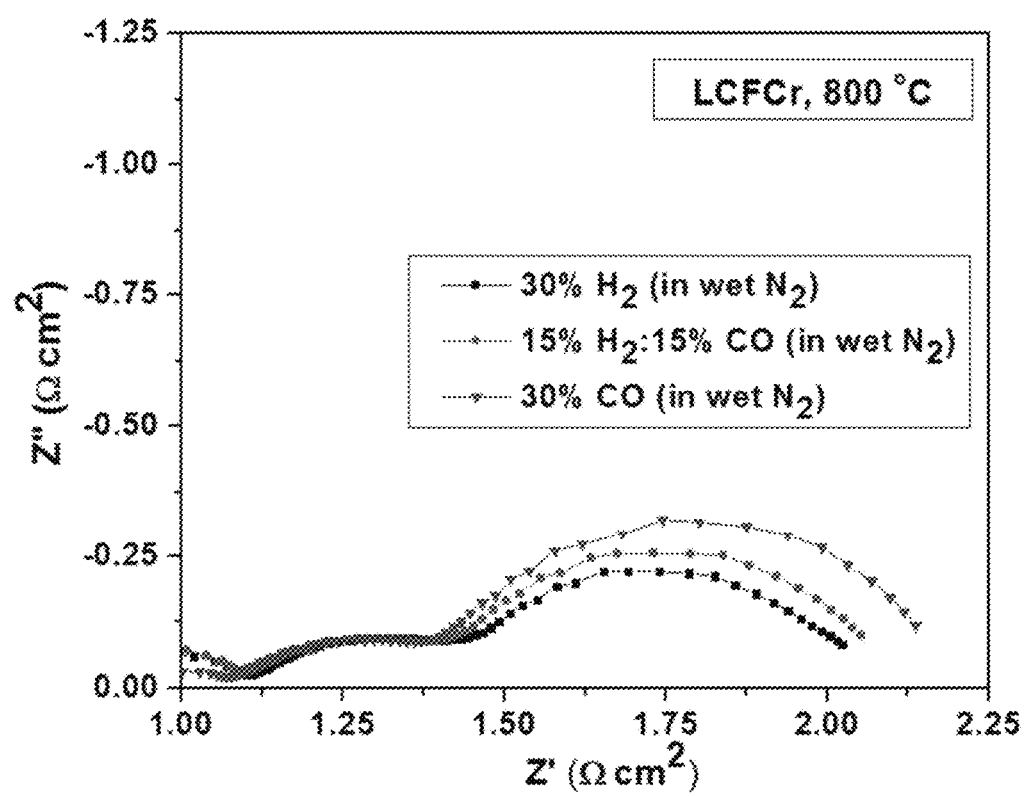
FIG. 16. OCP impedance data for symmetrical full cell based on LCFCr electrodes, at 800° C., showing the Nyquist plots in wet 30% $H_2/N_2$, 15% $H_2$+15% CO, or 30% CO gas mixtures at the fuel electrode and with air exposure at the $O_2$ electrode.
Figure 17:
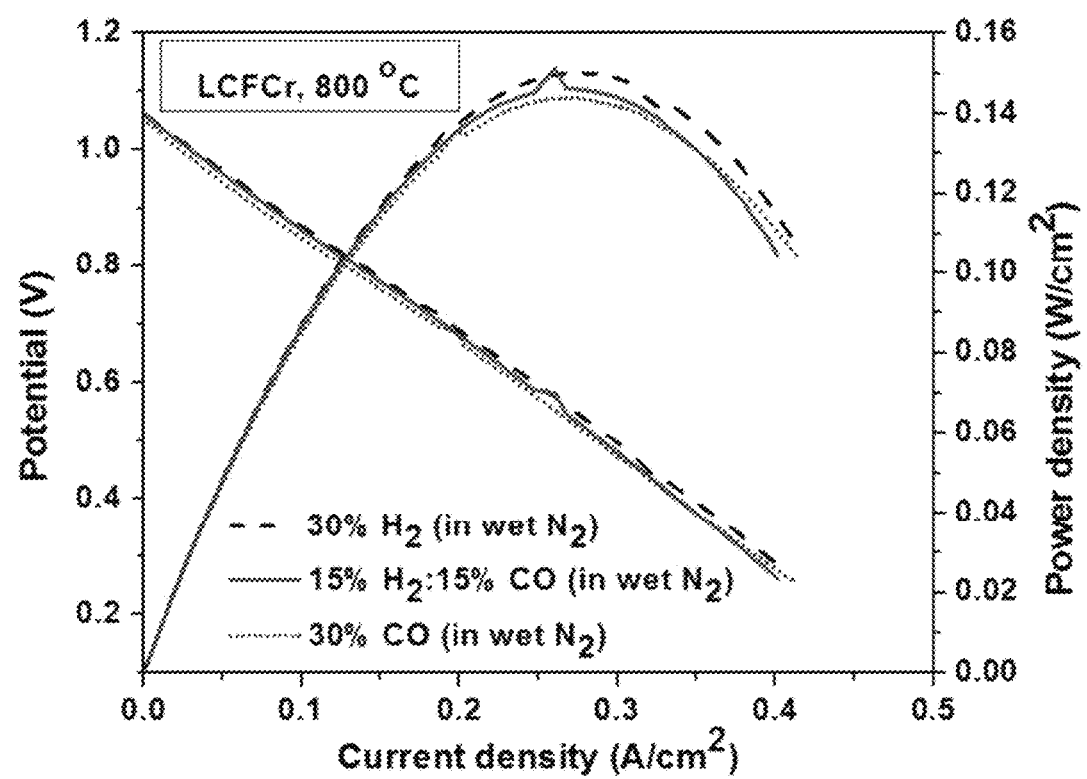
FIG. 17. Performance plot for symmetrical full cell based on LCFCr electrodes, operated at 800° C. in wet 30% $H_2/N_2$, 15% $H_2$+15% CO, or 30% CO gas mixtures at the fuel electrode and with air exposure at the $O_2$ electrode.

The performance of the LCFCr electrode was also examined in CO and syngas ($H_2$+CO) atmospheres. FIG. 16 shows that the polarization resistance of the cell is 0.95 $\Omega \cdot cm^2$ in $H_2$, which is slightly smaller than both the Rp values obtained in CO (1.11 $\Omega \cdot cm^2$) and CO+$H_2$ (1.00 $\Omega \cdot cm^2$) atmospheres. This indicates that the material is only a somewhat better catalyst for $H_2$ oxidation than CO oxidation. This shows that LCFCr is a useful SOFC anode material that can be employed in a range of fuels, giving a very good performance in all cases. Also, from the Nyquist plot, it is seen that it is the low frequency arc ($R_{LF}$/$CPE_{LF}$) that is changing with changing fuel environments, again confirming that the low frequency arc is associated primarily with the anode, as indicated above. The performance plot of the cell in these three gases is shown in FIG. 17. The OCP in the three gases is seen to be ca. 1.06 V, which is very close to the theoretical value, indicating that the anode and cathode compartments are well sealed and that there is no gas leakage. As stated earlier, there is not much difference in the activity of the LCFCr material in $H_2$, CO and $H_2$+CO atmospheres, and this is supported here by the dc measurements. The maximum power density obtained is between 140 to 150 mW/cm$^2$ in all of the environments, while the maximum current density is in the range of 250-270 mA/cm$^2$, all at 800° C.

Effect of Low Ppm $H_2S$ on Performance of LCFCr in 30% $H_2$ (Bal Wet $N_2$) at 800° C.

Figure 18A:
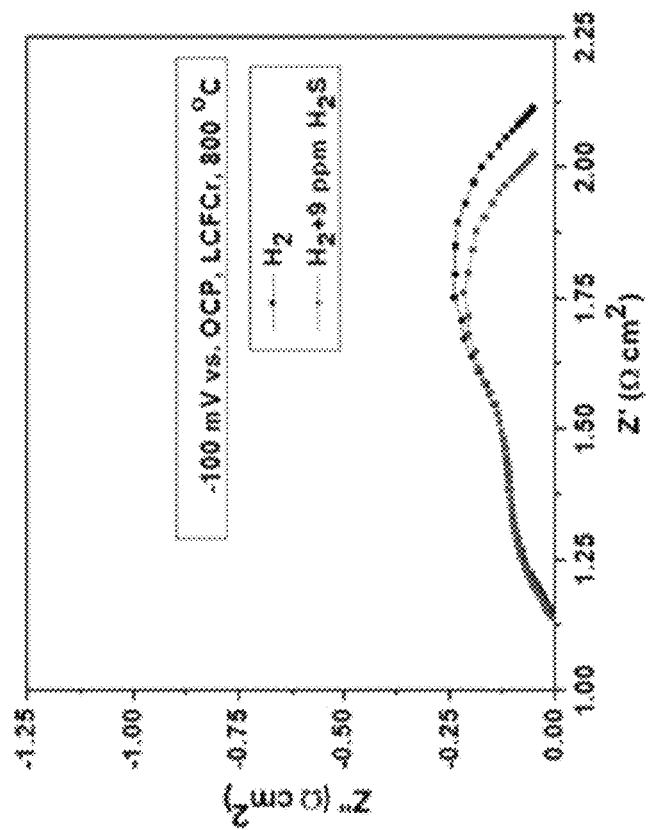
FIGS. 18A-E. OCP and polarized EIS response for symmetrical full cell based on LCFCr electrodes at 800° C., with wet 30% $H_2/N_2$ with or without 9 ppm $H_2S$ fed to the fuel electrode and air fed to the $O_2$ electrode, showing the Nyquist plots acquired at (FIG. 18A) the OCP, (FIG. 18B) −100 mV vs the cell voltage at open circuit, (FIG. 18C) −300 mV vs. the cell voltage at open circuit, and (FIG. 18D) the corresponding resistances obtained from the fitted Nyquist plots using the $Rs(R_{HF}/CPE_{HF})(R_{LF}/CPE_{LF})$ equivalent circuit model and the % Rp change (FIG. 18E).
Figure 18B:
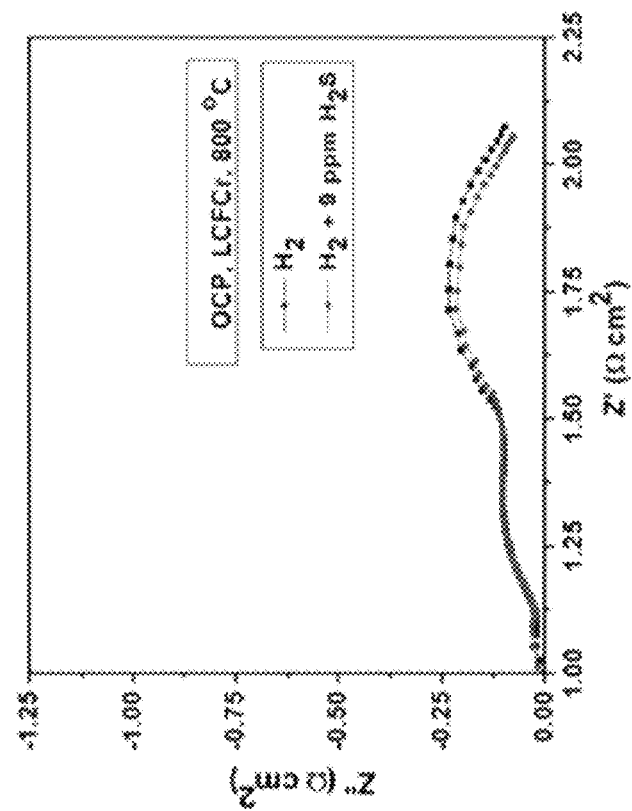
Figure 18D:
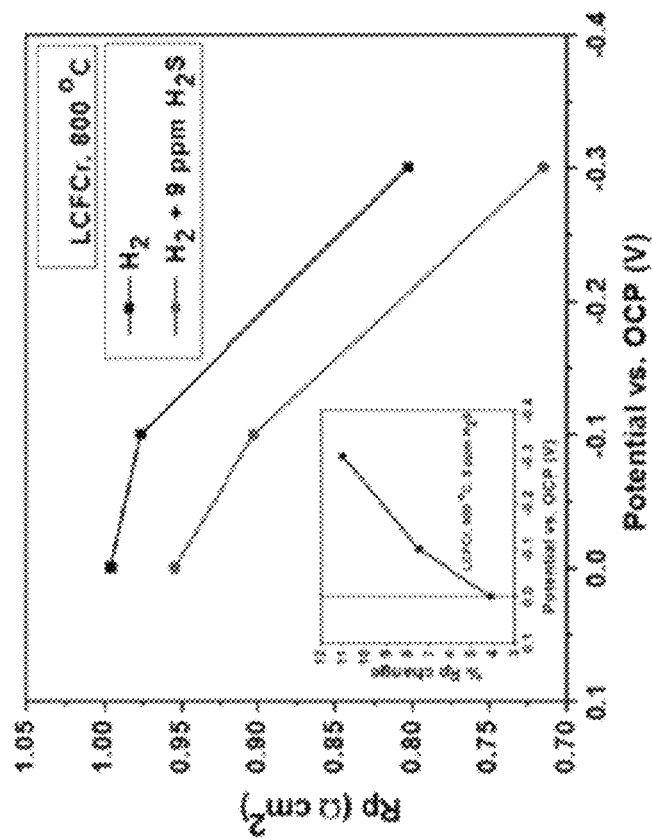
Figure 18C:
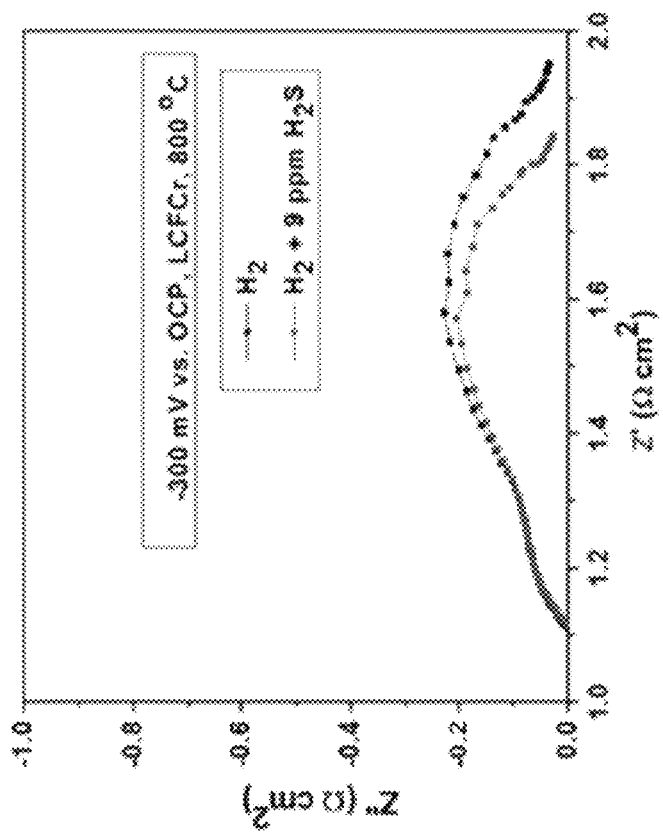
Figure 18E:
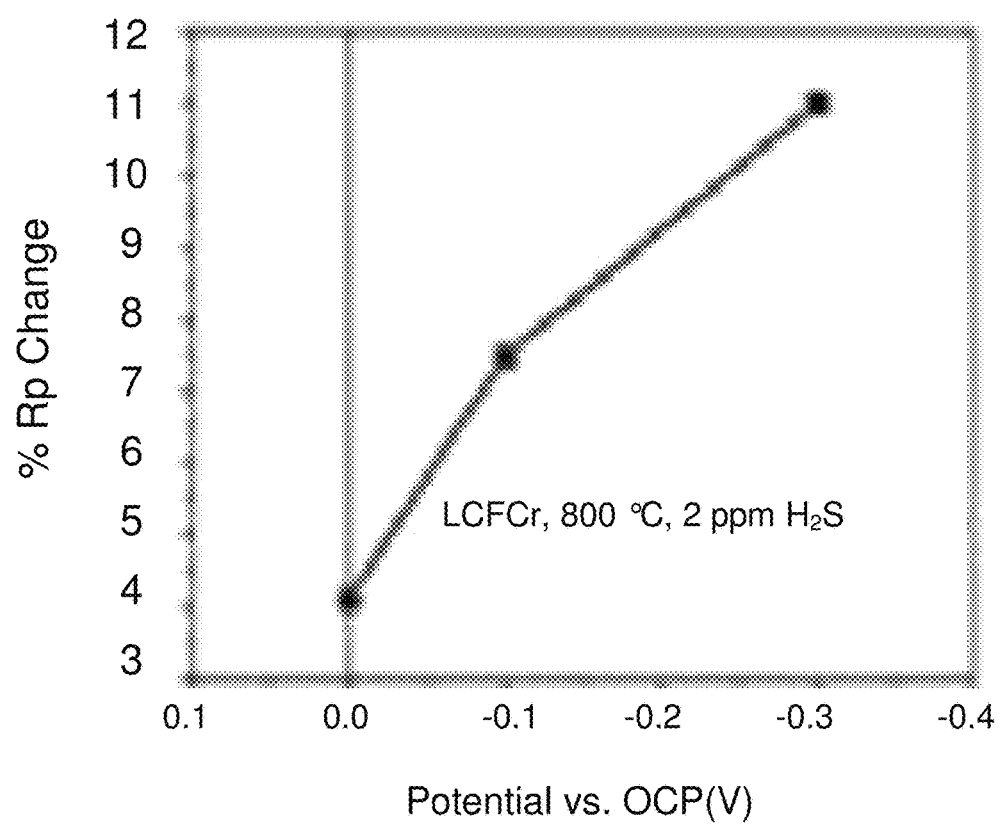

FIG. 18A shows that, when 9 ppm $H_2S$ is added to 30% $H_2$ under OCP conditions, the polarization resistance decreased slightly, from 1.00 to 0.96 $\Omega \cdot cm_2$, translating to a ca. 4% decrease in Rp in the presence of $H_2S$. No poisoning/deactivation of the LCFCr at 800° C. is seen. This was also seen for LSFCr, although only the results for LCFCr are shown here. In comparison, most of the sulfur-induced performance enhancement behavior reported for other types of perovskites has usually been observed at much higher concentrations of $H_2S$ (1-5%). To better understand these results, the effect of ac polarization on the cell was investigated. FIGS. 18B and 18C show the polarized EIS results for the LCFCr-based cell in $H_2$, with or without the addition of 9 ppm $H_2S$ at 800° C. When the cell was polarized at −100 mV vs. the full cell open circuit voltage, i.e., at a cell voltage of ca. 0.95 V, (FIG. 18B), Rp decreased from 0.97 $\Omega \cdot cm^2$ in $H_2$ to 0.90 $\Omega \cdot cm^2$ in the presence of $H_2S$, while when the anode was polarized at −300 mV (ca. 0.75 V cell voltage), Rp decreased from 0.80 to 0.72. $\Omega \cdot cm^2$ (FIG. 18C). The plot in FIG. 18E shows the % Rp change vs. the applied voltage, calculated based on the Rp data in FIG. 18D (% Rp change=[($Rp_{H2}$−$Rp_{H2S}$)]×100/($Rp_{H2}$)). It can be seen that Rp decreased by 4% at the cell OCP and by 7% and 11% in the presence of H$_2$S when the cell was polarized at −100 and −300 mV vs. the full cell open circuit voltage, respectively. This indicates that the enhancement of the performance of LCFCr in H$_2$ in the presence of H$_2$S improves with polarization at 800° C.

As stated earlier, some ferrite-based perovskites, such as Sm$_{0.95}$Ce$_{0.05}$Fe$_{0.97}$Ni$_{0.03}$O$_{3-\delta}$ [65] and Y$_{0.9}$Sr$_{0.1}$Cr$_{0.9}$Fe$_{0.1}$O$_{3-\delta}$ [66], have been reported to show enhanced H$_2$ oxidation activity or electrochemical oxidation of H$_2$S only in high concentrations of H$_2$S (1-5%), due to the formation of sulfide species (e.g., FeS) at 600-800° C. On the other hand, probably under the present testing conditions, some type of adsorbed surface sulfide species (possibly FeS) is being formed, even when H$_2$S is present at ppm levels at 800° C. However, detailed surface characterization studies are required to confirm the presence of FeS in these experiments.

Figures 19A, 19B:
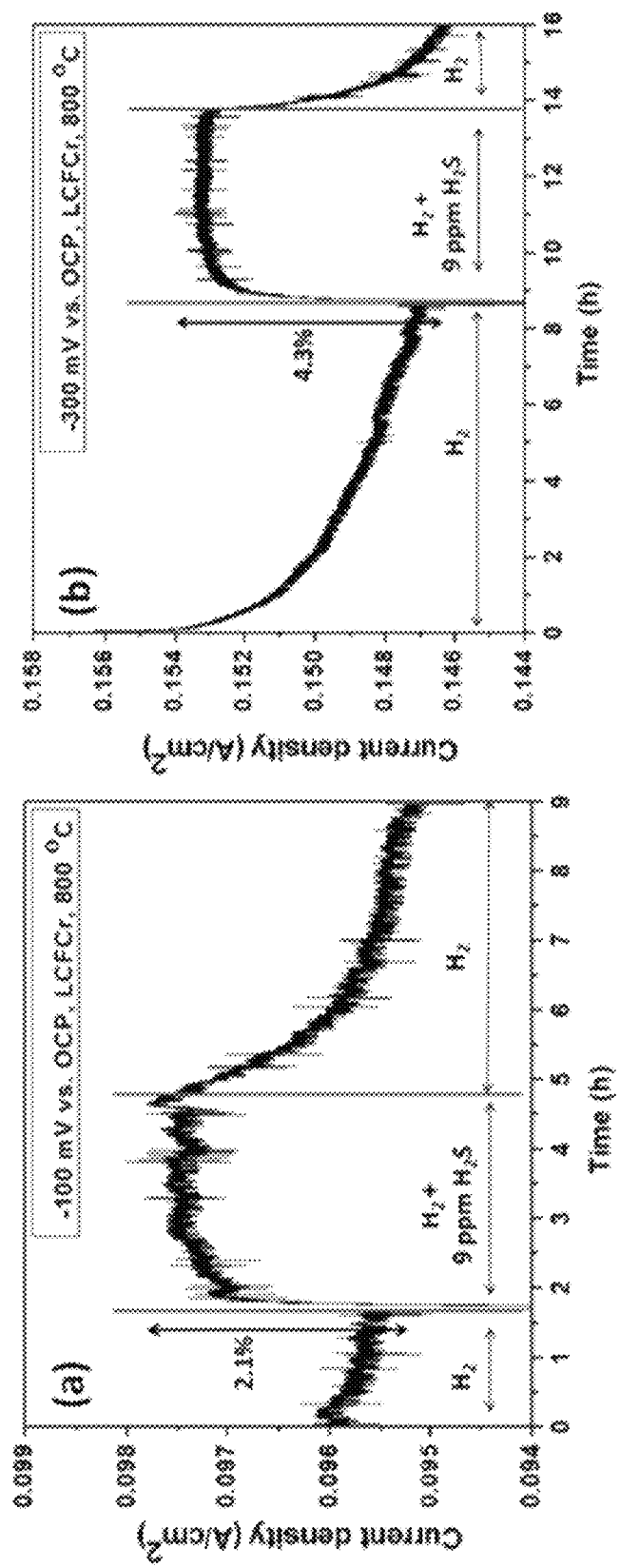
FIGS. 19A and B. Effect of 9 ppm H2S exposure and removal on LCFCr anode activity as a function of polarization at 800° C., showing the current versus time (i/t) plots at (FIG. 19A) −100 mV and (FIG. 19B) −300 mV vs. the full cell voltage at open circuit.

To further study the performance of the LCFCr electrode towards H$_2$ oxidation in the presence or absence of 9 ppm H$_2$S, potentiostatic studies were also carried out at the −100 and −300 mV vs. OCP cell polarization, respectively. FIG. 19A shows the results of polarization at −100 mV vs. the full cell voltage at open circuit for 9 h with and without H$_2$S. As can be seen, upon the addition of 9 ppm H$_2$S to the H$_2$ fuel, the current density increased from about 95 mA/cm$^2$ to 98 mA/cm$^2$, giving a 2.1% improvement in performance. After 4 h of removal of H$_2$S, the current density decreased to about 95 mA/cm$^2$, similar to the value observed before H$_2$S exposure. This shows that the enhancement is only observed in the presence of H$_2$S and that the cell fully recovers in the absence of H$_2$S, suggesting that no bulk sulfide phase forms, but rather only a surface species is generated. This behavior is also seen at −300 mV vs. the full cell voltage at open circuit (FIG. 19B), where the cell improved by 4.3% in the presence of H$_2$S and fully recovered when the H$_2$S was removed.

This example has focused on the development of mixed conducting perovskite oxides for use at both electrodes in reversible solid oxide fuel cells (RSOFCs). In this example, the performance of LCFCr, in comparison with LSFCr, has been investigated in a range of fuel environments, with and without ppm levels of H$_2$S, all at 800° C. The symmetrical fuel cells were constructed by screen-printing La$_{0.3}$M$_{0.7}$Fe$_{0.7}$Cr$_{0.3}$O$_{3-\delta}$ (M=Sr, Ca) on a Yttria-stabilized zirconia (YSZ) electrolyte covered by a thin Samaria-doped ceria (SDC) buffer layer, and then tested using both impedance and potentiostatic techniques. LCFCr is an equally good fuel electrode (anode) and O$_2$ electrode (cathode) as LSFCr, exhibiting very good electrochemical performance in H$_2$, CO and syngas (H$_2$+CO) atmospheres, giving polarization resistance of 0.95 Ω·cm$^2$ in wet 30% H$_2$ and 1.00 Ω·cm$^2$ and 1.11 Ω·cm$^2$ in wet 15% H$_2$:15% CO and 30% CO atmospheres, respectively. The maximum power density obtained using these gases were between 140 to 150 mW/cm$^2$, while the maximum current density was in the range of 250-270 mA/cm$^2$. The LCFCr and LSFCr anodes were also evaluated in the presence of 9 ppm H$_2$S, showing a small, but reproducible and reversible, decrease in polarization resistance (Rp). Chronoamperometric studies at cell polarizations of −100 and −300 mV vs. the full cell voltage at open circuit showed a ca. 2-4% increase in current density in the presence of 9 ppm H$_2$S+30% H$_2$, with the cell recovering fully when H$_2$S was removed. This is noteworthy and indicates that some type of adsorbed surface sulfide species (possibly FeS) is being formed in the presence of low ppm H$_2$S at 800° C., leading to the observe enhancement in hydrogen oxidation activity.

Example 4: Fabrication of Solid Oxide Fuel Cells by Microwave Methods Half-Cell Construction and Testing In this example, six different types of cells were prepared and tested, with cells composed of MW-combusted electrodes, sintered using a conventional furnace, used as blanks (Cell 1, Table 1). LCFCr powders were prepared using microwave (MW)-assisted combustion, starting with the appropriate nitrate precursors. Details of the synthetic procedure are in Example 2. The LCFCr powders were milled (high energy planetary ball mill, Pulverisette 5, Fritsch, Germany) in an isopropanol medium at a rotation speed of 300 rpm for 2 h using zirconia balls. The ca. 30 μm thick LCFCr electrodes were then screen-printed symmetrically (over an area of 0.5 cm$^2$) onto both sides of commercial gadolinium-doped ceria (GDC) electrolytes (Fuel Cell Materials, 1 mm or 250 microns thick), forming a symmetrical LCFCr/GDC/LCFCr cell. Au paste (C 5729, Heraeus Inc., Germany) was painted on each of the electrode layers to serve as the current collectors.

Cell 1 was constructed from MW-combusted LCFCr electrodes but was then sintered using a conventional furnace and used as the blank (Table 7). In order to clearly compare the effect of the conventional furnace sintering time and the temperature, Cell 1 was heated at 1100° C. for 2 hours with a ramp rate of 5° C./min, which is our typical electrode sintering condition 26-28. Considering the ramp time, sintering time, and cooling time, the overall electrode sintering time for the preparation of Cell 1, using a conventional furnace, was 10 hours (Table 7).

Cells 2-6 (Table 7) were prepared without the use of a standard furnace, and were instead constructed using the MW-prepared LCFCr electrode powders, followed by MW sintering of the complete cells using a Milestone Multi-FAST-6 microwave instrument. Due to its silicon carbide crucibles, this microwave fusion system can reach temperatures of ca. 1000° C. in only a few minutes. Four different MW sintering temperatures were used (600, 700, 850 and 900° C.) in order to optimize the electrode preparation conditions. Although the MW-heated cell sintering temperature was measured with an infrared sensor directly in the silicon carbide crucible, there are inherent difficulties in precisely measuring the 'true' sample temperature during MW exposure and thus the temperatures are reported only to a few significant figures.

In all cases (Cells 2-6), the sintering time at the desired temperature was 20 minutes. However, in some cases (not all cells were heated at the same rate), the ramp time had to be adjusted to reach the desired temperature, i.e., the ramping time was 30 minutes for cells 2, 3 and 5 and 45 minutes for cells 4 and 6.

Electrochemical measurements to evaluate cell performance were performed using 2 electrode methods in air. Electrochemical impedance spectra (EIS) were collected under open circuit conditions at 800° C., using an ac amplitude of 50 mV in the frequency range of 0.01 to 65 kHz and using a Solartron 1287/1255 potentiostat/galvanostat/impedance analyzer. Zview software was used to fit and analyze the impedance data.

TABLE 7

Cell fabrication description and total polarization resistance.

| Cell | Powder synthesis method | Cell sintering heat source | Electrolyte thickness | Sintering temperature and time | Total time | Rp* ($\Omega \cdot cm^2$) |
|---|---|---|---|---|---|---|
| 1 | MW combustion | Furnace | 1 mm | 1100° C., 2 h | 10 h | 0.50 |
| 2 | MW combustion | MW | 1 mm | 700° C., 20 mins | 1 h 20 mins | 0.40 |
| 3 | MW combustion | MW | 1 mm | 900° C., 20 mins | 1 h 20 mins | 0.25 |
| 4 | MW combustion | MW | 250 μm | 850° C., 20 mins | 1 h 20 mins | 0.62 |
| 5 | MW combustion | MW | 250 μm | 850° C., 20 mins | 1 h 35 mins | 0.48 |
| 6 | MW combustion | MW | 250 μm | 600° C., 20 mins | 1 h 35 mins | 0.60 |

*Two electrode LCFCr/GDC/LCFCr half-cell configuration, 800° C., pO$_2$ = 0.21 atm, 50 ml/min flow rate.

All samples were examined by scanning electron microscopy (SEM) as described in Example 1.

Figures 20A, 20B:
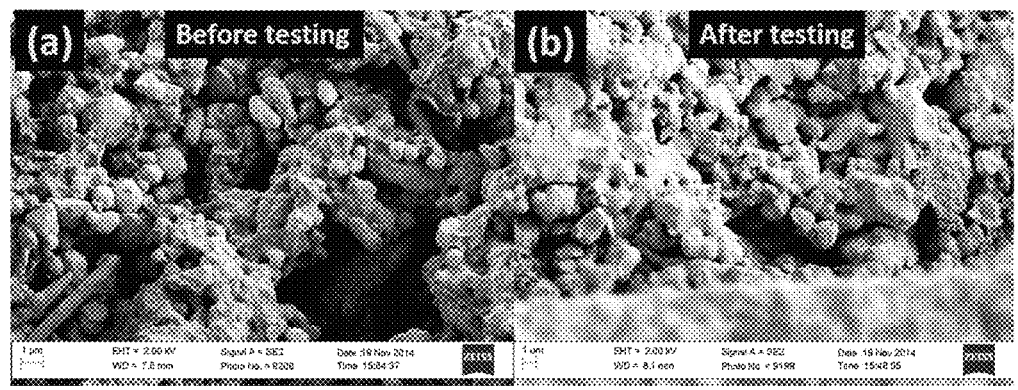
FIG. 20A is a cross-sectional SEM view of LCFCr electrode in Cell 1 (blank) (with MW prepared powders followed by furnace sintering of the cell).
FIG. 20B is a cross-sectional SEM view of LCFCr electrode of FIG. 20A after electrochemical testing.

FIG. 20A shows the SEM image of an as-prepared LCFCr electrode in Cell 1 (MW prepared electrodes, followed by furnace sintering of the cell), revealing an average particle size of ca. 1 μm. It is worth noting the non-homogeneous character of the LCFCr layers, possibly due to the fact that the MW-prepared LCFCr powders were calcined at a lower temperature [84] (900° C.) than the electrode sintering temperature, thus the particles may have sintered when they were exposed to higher temperatures.

FIG. 20B shows the change in morphology of Cell 1 after ca. 100 hours of electrochemical testing in air at 800° C. Now, an average LCFCr particle size of ca. 2 μm is obtained and a more homogeneous morphology of the LCFCr electrode is observed overall. This may be due to the fact that, during the ca. 100 hours of operation at 800° C., the LCFCr particles have sintered further.

Figures 21A, 21B:
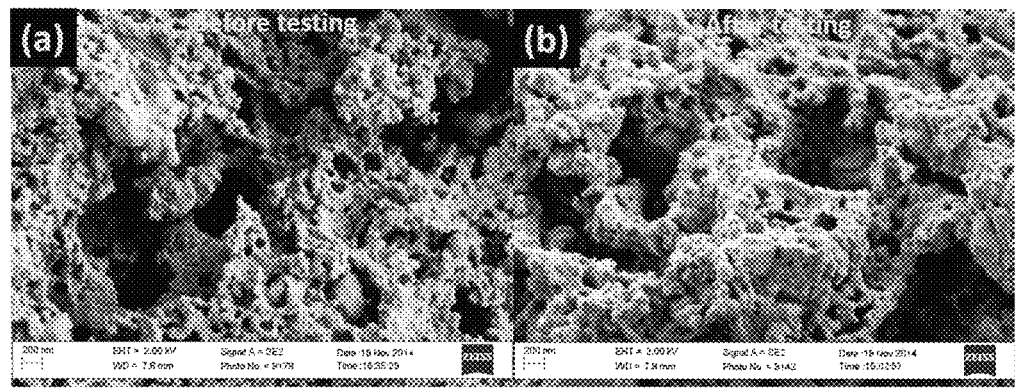
FIG. 21A is a cross-sectional SEM view of LCFCr electrode in Cell 3 (with MW prepared powders followed by microwave sintering of the cell).
FIG. 21B is a cross-sectional SEM view of LCFCr electrode of FIG. 21A after electrochemical testing.

FIGS. 21A and 21B show SEM images of the LCFCr electrode in Cell 2 (MW prepared powders followed by MW sintering of the cell). FIG. 21A shows that a much smaller average particle size of ca. 50 nm is observed when compared to the cells sintered using conventional furnace sintering (FIG. 20A), and a very homogenous morphology is also seen. In the case of the electrode after electrochemical testing (FIG. 21B), the LCFCr electrode presents a very similar morphology to the as-prepared cell (FIG. 21A). In fact, after ca. 100 hours of operation at 800° C. in air (FIG. 21B), the MW prepared LCFCr electrode in the MW sintered cell shows an unchanged average particle size of ca. 50 nm after cell operation This set of cells were MW sintered at 900° C., 300° C. lower than the conventionally sintered cells shown in FIG. 20A, which likely explains why, in this case, the LCFCr electrode has a much smaller particle size overall.

Figure 22A:
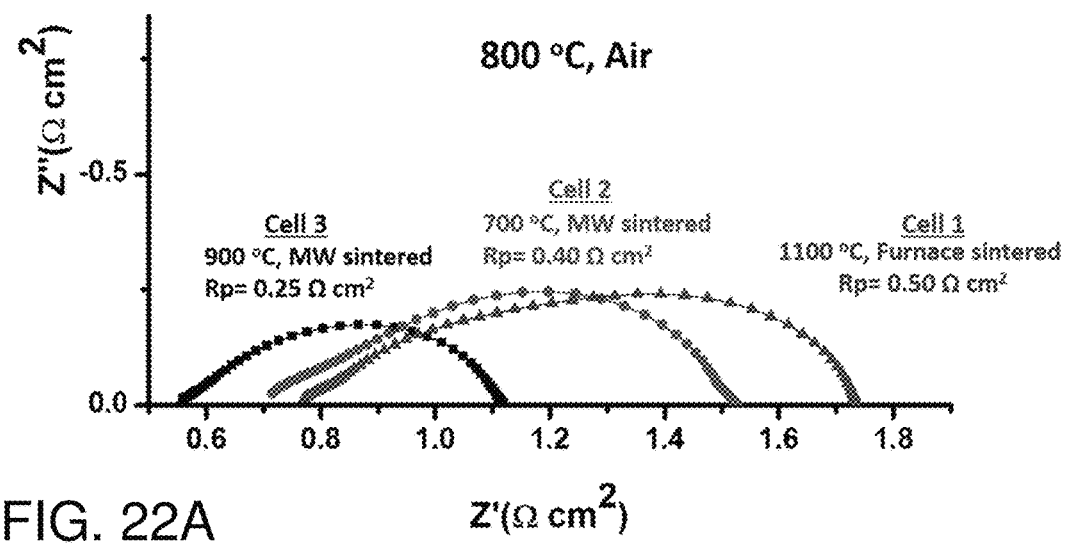
FIG. 22A shows impedance spectra of Cells 2 (circles) and 3 (squares) prepared from MW prepared powders followed by MW sintering of the cells at 700 and 900° C., respectively. These are compared with that of a cell sintered using a conventional furnace at 1100° C. (Cell 1, triangles). LCFCr was deposited on either side of a 1 mm thick GDC electrolyte disc. The impedance response was obtained in stagnant air at the OCP and 800° C.
Figure 22B:
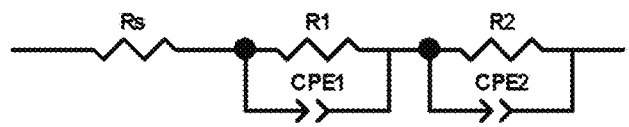
FIG. 22B is the equivalent circuit used for fitting data of FIGS. 22A and 23.
Figure 23:
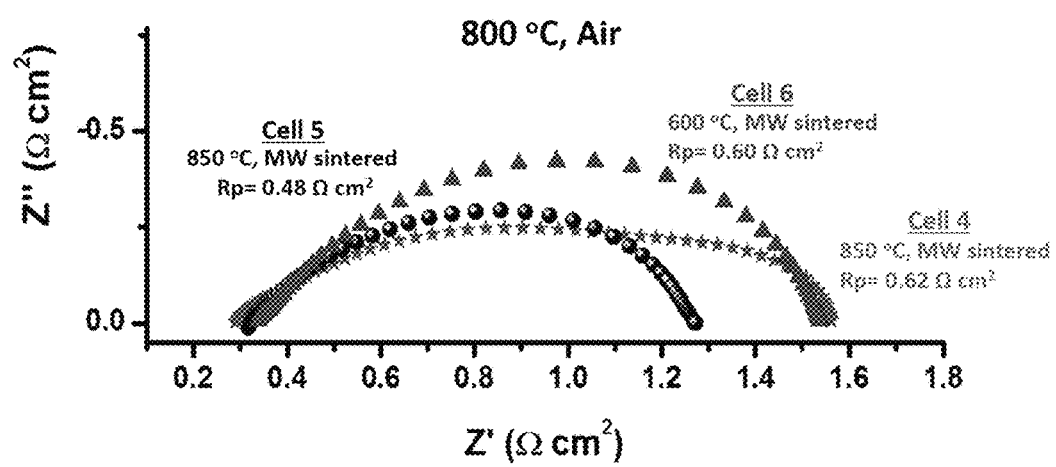
FIG. 23 shows impedance spectra of Cells 4, 5 and 6 prepared from MW prepared powders followed by MW sintering of the cells at 850, 850 and 600° C., respectively. LCFCr was deposited on either side of a 250 μm thick GDC electrolyte disc. The impedance response was obtained in stagnant air at the OCP and 800° C. The equivalent circuit used for data fitting is that shown in FIG. 22B.

The electrochemical impedance spectra of the cells fabricated with a 1 mm thick GDC electrolyte (Cells 1-3) are shown in FIG. 22A. The furnace-sintered cell (Cell 1) and the MW sintered cells, sintered at 700° C. (Cell 2) and 900° C. (Cell 3), were then evaluated for their performance in a half-cell configuration in air at 800° C. (FIG. 22B). The MW sintered cells show a better performance, overall, with the polarization resistance (Rp) decreasing from 0.50 (Cell 1) to 0.40 (Cell 2) and 0.25 Ωcm$^2$ (Cell 3). To further study the effect of the MW cell sintering temperature, Cells 2 and 3 were tested at 700 and 900° C., keeping the sintering time as well as the ramping time constant. FIG. 22A shows that the cell that was MW sintered at 900° C. vs. at 700° C. has a better performance, giving Rp values of 0.25 and 0.40 Ωcm2, respectively. As shown in FIG. 22A, the ohmic resistance values also decrease, showing the same trend as the polarization resistance (Cell 3<Cell 2<Cell 1). Cell 3 (MW sintered at 900° C.) exhibits the lowest Rp as well a slightly lower ohmic resistance of ca. 0.59 Ωcm$^2$ FIG. 23 shows the electrochemical impedance spectra of samples fabricated with a thinner (250 μm) GDC electrolyte (Cells 4-6). It was intended to sinter these cells at 900° C. and 700° C., respectively, in order to compare their performance to what is seen in FIG. 22A. However, the cells with the thicker GDC electrolytes (Cells 2-3) reached the desired temperature more rapidly than the cells with the thinner GDC electrolyte (Cells 4-6). All of the samples were sintered using the same MW frequency and power (2.45 GHz and 1500 W) and yet, for Cells 4-6, the desired temperatures of 900° C. and 700° C. were not reached. As a result, Cell 4 reached a sintering temperature of 850° C. using the same ramping times and sintering times as in the case of Cells 2 and 3. In order to attempt to reach the desired temperatures, the ramping times were increased from 30 to 45 minutes in the construction of Cells 5 and 6.

As shown in FIG. 23, the polarization resistance for Cells 4 and 5, both MW-sintered at 850° C., decreased from 0.62 to 0.48 Ωcm$^2$ when a longer ramping time was used, while the polarization resistance of the cell sintered at 600° C. with a longer ramping time (Cell 6) was 0.60 Ωcm$^2$. These results indicate that the thickness of the electrolyte affects the MW sinterability of the cell and thus enhances the bonding of the electrodes onto the electrolyte surface. Also, it appears that the ramping time to the desired MW sintering temperature plays an important role in the sintering process.

This example provides an effective technique for anode-electrolyte-cathode co-sintering in one simple step for SOFCs. Cells sintered with MW methods (Cells 2-6) had an average particle size (ca. 50 nm) significantly smaller that the cells sintered with conventional furnace (ca. 100 μm). The GDC electrolyte thickens has to be taken into account in achieving desired sintering temperature by MW methods, thicker (1 mm) electrolytes successfully reached the desired temperatures, while in the case of the thinner GDC electrolytes (250 μm), the ramping times had to be increased (from 30 to 45 minutes) to reach the desired temperatures.

Overall, the 1 mm GDC electrolyte cells types (sample 3), which were MW sintered at 900° C. for 20 min, reaching the desired temperature in 30 minutes showed the best performance. These types of cells were sintered in a total time of 1 hour and 20 minutes (vs 10 hours in conventional furnace) and showed a polarization resistance of 0.25 $\Omega cm^2$ per electrode, which is in the range of most of the state of the art cathodes prepared by conventional solid state methods and sintered by conventional furnace heating. LCFCr electrodes can be co-sintered in one single step onto the GDC electrolyte in ca. 5 times less time than with a conventional furnace.

REFERENCES

[1] A. V. Virkar, Mechanism of oxygen electrode delamination in solid oxide electrolyzer cells, International Journal of Hydrogen Energy, 35 9527-9543.

[2] M. A. Laguna-Bercero, Recent advances in high temperature electrolysis using solid oxide fuel cells: A review, Journal of Power Sources, 203 4-16.

[3] M. A. Laguna-Bercero, J. A. Kilner, S. J. Skinner, Development of oxygen electrodes for reversible solid oxide fuel cells with scandia stabilized zirconia electrolytes, Solid State Ionics, 192 501-504.

[4] R. N. Blumenthal, R. K. Sharma, Electronic conductivity in nonstoichiometric cerium dioxide, Journal of Solid State Chemistry, 13 (1975) 360-364.

[5] P. Moçoteguy, A. Brisse, A review and comprehensive analysis of degradation mechanisms of solid oxide electrolysis cells, International Journal of Hydrogen Energy, 38 (2013) 15887-15902.

[6] J. Lu, Y.-M. Yin, Z.-F. Ma, Preparation and characterization of new cobalt-free cathode Pr0.5Sr0.5Fe0.8Cu0.2O3-δ for IT-SOFC, International Journal of Hydrogen Energy, 38 (2013) 10527-10533.

[7] L. Zhao, B. He, X. Zhang, R. Peng, G. Meng, X. Liu, Electrochemical performance of novel cobalt-free oxide Ba0.5Sr0.5Fe0.8Cu0.2O3-δ for solid oxide fuel cell cathode, Journal of Power Sources, 195 (2010) 1859-1861.

[8] L. Zhao, B. He, Y. ling, Z. Xun, R. Peng, G. Meng, X. Liu, Cobalt-free oxide Ba0.5Sr0.5Fe0.8Cu0.2O3-δ for proton-conducting solid oxide fuel cell cathode, International Journal of Hydrogen Energy, 35 (2010) 3769-3774.

[9] A. Egger, E. Bucher, M. Yang, W. Sitte, Comparison of oxygen exchange kinetics of the IT-SOFC cathode materials La0.5Sr0.5CoO3-d and La0.6Sr0.4CoO3, Solid State Ionics, 225 (2012) 55-60.

[10] J. W. Fergus, Lanthanum chromite-based materials for solid oxide fuel cell interconnects, Solid State Ionics, 171 (2004) 1-15.

[11] M. Chen, B. H. Moon, S. H. Kim, B. H. Kim, Q. Xu, B. G. Ahn, Characterization of La0.6Sr0.4Co0.2Fe0.8O3-δ+La2NiO4+δ Composite Cathode Materials for Solid Oxide Fuel Cells, Fuel Cells, 12 (2012) 86-96.

[12] Q. Zhou, L. Xu, Y. Guo, D. Jia, Y. Li, W. C. J. Wei, La0.6Sr0.4Fe0.8Cu0.2O3-δ perovskite oxide as cathode for IT-SOFC, International Journal of Hydrogen Energy, 37 (2012) 11963-11968.

[13] J. C. Ruiz-Morales, D. Marrero-Lopez, J. Canales-Vazquez, J. T. S. Irvine, Symmetric and reversible solid oxide fuel cells, RSC Advances, 1 (2011) 1403-1414.

[14] M. Chen, S. Paulson, V. Thangadurai, V. Birss, Sr-rich chromium ferrites as symmetrical solid oxide fuel cell electrodes, Journal of Power Sources, 236 (2013) 68-79.

[15] I. A. L. V. L. Kozhevnikov, J. A. Bahteeva, M. V. Patrakeev, E. B. Miterg, C. M. e. K. R. Poeppelmeier.

[16] J. Prado-Gonjal, R. Schmidt, J.-J. Romero, D. Ávila, U. Amador, E. Morán, Microwave-Assisted Synthesis, Microstructure, and Physical Properties of Rare-Earth Chromites, Inorganic Chemistry, 52 (2012) 313-320.

[17] Q. Xu, D.-p. Huang, W. Chen, F. Zhang, B.-t. Wang, Structure, electrical conducting and thermal expansion properties of Ln0.6Sr0.4Co0.2Fe0.8O3 perovskite-type complex oxides, Journal of Alloys and Compounds, 429 (2007) 34-39.

[18] F. Riza, C. Ftikos, F. Tietz, W. Fischer, Preparation and characterization of Ln0.8Sr0.2Fe0.8Co0.2O3-x (Ln=La, Pr, Nd, Sm, Eu, Gd), Journal of the European Ceramic Society, 21 (2001) 1769-1773.

[19] V. V. Kharton, A. V. Kovalevsky, M. V. Patrakeev, E. V. Tsipis, A. P. Viskup, V. A. Kolotygin, A. A. Yaremchenko, A. L. Shaula, E. A. Kiselev, J. o. C. Waerenborgh, Oxygen Nonstoichiometry, Mixed Conductivity, and Mössbauer Spectra of Ln0.5A0.5FeO3-δ (Ln=La–Sm, A=Sr, Ba): Effects of Cation Size, Chemistry of Materials, 20 (2008) 6457-6467.

[20] J.-C. Grenier, M. Pouchard, P. Hagenmuller, Vacancy ordering in oxygen-deficient perovskite-related ferrites, in: *Ferrites Transitions Elements Luminescenc*, Structure and Bonding 1981, vol. 47, pp. 1-25

[21] G. Corbel, S. Mestiri, P. Lacorre, Physicochemical compatibility of CGO fluorite, LSM and LSCF perovskite electrode materials with La2Mo2O9 fast oxide-ion conductor, Solid State Sciences, 7 (2005) 1216-1224.

[22] A. Hammouche, E. Siebert, A. Hammou, Crystallographic, thermal and electrochemical properties of the system La1-xSrxMnO3 for high temperature solid electrolyte fuel cells, Materials Research Bulletin, 24 (1989) 367-380.

[23] M. Mori, Y. Hiei, H. Itoh, G. A. Tompsett, N M Sammes, Evaluation of Ni and Ti-doped Y2O3 stabilized ZrO2 cermet as an anode in high-temperature solid oxide fuel cells, Solid State Ionics, 160 (2003) 1-14.

[24] L. W. Tai, M. M. Nasrallah, H. U. Anderson, D. M. Sparlin, S. R. Sehlin, Structure and electrical properties of La1-xSrxCo1-yFeyO3. Part 2. The system La1-xSrxCo0.2Fe0.8O3, Solid State Ionics, 76 (1995) 273-283.

[25] S. Sameshima, T. Ichikawa, M. Kawaminami, Y. Hirata, Thermal and mechanical properties of rare earth-doped ceria ceramics, Materials Chemistry and Physics, 61 (1999) 31-35.

[26] E. Y. Pikalova, A. N. Demina, A. K. Demin, A. A. Murashkina, V. E. Sopernikov, N. O. Esina, Effect of doping with Co2O3, TiO2, Fe2O3, and Mn2O3 on the properties of Ce0.8Gd0.2O2-δ, Inorg Mater, 43 (2007) 735-742.

[27] H. Hayashi, M. Kanoh, C. J. Quan, H. Inaba, S. Wang, M. Dokiya, H. Tagawa, Thermal expansion of Gd-doped ceria and reduced ceria, Solid State Ionics, 132 (2000) 227-233.

[28] S. Omar, J. C. Nino, Consistency in the chemical expansion of fluorites: A thermal revision of the doped ceria, Acta Materialia, 61 (2013) 5406-5413.

[29] T. Hisashige, Y. Yamamura, T. Tsuji, Thermal expansion and Debye temperature of rare earth-doped ceria, Journal of Alloys and Compounds, 408-412 (2006) 1153-1156.

[30] V. Prashanth Kumar, Y. S. Reddy, P. Kistaiah, G. Prasad, C. Vishnuvardhan Reddy, Thermal and electrical properties of rare-earth co-doped ceria ceramics, Materials Chemistry and Physics, 112 (2008) 711-718.

[31] C. Ftikos, M. Nauer, B. C. H. Steele, Electrical conductivity and thermal expansion of ceria doped with Pr, Nb and Sn, Journal of the European Ceramic Society, 12 (1993) 267-270.

[32] S. Van Rompaey, et al., Layered oxygen vacancy ordering in Nb-doped SrCo1-xFexO3-d, Z. Kristallogr., 228 (2013) 28-34.

[33] J.-C. Boivin, Structural and electrochemical features of fast oxide ion conductors, International Journal of Inorganic Materials, 3 (2001) 1261-1266.

[34] K. R. Cooper, M. Smith, Electrical test methods for on-line fuel cell ohmic resistance measurement, Journal of Power Sources, 160 (2006) 1088-1095.

[35] J.-B. Jorcin, M. E. Orazem, N. Pébère, B. Tribollet, CPE analysis by local electrochemical impedance spectroscopy, Electrochimica Acta, 51 (2006) 1473-1479.

[36] M. J. Escudero, A. Aguadero, J. A. Alonso, L. Daza, A kinetic study of oxygen reduction reaction on La2NiO4 cathodes by means of impedance spectroscopy, Journal of Electroanalytical Chemistry, 611 (2007) 107-116.

[37] M. J. Jorgensen, M. Mogensen, Impedance of Solid Oxide Fuel Cell LSM/YSZ Composite Cathodes, Journal of The Electrochemical Society, 148 (2001) A433-A442.

[38] S. Li, Z. Lü, X. Huang, W. Su, Thermal, electrical, and electrochemical properties of Nd-doped Ba0.5Sr0.5Co0.8Fe0.2O3−δ as a cathode material for SOFC, Solid State Ionics, 178 (2008) 1853-1858.

[39] V. Dusastre, J. A. Kilner, Optimisation of composite cathodes for intermediate temperature SOFC applications, Solid State Ionics, 126 (1999) 163-174.

[40] Y. H. Wu, K V Hansen; K. Norrman, T. Jacobsen, Mogensen, M. B. Mogens, Oxygen Electrode Kinetics and Surface Composition of Dense $(La_{0.75}Sr_{0.25})_{0.95}MnO_3$ on YSZ., ECS Transactions, 57 (2013) 1673-1682.

[41] Y. Takeda, R. Kanno, M. Noda, Y. Tomida, O. Yamamoto, Cathodic Polarization Phenomena of Perovskite Oxide Electrodes with Stabilized Zirconia, Journal of The Electrochemical Society, 134 (1987) 2656-2661.

[42] B. Y. Yoon, J. Bae, Electrochemical Investigation of Composite Nano La0.6Sr0.4Co0.2Fe0.8O3-δ Infiltration into LSGM Scaffold Cathode on LSGM Electrolyte, ECS Transactions, 57 (2013) 1933-1943.

[43] B. Molero-Sánchez, P. Addo, M. Chen, S. Paulson, V. Birss, La0.3Ca0.7Fe0.7Cr0.3O3-δ as a Novel Air Electrode Material for Solid Oxide Electrolysis Cells, in: 11 th European SOFC & SOE FORUM 2014, Luzern, Switzerland, July 2014, pp. B 0804.

[44] M. Mosiałek, E. Bielańska, R. P. Socha, M. Dudek, G. Mordarski, P. Nowak, J. Barbasz, A. Rapacz-Kmita, Changes in the morphology and the composition of the Ag|YSZ and Ag|LSM interfaces caused by polarization, Solid State Ionics, 225 (2012) 755-759.

[45] M. Mosiałek, M. Dudek, P. Nowak, R. P. Socha, G. Mordarski, E. Bielańska, Changes in the morphology and the composition of the Ag|Gd0.2Ce0.8O1.9 interface caused by polarization, Electrochimica Acta, 104 (2013) 474-480.

[46] Kitchen H J, Valiance S R, Kennedy J L, Tapia-Ruiz N, Carassiti L, Harrison A, et al. Modern Microwave Methods in Solid-State Inorganic Materials Chemistry: From Fundamentals to Manufacturing. Chemical reviews. 2013; 114(2):1170-206.

[47] Lu J, Yin Y-M, Ma Z-F. Preparation and characterization of new cobalt-free cathode Pr0.5Sr0.5Fe0.8Cu0.2O3-δ for IT-SOFC. International Journal of Hydrogen Energy. 2013 8/21/; 38(25):10527-33.

[49] Prado-Gonjal J S, R.; Morán, E., Microwave-Assisted Synthesis and Characterization of Perovskite Oxides In Perovskite: Crystallography, Chemistry and Catalytic Performance, Zhang, J.; Li, H., Eds. Nova Science Pub Incorporated: 2012; pp 117-140.

[50] Gupta M L, E. W. W. Microwaves and Metals. In: Wiley, editor. 2008; p. p 228.

[51] Zhao J Y, W. Microwave-assisted Inorganic Syntheses. In Modern Inorganic Synthetic Chemistry. In: Amsterdam E, editor. 2011. p. pp 173-95.

[52] Rao K J, Vaidhyanathan B, Ganguli M, Ramakrishnan P A. Synthesis of Inorganic Solids Using Microwaves. Chemistry of Materials. 1999 1999/04/01; 11(4):882-95.

[53] Hutagalung S D I, M. I. M.; Ahmad, Z. A. Microwave assisted sintering of CaCu3Ti4O12. Ceramics International 2008; 34((4)): 939-42.

[54] Molero-Sanchez B, Prado-Gonjal, J., Ávila-Brande, D., Chen, M., Morán, E. and Birss, V. High performance $La_{0.3}Ca_{0.7}Cr_{0.3}Fe_{0.7}O_{3-\delta}$ air electrodes for reversible for solid oxide fuel cell applications, Int. J. Hydrogen Energy, 40, 1902 (2015).

[55] M. Asif and T. Muneer, *Renew. Sust. Energ. Rev.*, 11, 1388 (2007).

[56] Z. Cheng, S. Zha and M. Liu, *J. Power Sources*, 172, 688 (2007).

[57] L. Deleebeeck, M. Shishkin, P. Addo, S. Paulson, H. Molero, T. Ziegler and V. Birss, *PCCP*, 16, 9383 (2014).

[58] J. B. Hansen, *Electrochem. Solid-State Lett.*, 11, B178 (2008).

[59] S. J. Xia and V. I. Birss, in *Proceedings-Electrochem. Soc.*, p. 1275 (2005).

[60] S. Tao and J. T. S. Irvine, *Nat Mater,* 2, 320 (2003).

[61] S. Zha, P. Tsang, Z. Cheng and M. Liu, *J. Solid State Chem.,* 178, 1844 (2005).

[62] R. Mukundan, E. L. Brosha and F. H. Garzon, *Electrochem. and Solid-State Lett.,* 7, A5 (2004).

[63] J. M. Haag, D. M. Bierschenk, S. A. Barnett and K. R. Poeppelmeier, *Solid State Ionics,* 212, 1 (2012).

[64] L. Aguilar, S. Zha, S. Li, J. Winnick and M. Liu, *Electrochem. and Solid-State Lett.,* 7, A324 (2004).

[65] S. M. Bukhari, W. D. Penwell and J. B. Giorgi, *ECS Trans.,* 57, 1507 (2013).

[66] Y.-F. Bu, Q. Zhong, D.-D. Xu, X.-L. Zhao and W.-Y. Tan, *J. Power Sources,* 250, 143(2014).

[67] P. Addo, B. Molero-Sánchez, M. Chen, S. Paulson and V. Birss, in 11th *European SOFC and SOE forum,* p. B0314, Luzerne, Switzerland (2014).

[68] J. Canales-Vázquez, J. C. Ruiz-Morales, D. Marrero-López, J. Peña-Martínez, P. Núñez and P. Gómez-Romero, *J. Power Sources,* 171, 552 (2007).

[69] Y. F. Chris, A. R. Clive, T. L. Michael and K. A. Dinesh, Journal of Electroceramics, 2008.

[70] D. K. Agrawal, Current Opinion in Solid State and Materials Science, 1998, 3, 480-485.

[71] H. M. Kingston, and S. J Haswell., Microwave-enhanced Chemistry: Fundamentals, Sample Preparation, and Applications., Washington, D.C.

[72] J. D. Katz, Annual Review of Materials Science, 1992, 22, 153-170.

[73] M. A. Janney, C. L. Calhoun and H. D Kimrey, Journal of the American Ceramic Society, 1992, 75, 341-346.

[74] C. Zhang, G. Zhang, S. Leparoux, H. Liao, C.-X. Li, C.-J. Li and C. Coddet, Journal of the European Ceramic Society, 2008, 28, 2529-2538.

[75] S. Fujitsu, M. Ikegami and T. Hayashi, Journal of the American Ceramic Society, 2000, 83, 2085-2087.
[76] J. Prado-Gonjal, R. Schmidt, J. Espíndola-Canuto, P Ramos-Alvarez and E. Morán, Journal of Power Sources, 2012, 209, 163-171.
[77] Z. Jiao, N. Shikazono and N. Kasagi, Journal of Power Sources, 2010, 195, 8019-8027.
[78] S. Kesapragada, S. Bhaduri, S. Bhaduri and P. Singh, Journal of power sources, 2003, 124, 499-504.
[79] US patent publication 2009/0110992, Apr. 30, 2009.
[80] Z. Jiao, N. Shikazono and N. Kasagi, Journal of Power Sources, 2010, 195, 151-154.
[81] M.-B. Choi, K.-T. Lee, H.-S. Yoon, S.-Y. Jeon, E. Wachsman and S.-J. Song, Journal of Power Sources, 2012, 220, 377-382.
[82] Z. Jiao, N. Shikazono and N. Kasagi, Journal of Power Sources, 2011, 196, 5490-5493.
[83] B. Molero-Sánchez, P. K. Addo, A. Buyukaksoy and V. Birss, ECS Transactions, 2015, 66, 185-193.
[84] B. Molero-Sánchez, J. Prado-Gonjal, D. Ávila-Brande, V. Birss and E. Morán, Ceramics International, 2015, 41, 8411-8416.
[85] P. K. Addo, B. Molero-Sanchez, A. Buyukaksoy, S. Paulson and V. Birss, ECS Transactions, 2015, 66, 219-228.
[86] P. A. Beatriz Molero Sánchez, Aligul Buyukaksoy, Scott Paulson and Viola Birss, Faraday Discussion, 2015, paper 6422.

The invention claimed is:

1. An electrode material having the formula:

$$La_wM_xFe_yCr_zO_{3-\delta}$$

where:
M is a mixture of Ca and Sr where the molar ratio of Ca to Sr ranges from 1:1 to 100:1;
w is 0.2 to 0.4;
x is 0.6 to 0.8;
y is 0.6 to 0.8;
z is 0.2 to 0.4; and
δ represents oxygen deficiency.

2. The electrode material of claim 1 wherein
w is 0.27 to 0.33;
x is 0.67 to 0.73;
y is 0.67 to 0.73; and
z is 0.27 to 0.33.

3. The electrode material of claim 1 wherein
w is 0.29 to 0.31;
x is 0.69 to 0.71;
y is 0.69 to 0.1; and
z is 0.29 to 0.31.

4. The electrode material of claim 1 wherein w is 0.3; x is 0.7; y is 0.7; and z is 0.3.

5. The electrode material of claim 1, wherein the molar ratio of Ca to Sr is 1:1.

6. The electrode material of claim 1, wherein the molar ratio of Ca to Sr is 10:1.

7. An electrode for a solid oxide fuel cell which comprises the electrode material of claim 1.

8. A fuel electrode which comprises the electrode material of claim 1.

9. An air or oxygen electrode which comprises the electrode material of claim 1.

10. The electrode material of claim 1, which is prepared by microwave-assisted combustion, microwave-assisted co-precipitation or a microwave-assisted sol-gel method.

11. A solid oxide fuel cell having an electrode which comprises the electrode material of claim 1.

12. A reversible solid oxide fuel cell having an electrode which comprises the electrode material of claim 1.

13. A method for selectively generating electricity or employing electricity to generate a fuel which comprises selectively operating a reversible solid oxide fuel cell of claim 10 to generate electricity or to generate a fuel.

14. The method of claim 13, wherein the solid oxide fuel cell or reversible solid oxide fuel cell is operated in the presence of a fuel containing hydrogen sulfide.

15. The method of claim 13 operated at a temperature in the range of 600-850° C.

16. A method for sintering a solid oxide fuel cell (SOFC) or a reversible solid oxide fuel cell (RSOFC) which comprises the steps of:
providing a dense solid electrolyte having a first and second opposite surfaces,
applying a slurry or paste of a first and second electrode material to the first and second opposite surfaces of the solid electrolyte to form a first and second layer;
irradiating the resulting solid electrolyte with first and second layers with microwave radiation to reach a target temperature ranging from 600 to 900° C. over a ramp time ranging from 20 to 60 minutes and thereafter maintaining irradiation at the target temperature for 15 to 30 minutes, wherein the electrode material is an electrode material of claim 1.

* * * * *